United States Patent
Xin et al.

(10) Patent No.: US 11,178,694 B2
(45) Date of Patent: Nov. 16, 2021

(54) RTA QUEUE MANAGEMENT IN WIRELESS LOCAL AREA NETWORK (WLAN) STATIONS

(71) Applicant: SONY CORPORATION, Tokyo (JP)

(72) Inventors: Liangxiao Xin, San Jose, CA (US); Mohamed Abouelseoud, San Francisco, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 38 days.

(21) Appl. No.: 16/749,496

(22) Filed: Jan. 22, 2020

(65) Prior Publication Data

US 2021/0076420 A1 Mar. 11, 2021

Related U.S. Application Data

(60) Provisional application No. 62/897,600, filed on Sep. 9, 2019.

(51) Int. Cl.
| | |
|---|---|
| *H04W 72/00* | (2009.01) |
| *H04W 74/08* | (2009.01) |
| *H04L 12/861* | (2013.01) |
| *H04L 12/741* | (2013.01) |
| *H04L 12/927* | (2013.01) |

(Continued)

(52) U.S. Cl.
CPC ......... *H04W 74/0816* (2013.01); *H04L 45/74* (2013.01); *H04L 47/801* (2013.01); *H04L 49/206* (2013.01); *H04L 49/90* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0153179 A1* | 7/2006 | Ho | H04L 49/35 370/386 |
| 2008/0301253 A1* | 12/2008 | Ohmi | H04B 3/54 709/209 |

(Continued)

FOREIGN PATENT DOCUMENTS

KR    20040028055 A    4/2004

OTHER PUBLICATIONS

Yi-Hung Wei et al. "RT-WiFi: Real-Time High-Speed Communication Protocol for Wireless Cyber-Physical Control Applications" 2013 all pages (Year: 2013).*

*Primary Examiner* — Brandon M Renner
(74) *Attorney, Agent, or Firm* — O'Banion & Ritchey LLP; John P. O'Banion

(57) ABSTRACT

A wireless communication circuit for operating over a wireless local area network (WLAN) in which real time application (RTA) traffic and non-RTA traffic coexist and are distinguished from one another. RTA queues are created to enqueue RTA packets while non-RTA packets are pushed into non-RTA queues. Management frames containing RTA session parameters and RTA queue setting information are exchanged between stations. Channel time is allocated to RTA queues for transmitting packets, during which non-RTA queues are not allowed to access the channel. Stations determine which RTA queues to enqueue an RTA packet into based on RTA queue classification information of its RTA session.

45 Claims, 38 Drawing Sheets

(51) Int. Cl.
*H04L 12/931* (2013.01)
*H04W 84/12* (2009.01)

(56) References Cited

U.S. PATENT DOCUMENTS

| | | | |
|---|---|---|---|
| 2010/0067411 A1* | 3/2010 | Shinozaki | H04W 72/1242 370/280 |
| 2012/0224484 A1* | 9/2012 | Babiarz | H04L 43/0876 370/235 |
| 2016/0191422 A1* | 6/2016 | Srinivasan | H04L 49/201 370/413 |
| 2017/0192921 A1* | 7/2017 | Wang | G06F 9/46 |
| 2018/0131625 A1* | 5/2018 | Kam | H04L 49/9021 |
| 2018/0317156 A1* | 11/2018 | Bergstrom | H04L 47/26 |
| 2019/0254072 A1 | 8/2019 | Baron | |
| 2020/0068527 A1* | 2/2020 | Gong | H04W 72/005 |
| 2020/0145345 A1* | 5/2020 | Finkelstein | H04L 47/58 |

\* cited by examiner

RTA session Information

| Identifying Info | Session ID | Type of Service | Source IP Addr | Source Port | Source MAC Addr | Destination IP Addr | Destination Port | Destination MAC Addr |
|---|---|---|---|---|---|---|---|---|

265

| Status Info | Session Status | Comment | Last Active Time |
|---|---|---|---|

270

| Requirement Info | Bandwidth Requirement | Delay Requirement | Jitter Requirement | Periodic Time | Priority | Session Start Time | Session End Time |
|---|---|---|---|---|---|---|---|

275

| Transmission Info | Time Allocation | RU Allocation | SS Allocation |
|---|---|---|---|

280

| Queue Info | Initial Queue Types | Expiration Time | Drop Expired Packet | Expired Queue Type |
|---|---|---|---|---|

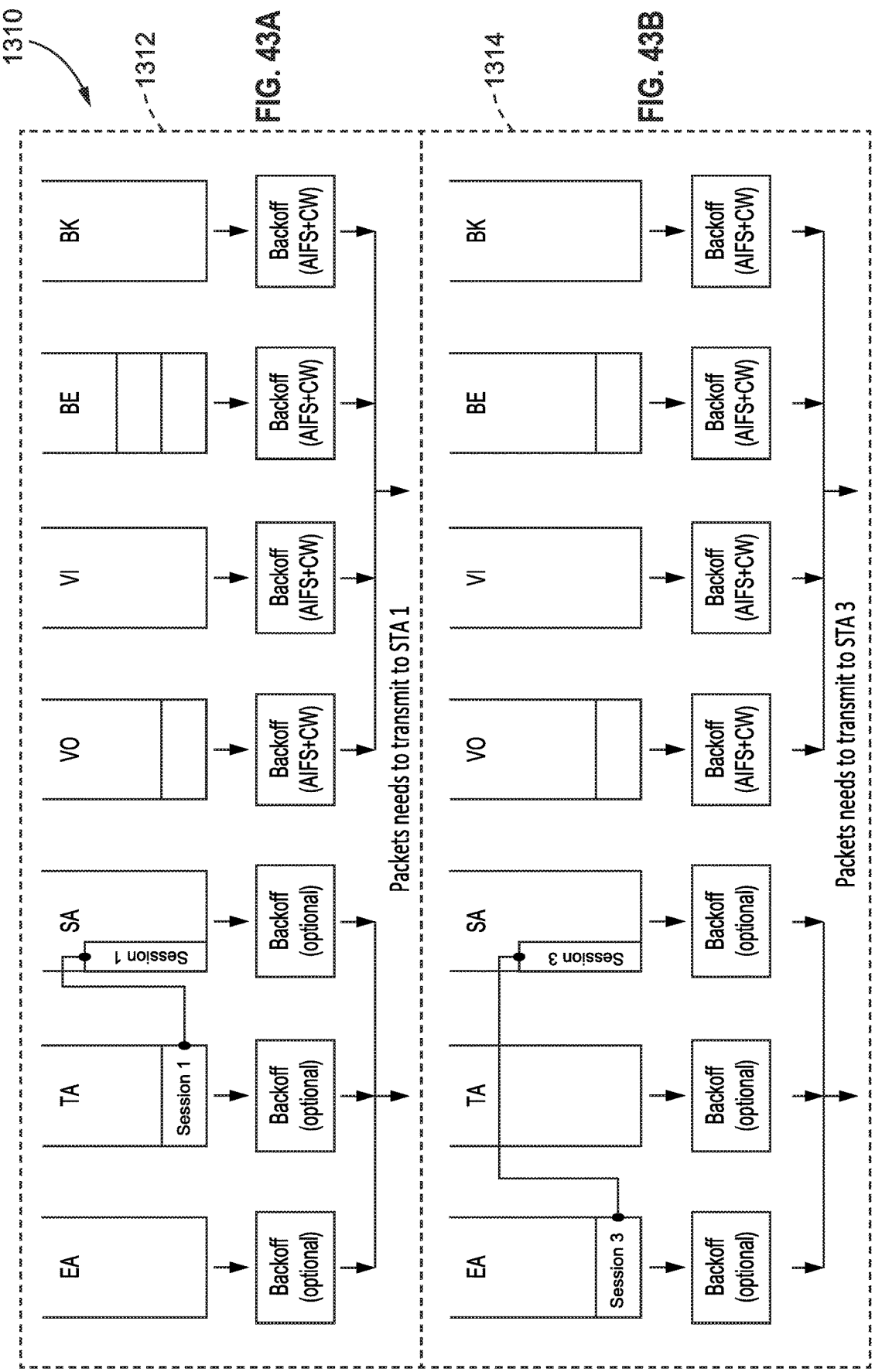

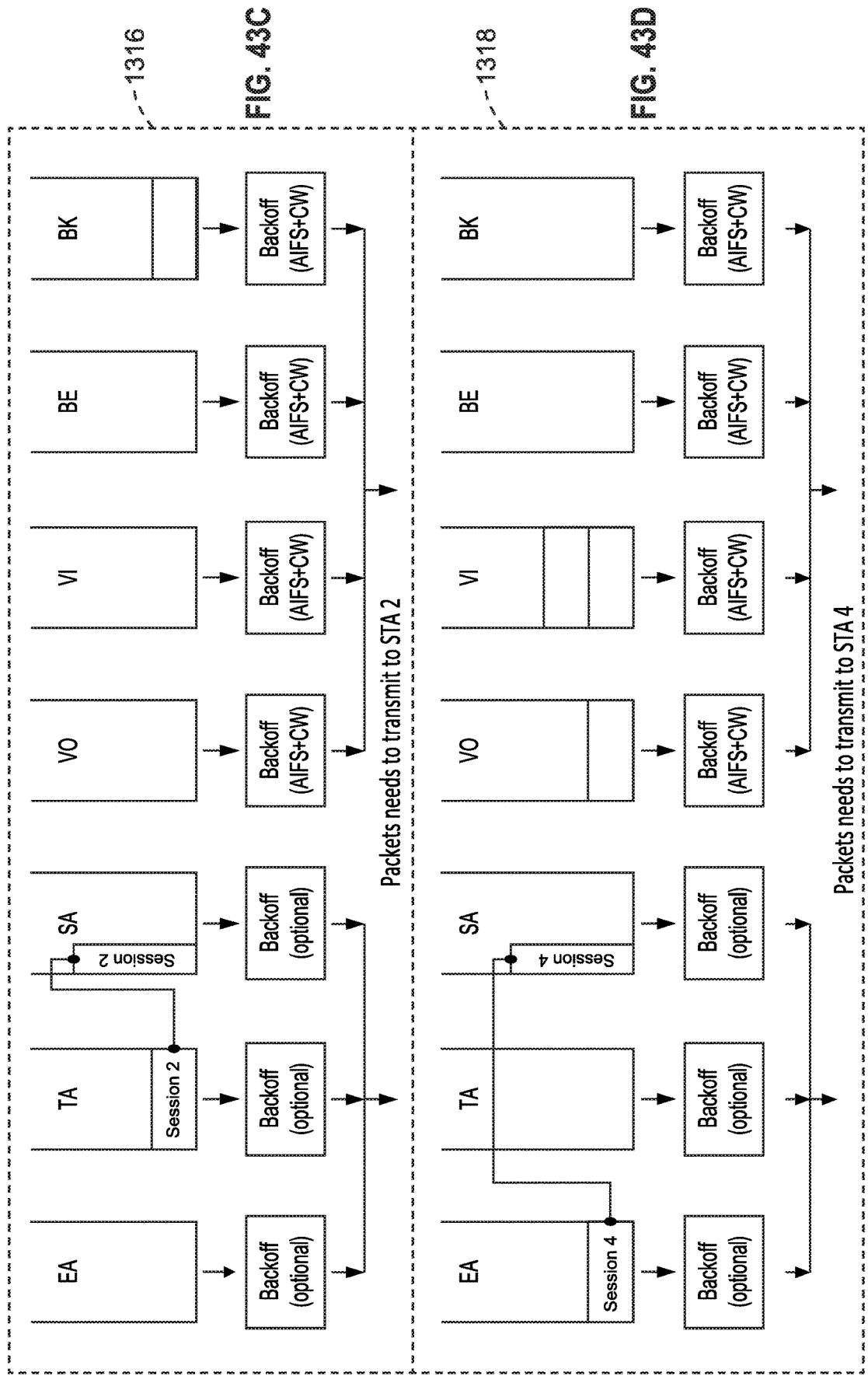

RTA QUEUE MANAGEMENT IN WIRELESS LOCAL AREA NETWORK (WLAN) STATIONS

CROSS-REFERENCE TO RELATED APPLICATIONS

This application claims priority to, and the benefit of, U.S. provisional patent application Ser. No. 62/897,600 filed on Sep. 9, 2019, incorporated herein by reference in its entirety.

STATEMENT REGARDING FEDERALLY SPONSORED RESEARCH OR DEVELOPMENT

Not Applicable

Incorporation-by-Reference of Computer Program Appendix

Not Applicable

Notice of Material Subject to Copyright Protection

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication stations, and more particularly to wireless local area network (WLAN) stations communicating real time traffic utilizing a queue management system.

2. Background Discussion

Present wireless systems that utilize Carrier Sense Multiple Access/Collision Avoidance (CSMA/CA) focus on high overall network throughput, however, they lack low latency capability for properly supporting Real Time Applications (RTAs).

A RTA requires low latency communication and uses best effort communication. The data generated from the RTA is called RTA traffic and is packetized as RTA packets at the transmitter station (STA), while the data generated from a non-time sensitive application is called non-RTA traffic and is packetized as non-RTA packets at the transmitter STA. The RTA packets require low latency due to a high timeliness requirement (real-time) for packet delivery, as the RTA packet is valid only if it can be delivered within a certain period of time.

In CSMA/CA wireless technology, STAs can utilize Enhanced Distributed Channel Access (EDCA) to give higher priority traffic an opportunity for being transmitted earlier than low priority traffic. EDCA is defined in the IEEE 802.11e standard to meet Wi-Fi Quality of Service (QoS) requirements. It classifies the traffic into different Access Categories (AC) in terms of priority. The ACs with higher priority has shorter average channel contention time and is thus able to access the channel more often.

Each access category (AC) has its own queue to order the packets in the queue for transmission. When the offered traffic is high in one AC, the packets in that queue have to wait to gain channel access one by one. The waiting time of a packet in the queue is significant which thus increases the latency of that packet transmission.

Due to the random channel access scenario in EDCA, the traffic with high priority does not always gain channel access earlier than the traffic with low priority. So the present queue system is subject to significant delay which impacts the delivery of RTA packets. In view of the above, it is seen that there are significant latencies involved in communicating time sensitive RTA packets within a wireless network that utilizes CSMA/CA with EDCA, or similarly mechanisms.

Accordingly, a need exists for enhanced handling of real time application (RTA) packets and for significantly reducing packet latency. The present disclosure fulfills that need and provides additional benefits over previous technologies.

BRIEF SUMMARY

Towards eliminating RTA packet delays caused by the queue system of a wireless system using CSMA/CA with EDCA, it is highly beneficial to create a new RTA queue mechanism to reduce the waiting time of RTA packets in the queue before the station gains channel access.

The task of performing RTA queue management in a CSMA/CA system is more challenging due to the coexistence of both RTA traffic and non-RTA traffic. The challenge in this process can be summarized as follows. (a) Identifying and distinguishing between RTA packets and non-RTA packets. (b) Pushing the RTA packets into the RTA queues, and the non-RTA packets into the non-RTA queues (i.e., EDCA queues). (c) Coordinating channel access between RTA and non-RTA queues. (d) Coping with (handling of) queued RTA packets which no longer meet the timeliness requirement.

The disclosed RTA queue management takes into account the time-validity of the RTA traffic and minimizes its latency by reducing the waiting time of RTA traffic in the queue where RTA and non-RTA traffic coexist in a wireless network.

More specifically, the presently disclosed wireless communication system, apparatus and/or method provides numerous mechanisms for enhanced handling of RTA packets and their queuing.

Each station is configured for performing packet transmissions in which CSMA/CA is applied, while the real-time application (RTA) traffic and non-RTA traffic coexist. Stations are configured for performing at least the following operations. STAs distinguish the RTA traffic and non-RTA traffic. STAs create RTA queues to enqueue RTA packets while non-RTA packets are pushed into non-RTA queues, such as EDCA queues. STAs exchange management frames containing RTA session parameters and RTA queue setting information. Each STA allocates channel time to the RTA queues for performing transmissions, during which non-RTA queues are not allowed to access the channel. STAs decide which RTA queues to enqueue an RTA packet into based on the RTA queue classification information of its RTA session. Each STA sets the expiration time of an RTA packet and dequeues the expired RTA packet from all the RTA queues within which it is enqueued.

In addition, at least one or more embodiments include one or more of the following inventive elements. (a) A STA can use information based on prior negotiation or packet header information to distinguish RTA traffic from non-RTA traffic. (b) A STA creating an RTA queue can allow that queue to access the channel using the channel time allocated to other queues. (c) A STA creating an RTA queue can sort the RTA packets in the queue by calculating the importance index of each packet based on their expiration times and priorities. (d) A STA creating an RTA queue can transmit the RTA packets in the queue based on the RTA session information regarding the packet without considering what order the packets are contained in the queue. (e) A STA creating an RTA queue can limit the channel resource allocated to that queue. (f) STAs exchanging management frames containing RTA session parameters can set the RTA queue classification, RTA packet expiration time, and the operation of expired RTA packets for the RTA session. (g) STAs exchanging management frames containing RTA queue setting information can set RTA queuing discipline, RTA queue channel time allocation, and RTA queue channel resource limitation for each queue. (h) A STA deciding which RTA queues to enqueue an RTA packet into can use the queue information of the RTA session exchanged by prior negotiation. (i) A STA enqueuing an RTA packet can push this packet into multiple RTA queues based on the latency requirements. (j) A STA enqueuing an RTA packet can dequeue that RTA packet from all the queues when that packet is transmitted successfully through one queue. (k) A STA setting the expiration time of an RTA packet can decide either to drop the packet or move the packet to non-RTA queues.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 13 is a data diagram of RTA session information according to at least one embodiment of the present disclosure.

FIG. 43A through FIG. 43D is a queue diagram exemplifying RTA queue sub-systems at STA 0 to separate the packets by receiver nodes according to at least one embodiment of the present disclosure.

DETAILED DESCRIPTION

1. Conventional WLAN Systems

1.1. Random Channel Access Scheme

Wireless Local Area Networks (WLANs), such as IEEE 802.11 have conventionally used a Carrier-Sense Multiple Access/Collision Avoidance (CSMA/CA) mechanism to allow stations (STAs) to have random access to the channel for packet transmission and retransmission.

Figure 1:
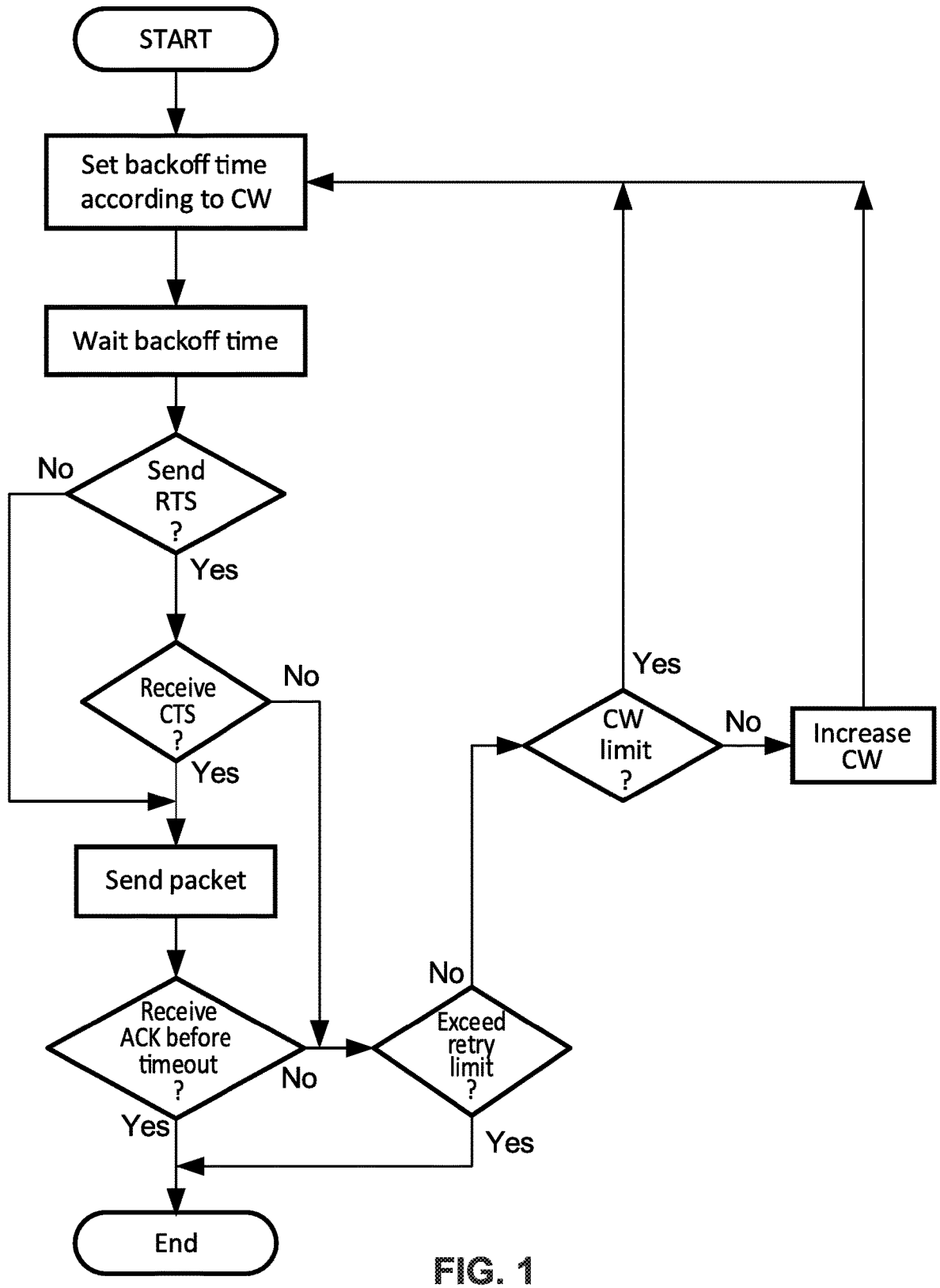
FIG. 1 is a flow diagram of contention-based channel access in CSMA/CA.

FIG. 1 illustrates contention-based channel access in CSMA/CA. In a CSMA/CA system, the STA senses the channel for transmission when there is data to transmit. Before each transmission and retransmission, the STA has to sense the channel and set a backoff time to contend for channel access. The backoff time is decided by a uniform random variable between zero and the size of a contention window (CW).

After the STA waits for the backoff time and senses that the channel is idle (unoccupied), the STA decides whether to send a Ready To Send (RTS) frame to ensure channel occupancy or not. If the STA sends an RTS frame, the channel occupancy is ensured when it receives a Clear To Send (CTS) frame, whereby at that time the STA sends the packet. If the STA does not send an RTS frame, then it sends the packet directly. A retransmission is required if the CTS frame is not received after sending an RTS frame, or if the STA does not receive an ACKnowledgement (ACK) before timeout. Otherwise, the transmission succeeds. When a retransmission is required, the STA checks the number of retransmissions of the packet. If the number of retransmissions exceeds the retry limit, then the packet is dropped and no retransmissions are scheduled. Otherwise, the retransmission is scheduled. If the retransmission is scheduled, then another backoff time is needed to contend for channel access for the retransmission. If the size of the contention window does not reach the upper limit, then the STA increases it. The STA sets another backoff time depending on the new size of the contention window. The STA waits the backoff time for retransmission and so forth.

Figure 2:
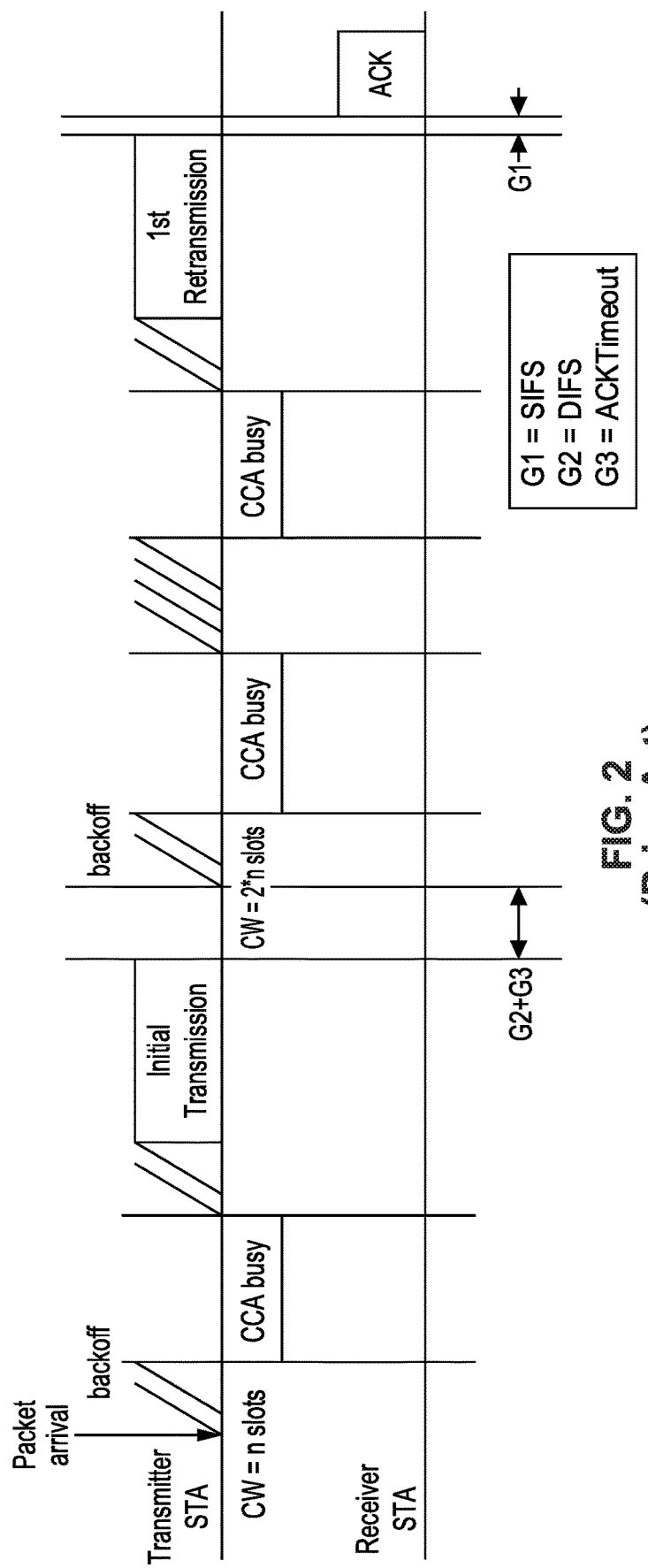
FIG. 2 is a communication sequence diagram of random channel access in CSMA/CA where RTS/CTS is disabled.

FIG. 2 illustrates one example of random channel access in CSMA/CA where the RTS/CTS is disabled. It will be noted that the 802.11 standard regarding CSMA/CA utilizes the two lowest levels in the OSI networking stack, which are the Physical (PHY) layer and the Medium Access Control (MAC) layer. When the MAC layer of the transmitter STA receives the data from its upper layers, it contends for the channel to gain access. When the transmitter STA contends for the channel, it has to wait until the backoff time, whereby the size of the contention window is n slots, and counts down to zero. The count-down process can be interrupted, such as by a Clear Channel Assessment (CCA) that indicates busy, when other packet transmissions are occurring over the channel. After the transmitter STA gains channel access to transmit the data, it packetizes the data into a packet and transmits the packet over the channel. As shown in the figure, if the initial transmission of the packet does not succeed, a retransmission of the packet is performed. The transmitter STA sets backoff time again to contend for channel access. This time, the size of the contention window is doubled, which is 2*n slots, due to the retransmission. The expected backoff time is also doubled by the contention window size. When the backoff time is increased, there is also a greater chance that the count-down process will be interrupted (i.e., CCA busy) by other packet transmissions.

1.2. EDCA Queue System

WLAN systems according to IEEE 802.11 use an Enhanced Distributed Channel Access (EDCA) protocol to classify the packet into different access categories (AC). Each AC represents the different priorities of the traffic. A STA maps all the packets into different ACs and pushes them into independent queues with respect to the ACs.

Figure 3:
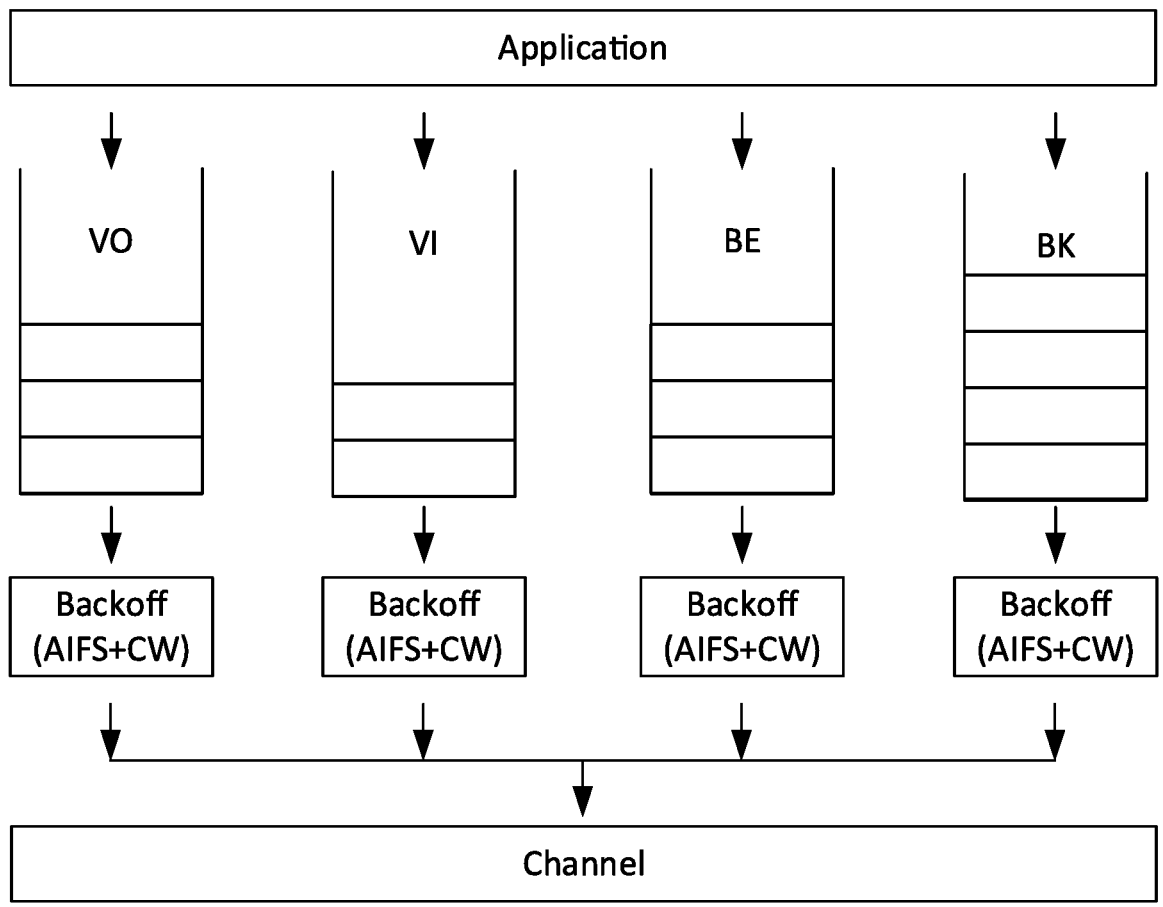
FIG. 3 is a queue diagram of the EDCA queue system.

FIG. 3 depicts a reference implementation of a queue system using an EDCA protocol. There are four access categories (ACs) shown depicting Voice (VO), Video (VI), Best-Effort (BE), and Background (BK), with the priority reducing with each queue when moving from the left to right in the figure. Each AC has an independent queue to manage the order of packet transmission. Each queue relies on the random channel access mechanism based on CSMA/CA to gain channel access. Depending on the traffic priority of the AC, the backoff time for each queue to gain channel access is different. When traffic priority of the AC is higher, the average backoff time for the queue of that AC is shorter. Therefore, the packet in the queue of a higher priority AC has a higher probability to gain channel access earlier than the packet in the queue of lower priority AC.

2. Problem Statement

Current wireless communication systems using CSMA/CA do not identify or distinguish RTA packets from non-RTA packets, nor do they reserve specific channel times for RTA traffic, or handle queue in a manner which properly integrates RTA and non-RTA packet types. Under current CSMA/CA all the packets must use the same random channel access scheme. The random channel access scheme in CSMA/CA cannot guarantee channel time for timely RTA packet transmission. CSMA/CA arranges channel access after the data arrives at the MAC layer. In most cases, the data has to wait in the queue to be transmitted, which causes a queuing delay for packet transmission.

The EDCA queue system based on CSMA/CA classifies the traffic into different ACs in terms of priority. On average, the packets with high priority have shorter backoff times and thus access the channel earlier than packets with low priority. However, it is not guaranteed that the packets with higher priority are always transmitted first, which is especially problematic in view of the timeliness requirements of RTA packets. The EDCA queue system based on CSMA/CA does not consider the worst-case latency of the packet transmission. The waiting time of a packet in the current queue system could be long which has a significant impact on the worst-case latency. The EDCA queue system based on CSMA/CA does not consider the difference of the latency requirement between RTAs. Some RTAs may have higher latency requirements while some may have lower latency requirements. The current queue system is not able to meet the various latency requirements of the RTA packets. The EDCA queue system based on CSMA/CA does not consider the timeliness of the packets. That is, a packet will be dropped from the queue only if the number of retransmissions of that packet exceeds the retry limit. However, the RTA packet may become invalid before the number of retransmissions of that packet exceeds the retry limit.

3. Contributions of the Present Disclosure

By utilizing the disclosed technology, STAs are able to identify and differentiate between RTA packets and non-RTA packets. The proposed technology creates separate queues for RTA packets, which are separate from the queues for non-RTA packets. Although packets can still use the regular queue system defined based on EDCA protocols.

The purpose of the EA queue in the disclosed technology is to allow STAs to always transmit RTA packets earlier than non-RTA packets, as the STA is able to specify an RTA queue. When that RTA queue still has entries (is not empty), the non-RTA queues are not allowed to gain channel access.

The purpose of the TA queue in the disclosed technology is to allow the STAs to distribute channel time to RTA queues and non-RTA queues. When the channel time is distributed to an RTA queue, the RTA packets in that RTA queue are always transmitted earlier than non-RTA packets. When the channel time is distributed to a non-RTA queue, it is possible that the non-RTA packets in that non-RTA queue are transmitted earlier than RTA packets.

The proposed technology allows the STAs to use different queuing disciplines in RTA queues. The RTA packets in the queue could be sorted by a number of desired criterion, for example by expiration time, priority, or some calculated importance index of the RTA packets to decide which RTA packets in the queue should be transmitted earlier. The goal of the queuing discipline is to allow all the RTA packets to be transmitted before their expiration time.

The proposed technology allows the STAs to track RTA packets in the queue. The RTA packet is allowed to transmit without waiting in the RTA queues. The RTA packet also has an expiration time associated with it as it awaits in the RTA queues. When the RTA packet is expired, it loses time-validity (defined useful period) and can be either moved to a non-RTA queue or dropped entirely.

4. Example Embodiments 4.1. STA Hardware Configuration

Figure 4:
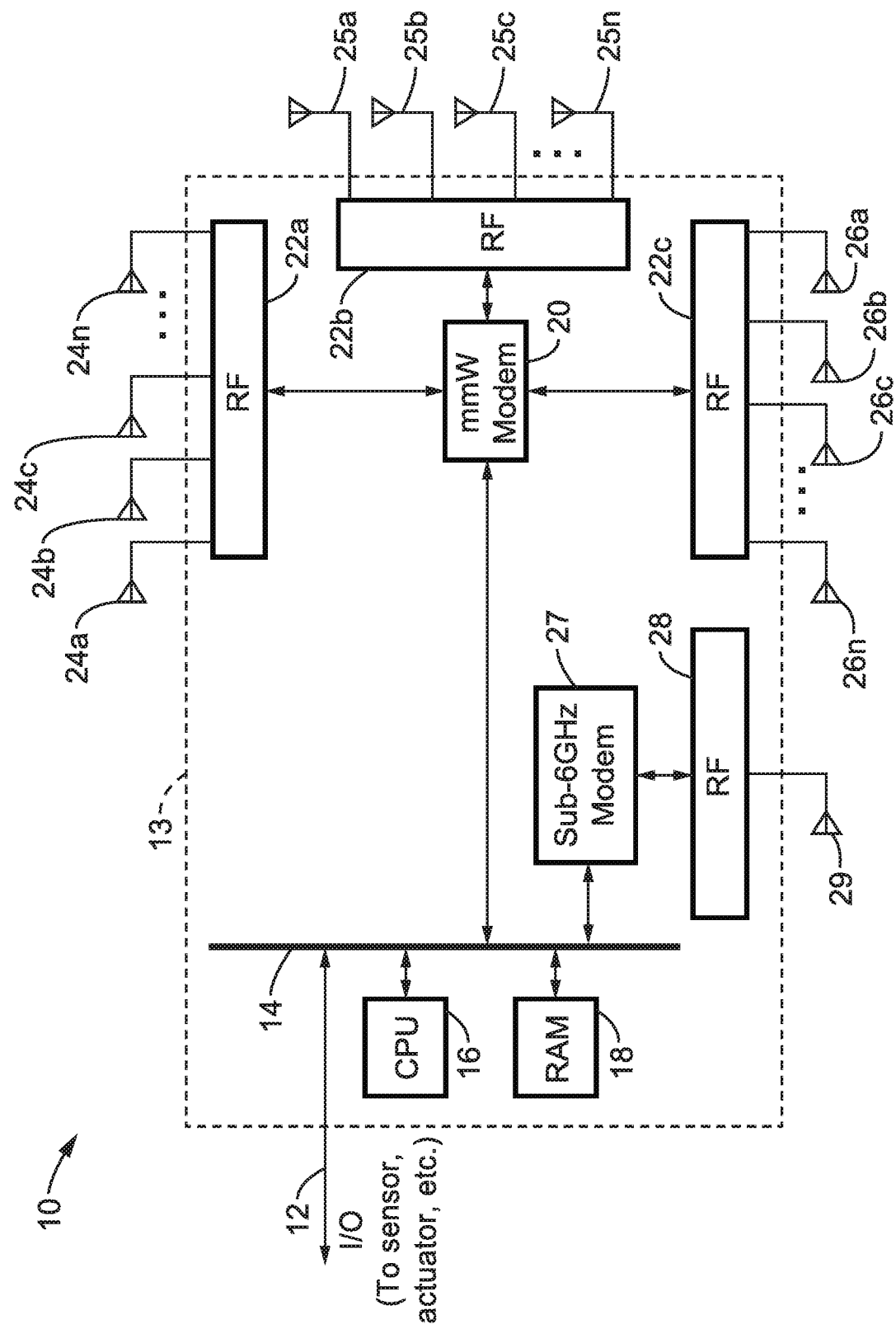
FIG. 4 is a block diagram of station (STA) hardware according to at least one embodiment of the present disclosure.

FIG. 4 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA" (a station attempting to join the network), or one of the STAs already in the network. It should also be appreciated that the programming is configured to operate in different modes (source, intermediate, destination, access point (AP) and so forth); depending on what role it is playing in the current communication context.

The STA may be configured with a single modem and single radio-frequency (RF) circuitry, or it may be configured with multiple modems and multiple RF circuits as depicted by way of example and not limitation in the figure.

In this example, the host machine is shown configured with a millimeter-wave (mmW) modem 20 coupled to radio-frequency (RF) circuitry 22a, 22b, 22c to a plurality of antennas 24a-24n, 25a-25n, 26a-26n to transmit and receive frames with neighboring STAs. In addition, the host machine is also seen with a sub-6 GHz modem 27 coupled to radio-frequency (RF) circuitry 28 to antenna(s) 29, although this second communication path is not absolutely necessary for implementing the present disclosure.

Thus, this host machine is shown configured with two modems (multi-band) and their associated RF circuitry for providing communication on two different bands. By way of example and not limitation the intended directional communication band is implemented with a millimeter-wave (mmW) band modem and its associated RF circuitries for transmitting and receiving data in the mmW band. The other band, generally referred to as a discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits, in a desired frequency band or range of frequency bands. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

It is seen therefore, that the host machine accommodates a modem which transmits/receives data frames with neighboring STAs. The modem is connected to at least one RF module to generate and receive physical signals. The RF module(s) are connected to multiple antennas which are controlled to perform beamforming for transmission and reception. In this way, the STA can transmit signals using multiple sets of beam patterns.

4.2. Example STA Topology for Consideration

Figure 5:
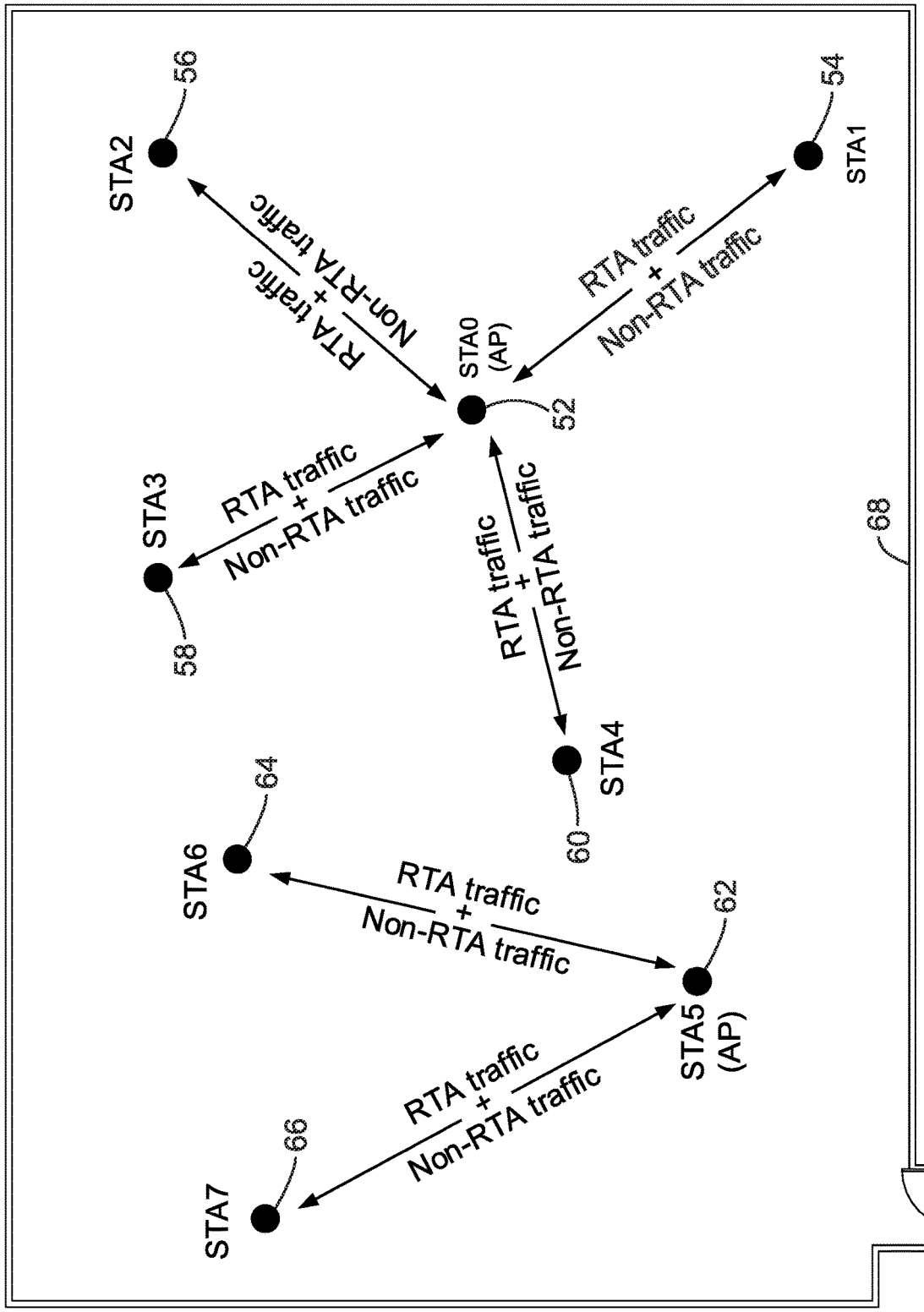
FIG. 5 is a network topology diagram showing a topological example addressed according to at least one embodiment of the present disclosure.

FIG. 5 illustrates an example network topology (scenario) 50 as an aid to explaining the goal of the disclosed technology. By way of example and not limitation, this example assumes there are eight (8) STAs consisting of two Basic Service Sets (BSSs) in a given area 68, herein exemplified as a room. Each STA can communicate with the other STAs in the same BSS. All STAs use CSMA/CA for random channel access. A first BSS depicts STA0 52 operating as an access point (AP) and non-AP stations STA1 54, STA2 56, STA3 58 and STA4 60. A second BSS depicts STA5 62 as AP along with STA6 64, STA7 66.

All STAs in this example are considered to support both applications requiring low latency communication and applications that utilize best effort communication. The data generated from the application requiring low latency communication is called Real Time Application (RTA) traffic and will be packetized as RTA packets at the transmitter STA. Also, the data generated from the non-time sensitive applications are called non-RTA traffic and are packetized as non-RTA packets at the transmitter STA. As a consequence, the transmitter STA generates both RTA traffic and non-RTA traffic for communication. The location of the STAs and their transmission links are as shown in this example network topology figure.

When the STA transmits a non-RTA packet, the STA can follow the regular CSMA/CA scheme. When the STA transmits an RTA packet, the STA schedules channel time for transmission in advance. One goal of the disclosed technology is to reduce latency of RTA traffic.

4.3. STA Layer Model

Figure 6:
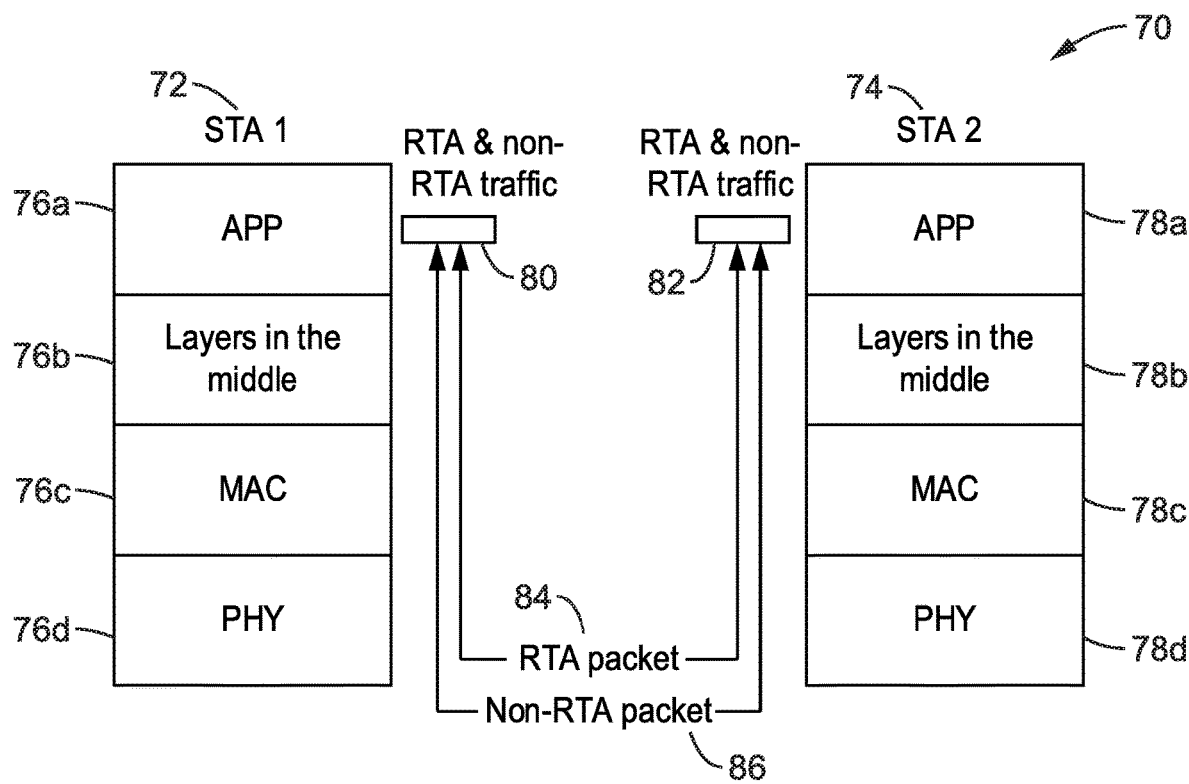
FIG. 6 is a layered communication diagram for RTA and non-RTA traffic communication in an open systems interconnection (OSI) model according to at least one embodiment of the present disclosure.

FIG. 6 illustrates an example embodiment 70 of RTA and non-RTA traffic communication which generally follow an Open Systems Interconnection (OSI) model. In an OSI model there is an Application Layer, Transport Layer, Network Layer (IP), Data Link Layer (MAC), and Physical Layer (PHY). In the present disclosure the transport layer and network layer are merely referred to as Layers in the Middle, with the described protocol (e.g., proposed IEEE802.11 variant/standard) utilizing the MAC and PHY layers.

In this section, the STA layer model for traffic communication is explained. As shown in this example two STAs, STA1 72 and STA2 74 generate RTA traffic and non-RTA traffic 80, 82 and communicate with each other with RTA packets 84 and non-RTA packets 86. The overall process is explained below.

Both RTA traffic and non-RTA traffic are generated by the APP layer 76a, 78a of the respective transmitter STAs. The APP layer of the transmitter STA passes the RTA traffic and non-RTA traffic to the MAC layer 76c, 78c via (through) layers in the middle 76b, 78b. The MAC layer 76c, 78c and the PHY layer 76d, 78d append additional signal fields in the MAC header and PLCP header to the packet, and the packets are transmitted over the PHY layer of the network.

The receiver STA receives the packets at the PHY layer, decodes and sends them to its MAC layer if the packets are decoded correctly, after which the data is fed to its APP layer through (via) layers in the middle.

Figure 7:
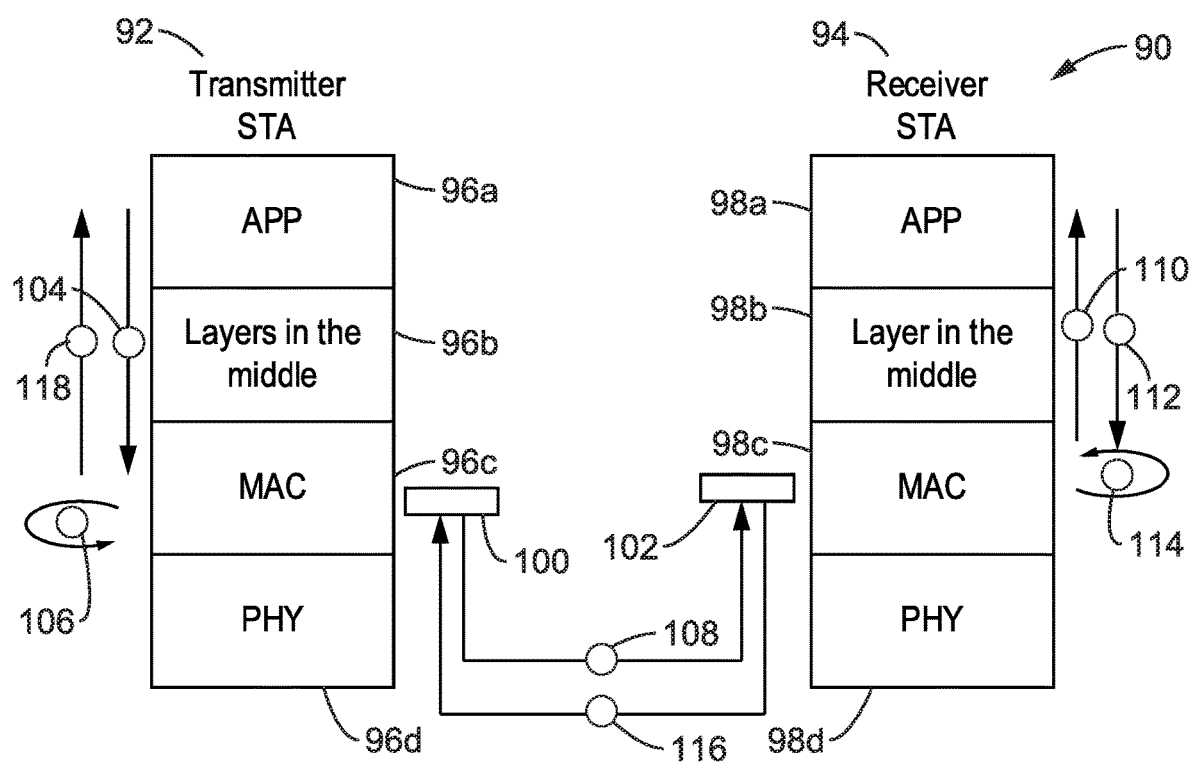
FIG. 7 is a layered communication diagram showing prior negotiation for RTA traffic communications according to at least one embodiment of the present disclosure.

FIG. 7 illustrates an example embodiment 90 of prior negotiation for RTA traffic, and is discussed in Section 4.4.1.

4.4. Mechanism for Identifying RTA and Non-RTA Packets

The disclosed technology classifies packets in the wireless communication system as being either RTA or non-RTA packets. RTA packets use the disclosed technologies for packet transmissions, while non-RTA packets may use the regular CSMA/CA scheme. To that end, the STA identifies and distinguishes between the RTA packet and the non-RTA packet at the MAC layer, as is described in this section.

Figure 8:
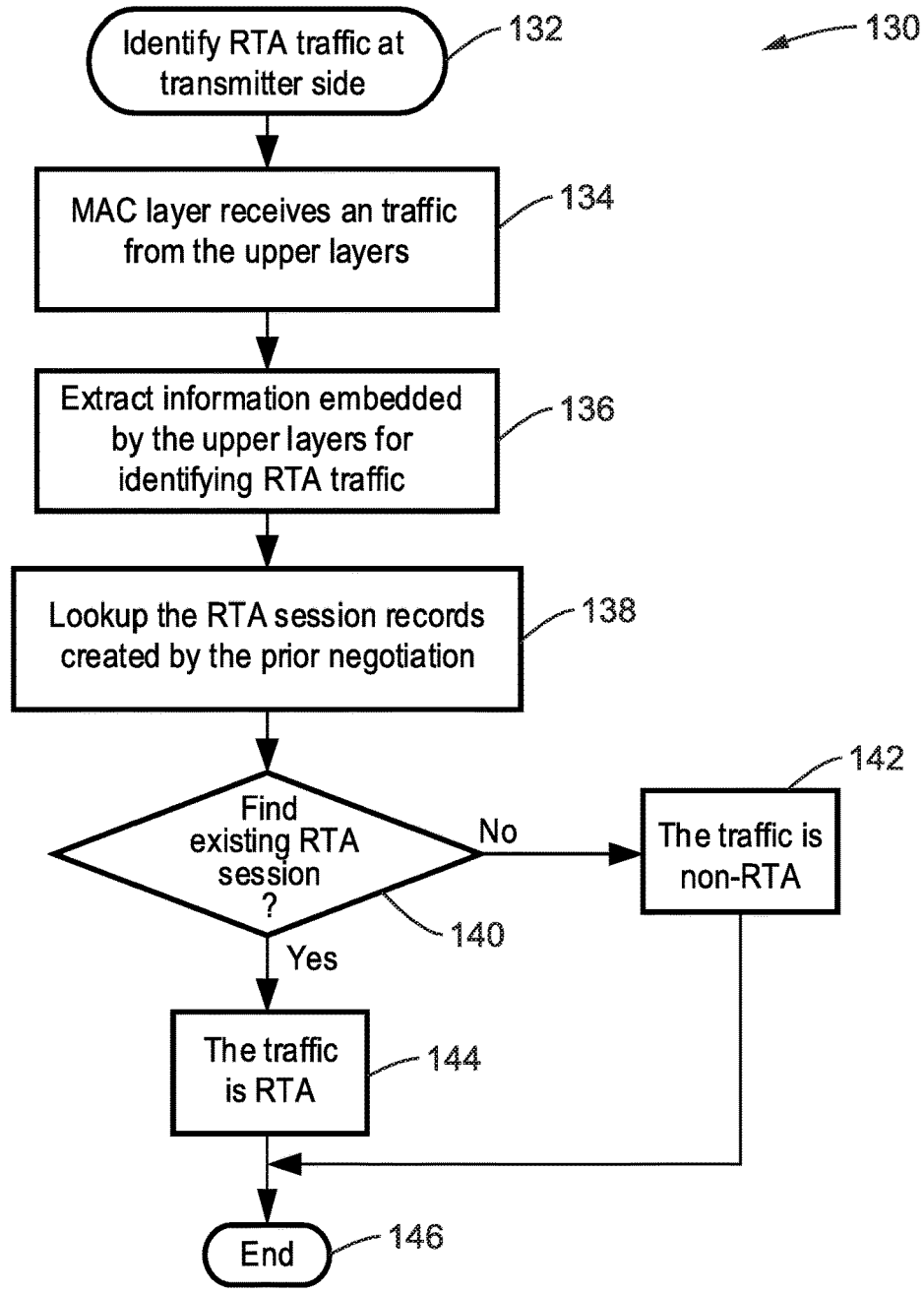
FIG. 8 is a flow diagram of identifying RTA packet traffic on the transmitter side according to at least one embodiment of the present disclosure.

FIG. 8 illustrates an example embodiment 130 of a STA layer model, within which the MAC layer of the transmitter STA can identify RTA traffic and non-RTA traffic 132 from the upper layers and packetize them into RTA packets and non-RTA packets, respectively. This section provides the details of how the transmitter STA identifies the RTA traffic using prior negotiation.

According to the depicted STA layer model the transmitter STA transmits the packets to the receiver STA over the PHY layer of the network. When the receiver STA receives 134 the packet at the MAC layer, it is able to identify the RTA packet and non-RTA packet based on extracting 136 the information embedded in the MAC header or Physical Layer Convergence Protocol (PLCP) header. This section provides the details on how the receiver STA identifies the RTA packet based on the PLCP or MAC header information. The discussion of FIG. 8 will continue in the following sections.

The RTA traffic has to be communicated within a given lifetime to assure data validity. In other words, if the RTA traffic is not received by the receiver before this lifetime expires, the RTA traffic is invalid and can be discarded. The STA packetizes the RTA traffic into RTA packets for transmitting through the PHY layer. Hence, the RTA packet also has a lifetime for its transmission. This section provides details of how the STA copes with the lifetime expiration of the RTA packet.

4.4.1. Prior Negotiation

Often, real time applications (RTAs) generate traffic periodically, just as with connection-oriented communication. RTA connection-oriented communications established by an application between STAs is called an RTA session. It is possible that STAs can have multiple RTA sessions in the network. Each STA according to the present disclosure is able to manage those RTA sessions properly.

Before an RTA session starts transmitting RTA traffic, a prior negotiation occurs between the transmitter STA and the receiver STA to establish the connection. During the prior negotiation, the transmitter STA and the receiver STA record the RTA session with the RTA session identifying information that can be used for identifying the RTA traffic at the MAC layer of the transmitter side and the RTA packet at the MAC layer of the receiver side.

As was shown in FIG. 6, when the APP layer passes the traffic to the MAC layer on the transmitter side, the layers in the middle add header information to the traffic. When the MAC layer of the transmitter STA receives traffic from the upper layers as seen in block 134 of FIG. 8, it extracts 136 the header information from the upper layers and looks up 138 (searches) the RTA session records created by the prior negotiation. If the header information matches one RTA session 140 in the records, the traffic is RTA 144; otherwise, the traffic is considered non-RTA 142, and in either case the process ends 146. The header information that could be used for identifying RTA traffic is listed in Table 1. In this section, the details of the prior negotiation are described.

According to the prior negotiation results, it is also possible that the receiver STA classifies the RTA and non-RTA packets by the channel resource for packet transmission, such as time, frequency, and other metrics. When a packet is received using the channel resource that is granted for an RTA packet, then the STA identifies it as an RTA packet. Otherwise, that packet is considered a non-RTA packet. This scenario will be used when the packet is transmitted in multi-user uplink mode.

In FIG. 7 prior negotiation is shown between transmitter 92 and receiver 94 for RTA traffic packet 100 at transmitter side and packet 102 at receiver side. It should be appreciated that one prior negotiation establishes one RTA session and could be used for all the RTA packets generated by that RTA session. The figure shows prior negotiation for establishing an RTA session between two STAs in a STA layer model as was seen in FIG. 6. A transmitter STA 92 is shown having layers APP 96a, layers in the middle 96b, MAC layer 96c and PHY layer 96d with a receiver STA 94 having the same layers APP 98a, layers in the middle 98b, MAC layer 98c and PHY layer 98d. The process of the prior negotiation is explained below.

Referring to FIG. 7, the following steps are seen. The APP layer 96a of transmitter 92 requests 104 a resource (e.g., time, channel) negotiation. Thus, on the transmitter STA side, the APP layer starts an RTA session and requests a negotiation of the channel resources, such as time and bandwidth, for its RTA traffic transmission. This negotiation request is transmitted from the management entity in the APP layer to the management entity residing in the MAC layer.

The MAC layer of the transmitter STA receives the negotiation request from the upper layer and checks 106 resource availability on its side. Also, it records the RTA session identifying information provided by the upper layers for identifying RTA traffic in the session. The record of the identifying information could be picked (selected) from the information listed in Table 1, such as TCP/UDP port number, the type of service, and so forth. It may deny the request from the upper layer, such as if the resource is unavailable, or re-negotiate with the upper layer.

If the MAC layer of the transmitter STA finds the resource available, it sends 108 a negotiation request frame to the MAC layer of the receiver STA. The negotiation frame contains the identifying information of the RTA session so that the receiver can record and use it afterwards.

After the MAC layer of the receiver STA receives the negotiation request frame, it first informs 110 its APP layer to get ready for receiving RTA packets by sending a negotiation request from the management entity in the MAC layer to the management entity in the APP layer. The negotiation may fail if the APP layer is not available for RTA transmission.

The APP layer of the receiver grants the availability of resources at its layer and sends 112 this information from the management entity in the APP layer to the management entity that resides in the MAC layer.

Then, the MAC layer of the receiver STA checks 114 the resource availability on its side. The MAC layer can deny or re-negotiate if the resource is unavailable. The MAC layer of the receiver STA collects all the negotiation information on its side and reports it 116 to the MAC layer of the transmitter.

The MAC layer of the transmitter receives the negotiation result and forwards it 118 to its APP layer. If the negotiation succeeds, the APP layer can start to transmit RTA traffic using the resource granted by both STAs.

According to the RTA session records created by the prior negotiation, the MAC layer of the transmitter STA identifies the RTA traffic and non-RTA traffic by the header information from the upper layers. When the APP layer generates RTA traffic, the RTA traffic is passed to its MAC layer with the header information provided by the layers in the middle. By looking up the RTA session records created by the prior negotiation, the transmitter STA is able to use that header information to identify the RTA traffic and packetizes the RTA traffic into RTA packet at the MAC layer.

Returning again to FIG. 8 for identifying RTA packet traffic on the transmitter side. The routine starts 132 and the MAC layer of the transmitter STA receives traffic 134 from the upper layer. The MAC layer extracts 136 information embedded by the upper layer for identifying RTA traffic, and is checking the header information of the upper layers, such as the type of service and the TCP/UDP port number. The MAC layer of the transmitter STA compares (looks up) 138 the header information from the upper layers with the RTA session records created by the prior negotiation. A check 140 is made on the header information. If the header information from the upper layers matches an RTA session in the record, then block 144 is reached with the traffic determined to be RTA traffic, otherwise block 142 is reached with the traffic considered to be non-RTA traffic, after which processing ends 146.

4.4.2. Packet Header Information

Figure 9:
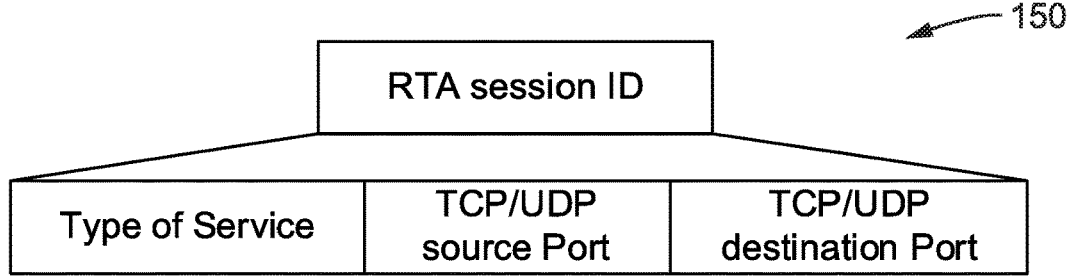
FIG. 9 is a data field diagram of RTA session identifying information according to at least one embodiment of the present disclosure.

FIG. 9 illustrates an example embodiment 150 of an RTA session identification information format. When the transmitter STA generates RTA packets, it adds additional signal fields in the PLCP or MAC header. When the additional signal field contains the RTA session identifying information, the receiver STA can use the RTA session identifying information in the PLCP or the MAC header to distinguish at the MAC layer between an RTA packet and a non-RTA packet. One example of the RTA session identifying information is shown in the figure, containing Type of Service, TCP/UDP Source Port, and TCP/UDP Destination Port.

Figure 10:
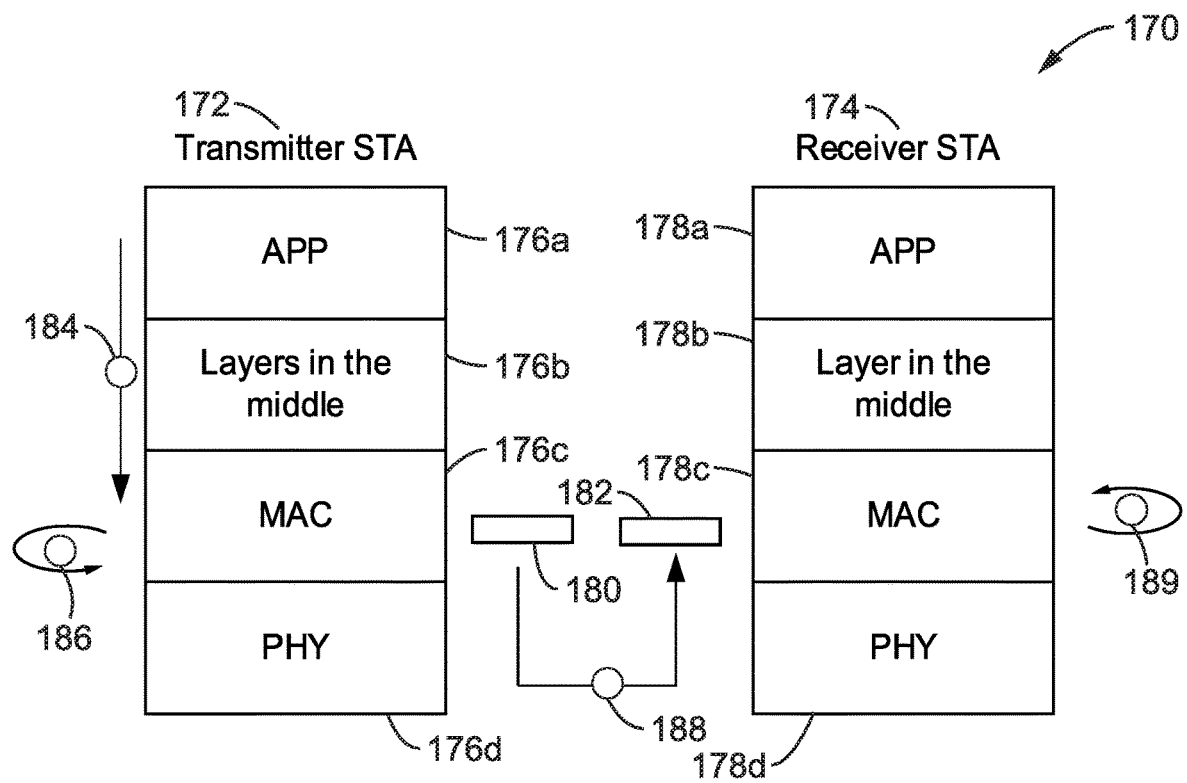
FIG. 10 is a layered communication diagram of header information exchange according to at least one embodiment of the present disclosure.

FIG. 10 illustrates an example embodiment 170 of header information exchange 180, 182 between the APP layer and MAC layer. A transmitter STA 172 is seen with APP layer 176a, layers in the middle 176b, MAC layer 176c, and PHY layer 176d. A receiver STA 174 is seen with the same layers APP layer 178a, layers in the middle 178b, MAC layer 178c, and PHY layer 178d.

The figure depicts details of how this process works between two STAs in the STA layer model. The APP layer of the transmitter STA generates 184 RTA traffic and passes it to the MAC layer. When the traffic is passed through the layers in the middle, the header information, such as the type of service field and the TCP/UDP port numbers are added to the traffic.

When the MAC layer of the transmitter STA receives the RTA traffic from the upper layer, it extracts the header information, such as the type of service and the TCP/UDP port numbers from the traffic. By looking up the RTA session records created by the prior art, the MAC layer identifies 186 the traffic is RTA.

Then the MAC layer of the transmitter STA packetizes the traffic into an RTA packet 180 and embeds the type of service and the TCP/UDP port numbers in the MAC header or the PLCP header as the RTA session identifying information. One example of the RTA session identifying information was shown in FIG. 9. Next, the transmitter STA sends 188 the RTA packet to the receiver STA which receives it as packet 182. When the receiver STA receives the RTA packet at its MAC layer, it can identify 189 the RTA packet based on the RTA session identifying information in the PLCP or the MAC header.

Figure 11:
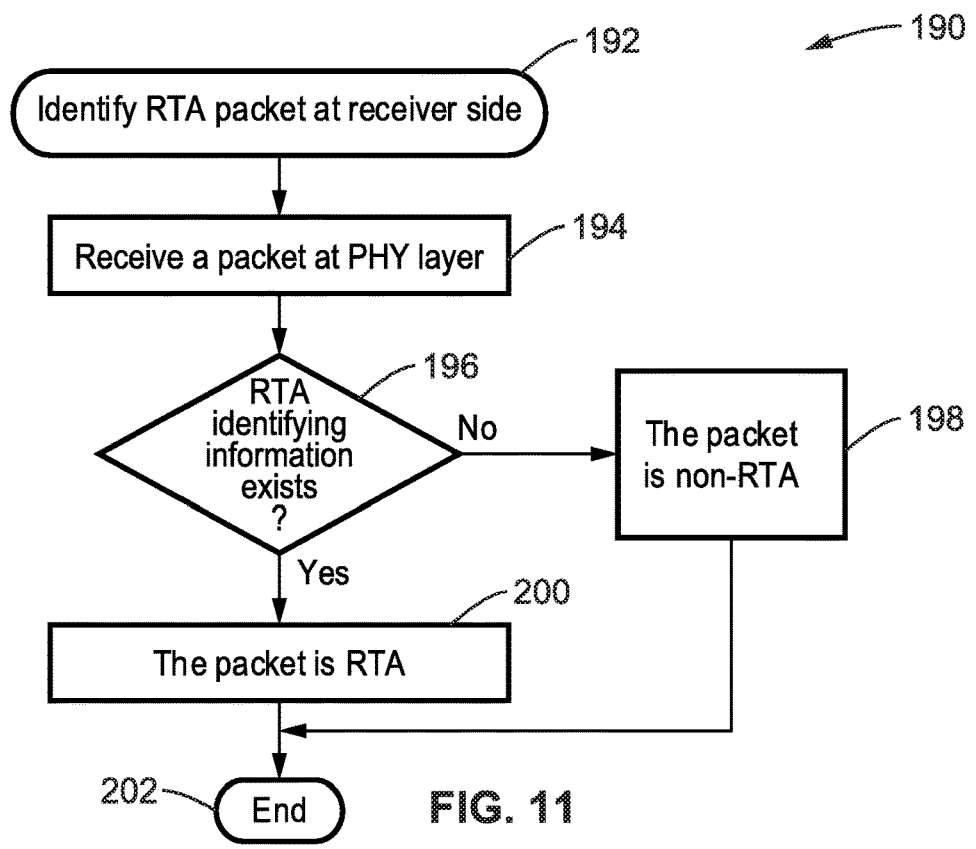
FIG. 11 is a flow diagram of identifying an RTA packet on the receiver side at the MAC layer according to at least one embodiment of the present disclosure.

FIG. 11 illustrates an example embodiment 190 of a process for identifying an RTA packet on the receiver side at the MAC layer. The process starts 192 and the receiver receives a packet at the PHY layer 194. As explained in FIG. 10, the MAC header or the PLCP header of RTA packets includes the identifying information of an RTA session. Referring again to FIG. 11 a check is made 196 to determine if the identifying information exists. If the identifying information exists, then execution moves to block 200 as the receiver STA has determined that the packet is an RTA packet. Otherwise, if the information does not exist, then execution moves from block 196 to 198, as it has been determined that the packet is a non-RTA packet. After which the process ends 202.

4.5. RTA Queue System

This section describes the details of the RTA queue system, including the general structure, the interworking model of network layers, and the queue management operations. An RTA queue system uses the information of an RTA session to map the packets generated by that RTA session to the specific RTA queues. The RTA packets in different RTA queues will be transmitted according to the operating rules of the queues.

4.5.1. RTA Queues Structure

Figure 12:
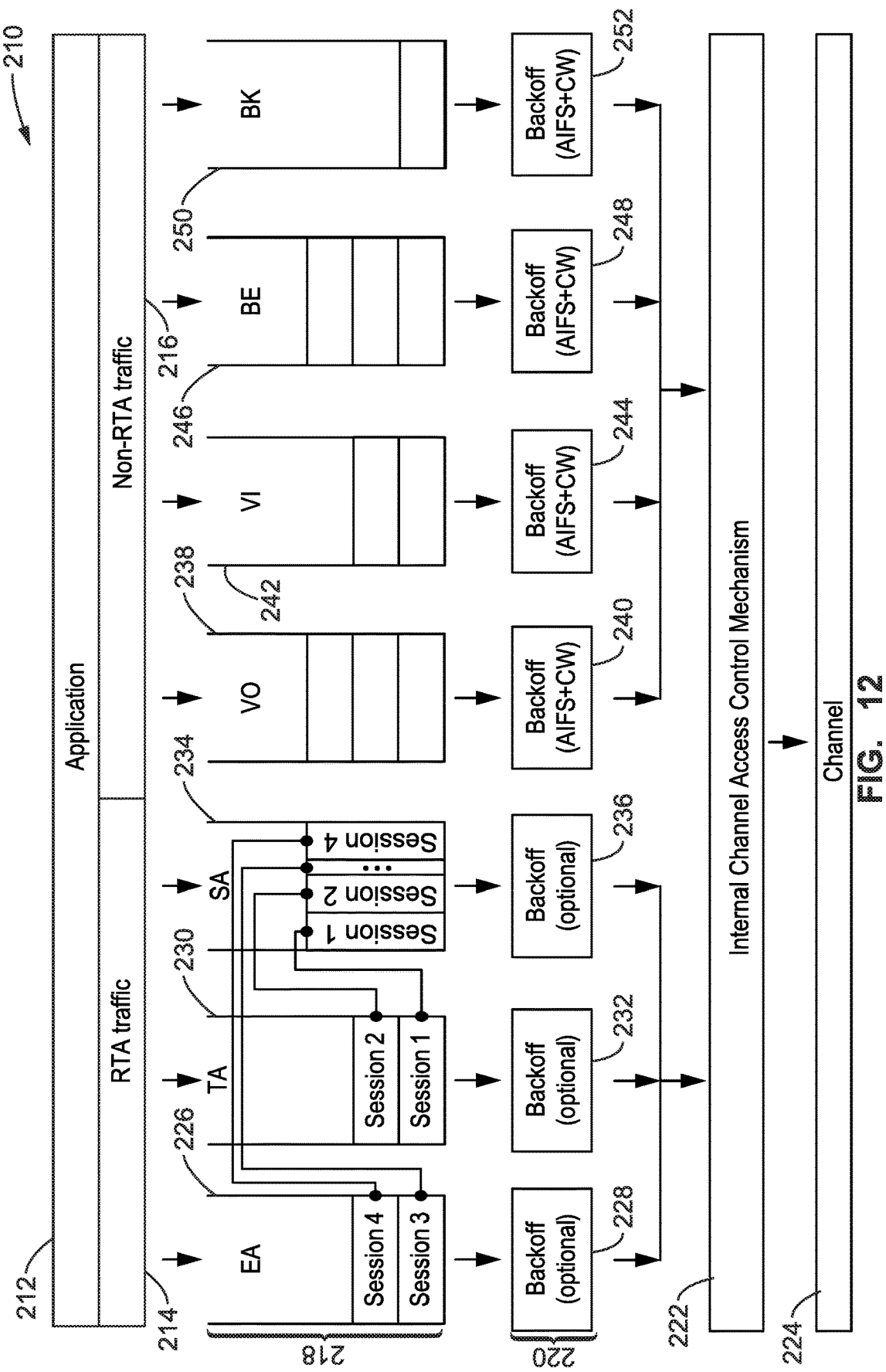
FIG. 12 is a queue diagram of the RTA queue system according to at least one embodiment of the present disclosure.

FIG. 12 illustrates an example embodiment 210 of an RTA queue system (structure) at the MAC layer. The application layer 212 generates RTA 214 and non-RTA traffic 216, which it passes to the MAC layer. The MAC layer is configured with multiple queues 218 to store that traffic as it waits in the queue for transmission. As shown in the figure, there are RTA queues that are used to store RTA traffic and non-RTA queues that are used to store non-RTA traffic. The non-RTA queues and their queue management operations are the same as shown in FIG. 3, and are depicted as voice (VO) 238, video (VI) 242, best-effort (BE) 246, and background (BK) 250 queues. An RTA packet can be pushed to multiple RTA queues 226, 230 and 234. Below the queues 218 are shown channel access backoffs 220, these are depicted 228, 232, 236, 240, 244, 248 and 252 for each of the queues, and connected to an Internal Channel Access Control Mechanism 222 coupled to channel 224.

The same packets contained in different RTA queues are shown in the figure as being linked. For example, the packet of session 4 in EA queue and SA queue is one packet. The RTA queues have three types according to the channel access methods of the queues:

Emergency channel access (EA) queue 226: This queue is designed to transmit RTA packets that require minimum transmission latency. The EA queue is always open and allowed to gain channel access for packet transmission.

Time-allocated channel access (TA) queue 230: This queue is designed to transmit RTA packets using the allocated channel time. The TA queue is only allowed to transmit RTA packets during the channel time that is allocated to this queue.

Session-based channel access (SA) queue 234: This queue is designed to transmit certain RTA session packets. The SA queue is allowed to transmit packets when the packets of a certain RTA session is required by STAs. It will be noted that the packets shown vertically in the queue denote their session nature (versus temporal nature), containing some information from different sessions in each packet. For example, as shown in FIG. 12, if STA is requested to transmit packet of RTA session 4, it transmits the packet of RTA Session 4 in the SA queue.

In the disclosed RTA queue system, several control mechanisms are configured to interoperate (work together cooperatively) to provide for efficient queuing. A queue classification mechanism is configured for classifying RTA packets and mapping them into different RTA queues. An expired packet operation mechanism is configured for defining the operation to the RTA packets when they are found to be expired within the RTA queues. For example the operation could be dropping the expired RTA packet or moving the expired RTA packet from an RTA queue to a non-RTA queue. A queuing discipline mechanism is configured for providing one or more methods of sorting the RTA packets in the RTA queue to ensure that the RTA packets meet their latency requirements. An internal channel access control mechanism is configured for coordinating channel access among all the RTA and non-RTA queues and avoiding contention collision between the queues. A queue channel resource limitation mechanism is configured for preventing RTA queues from utilizing (occupying) an unacceptably large amount (too much) of the existing channel resources.

Before a STA transmits the packets in RTA queues, it can wait a backoff time to gain channel access or not. It depends on the channel access method when it transmits the packet. For example, if a STA uses CSMA/CA to access the channel for transmitting packets in RTA queues, then the backoff time is needed. If the STA uses scheduled channel time to access the channel for transmitting packets in RTA queues, then the backoff time may not be needed, and is often described herein as being "optional". One example could be given in the network topology as shown in FIG. 5. STA 0 and STA 5 (two APs) have channel scheduling information for each other. When STA 0 schedules a certain period of time for transmitting packets in RTA queues, then STA 5 and its associated STAs remain quiet (not accessing the channel) and do not generate interference. STA 0 is the only STA allowed to access the channel; it does not require backoff time to contend for the channel.

4.5.2. Queue Configuration of RTA Session

When RTA sessions generate RTA packets, the RTA packets need to be pushed to different RTA queues according to their latency requirements. Thus, an RTA session needs to set the queue configuration for its RTA packets. It is possible that the queue configuration of an RTA session could be set when initiating that RTA session.

When a STA records an RTA session, it collects information on that RTA session which could be used to track the session. In order to track the RTA session, the RTA session has numerous forms of information, such as including each of the following: (a) identifying information to identify the RTA session and distinguish with other RTA sessions; (b) status information to report the recent status of the RTA session; (c) requirement information to indicate the transmission quality requirement of the RTA traffic generated by the RTA session; (d) transmission information to show channel resources that are distributed to the RTA traffic generated by the RTA session; and (e) queue information to show the RTA queue configuration for the RTA packets generated by this RTA session.

FIG. 13 illustrates an example embodiment 260 RTA session information, which contains the following groups of data: Identifying Information 265, Status Information 270, Requirement Information 275, Transmission Information 280, and Queue Information 285.

The identifying information 265 is from the MAC header, such as Source MAC Address and Destination MAC Address, and that is from the layers above the MAC layer as listed in Table 1, such as Session ID, Type of Service, Source IP Address, Source Port, Destination IP Address, Destination Port.

The status information 270 is shown for example as Session Status, Comment, and Last Active Time. The session status shows whether the RTA session is set to generate traffic or not. Table 2 lists the possible RTA session status. When the RTA session status is active, the RTA session is enabled and generating RTA traffic. When the RTA session status is inactive, the RTA session is disabled to not generate RTA traffic by the user. When the RTA session status is error, the RTA session is not able to generate or transmit RTA traffic because of the error. The comment can be used to show the details of the RTA session status. It can be used to carry warning or error messages. For example, the comment could show the transmission quality is poor when a large number of RTA packets are corrupted in this session. The last active time could be used to trigger some event to check the status of the RTA session. The last active time is updated every time when RTA packet transmission occurs for the RTA session. This information can be used to track whether the RTA traffic is generated or delivered regularly. If the last active time is not updated for a certain period of time, then the RTA session is not generating or delivering RTA traffic. In at least one embodiment the RTA session status is checked to determined whether any errors have occurred.

Requirement information 275 can include Bandwidth Requirement, Delay Requirement, Jitter Requirement, Periodic Time, Priority, Session Start Time, and Session End Time. The bandwidth requirement indicates the amount of the RTA traffic to transmit. The delay requirement indicates the transmission delay of the RTA packets. The jitter requirement indicates the maximum difference in the RTA packet delay during each periodic transmission time. The periodic time indicates the duration of time that RTA session generates RTA traffic once, that is to say that the RTA session generates traffic every periodic time. The priority indicates the priority of the RTA traffic. The RTA traffic with higher priority should be transmitted first. The session start time and end time indicates the start time and the end time of the RTA session.

Transmission information 280 can include Time Allocation, RU Allocation, and SS Allocation. The time allocation indicates the channel time that is distributed to the RTA session for transmission. The RU allocation indicates the resource unit (RU) of the channel that is distributed to the RTA session for transmission. The RU is a unit in OFDMA terminology used in IEEE 802.11ax. It decides which channel frequency to use for transmission. The SS allocation indicates the spatial stream allocation for the RTA session traffic transmission. The SS allocation could be a unit in MIMO terminology used in IEEE 802.11 or an index of directional antenna pattern in beamforming terminology.

Queue information 285 can include Initial Queue Types, Expiration Time, Drop Expired Packet, and Expired Queue Type. The initial queue types indicate which RTA queues the traffic should be pushed to when it is generated by the RTA session. It is also possible that the initial queue type is used to indicate a non-RTA queue. The expiration time represents the time that the RTA packets generated by this RTA session will be out-of-date. The drop expired packet shows whether the expired RTA packet in the RTA queues will be dropped or be moved to non-RTA queues. The expired queue indicates which queue the traffic of the RTA session should be pushed to after it is expired.

When the RTA user initiates an RTA session, the initiation procedure is launched by the application layer and executed at the MAC layer as explained in FIG. 7. There are two types of communications: (1) a type of communication occurs between the different network layers in one STA; (2) the second type of communication occurs between the MAC layers of two STAs.

When communications between different network layers in one STA occur, the RTA user can initiate an RTA session through the cross-layer interfaces. In FIG. 7 was shown an interworking model for the RTA queue system. The RTA user can communicate and exchange information with the MAC layer and the higher layers. The RTA user can provide multiple RTA services to the MAC layer. For example, the STA can initiate an RTA session and configure RTA queues through RTA management in the Station Management Entity (SME) at the MAC layer. Then, according to the information, the SME can take action at the MAC layer through the MAC Sublayer Management Entity Service Access Point (MLME SAP) interface.

When the RTA user initiates an RTA session, the initiation procedure is launched by the application layer and executed at the MAC layer as explained in FIG. 7. There are two types of communications. A first type of communication occurs between the different network layers in one STA, while a second type of communication occurs between the MAC layers of two STAs.

Figure 14:
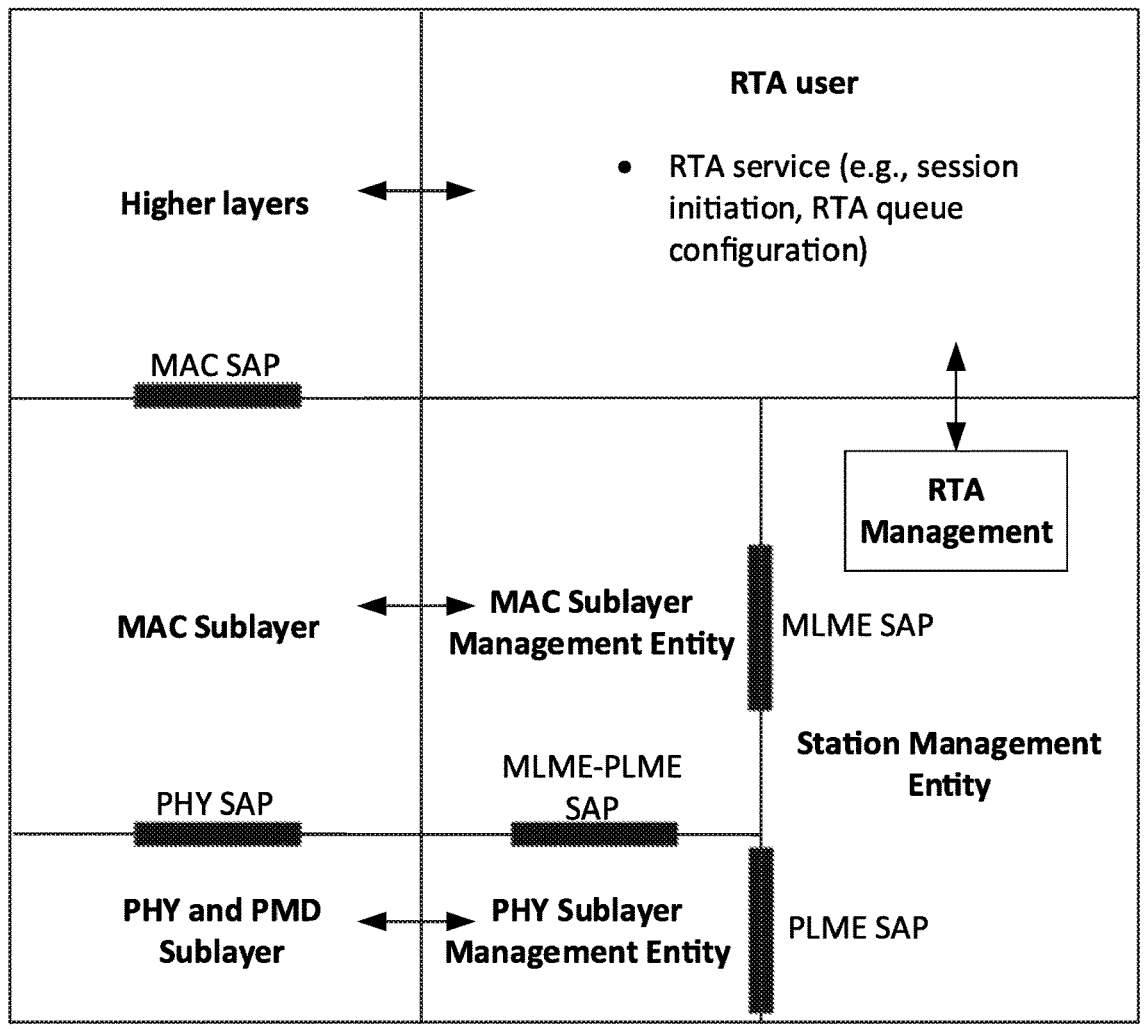
FIG. 14 is an interworking model for the RTA queue system according to at least one embodiment of the present disclosure.

FIG. 14 illustrates an example embodiment 290 of RTA queue system interworking. When the communication between the different network layers in one STA occurs, the RTA user could initiate an RTA session through the cross-layer interfaces. The RTA user can communicate and exchange information with the MAC layer and the higher layers. The RTA user can provide multiple RTA services to the MAC layer. For example, the STA can initiate an RTA session and configure RTA queues through an RTA management in the Station Management Entity (SME) at the MAC layer. Then, according to the information, the SME is able to take action at the MAC layer through the MAC Sublayer Management Entity Service Access Point (MLME SAP) interface.

Figure 15:
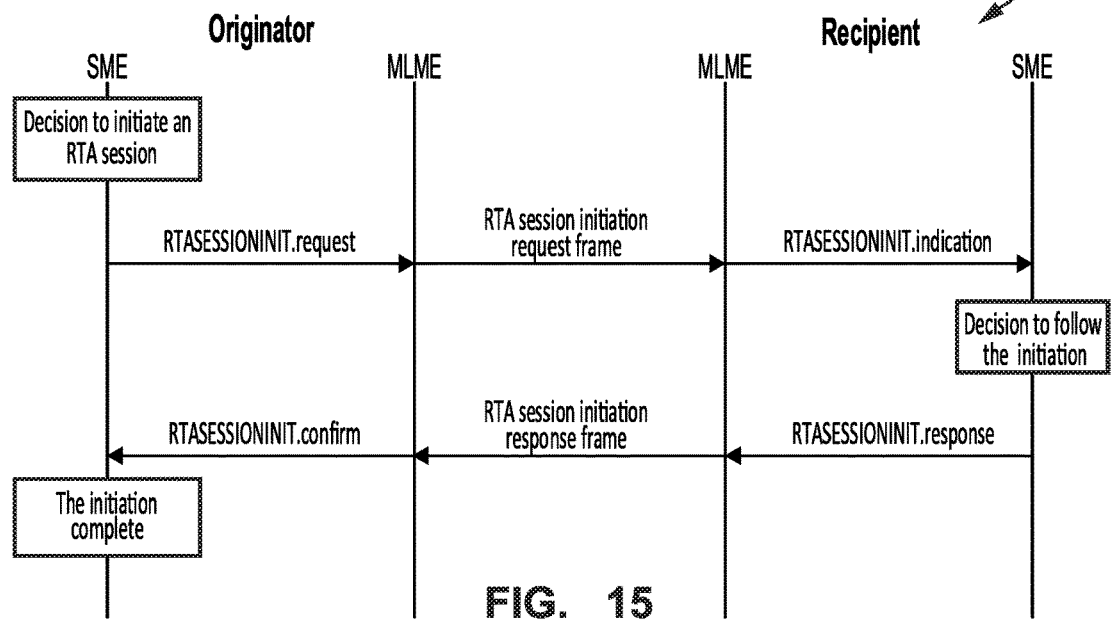
FIG. 15 is an interlayer communication diagram showing an RTA session initiation process according to at least one embodiment of the present disclosure.

FIG. 15 illustrates an embodiment 310 exemplifying message exchange between the MAC layer of two STAs. When the originator STA decides to initiate an RTA session, the SME of the originator STA sends an RTASESSIONINIT.request message to the MLME via MLME SAP interface. The format of the RTASESSIONINIT.request message is explained in Table 3. When the MLME of the originator STA receives the RTASESSIONINIT.request message, it collects the RTA session information in the RTASESSIONINIT.request message and sends an RTA session initiation request frame to the recipient STA. The format of the RTA session initiation request frame is shown below. The MLME of the recipient STA receives the frame and generates an RTASESSIONINIT.indication message as shown in Table 4 to its SME through the MLME SAP interface. As explained in FIG. 7, the MAC layer and the upper layer of the recipient STA need to check the resource availability and decide whether to grant the RTA session initiation request. Then, the SME of the recipient STA sends an RTASESSIONINIT.response message containing feedback information to its MLME. The format of RTASESSIONINIT.response message is explained in Table 5. Then, the MLME of the recipient STA sends an RTA session initiation response frame to the originator STA. The MLME of the originator STA receives the frame and sends an RTASESSIONINIT.confirm message, as shown in Table 6, to its SME. The SME of the originator then informs the RTA users whether the initiation of the RTA session was successful or not.

Figure 16:
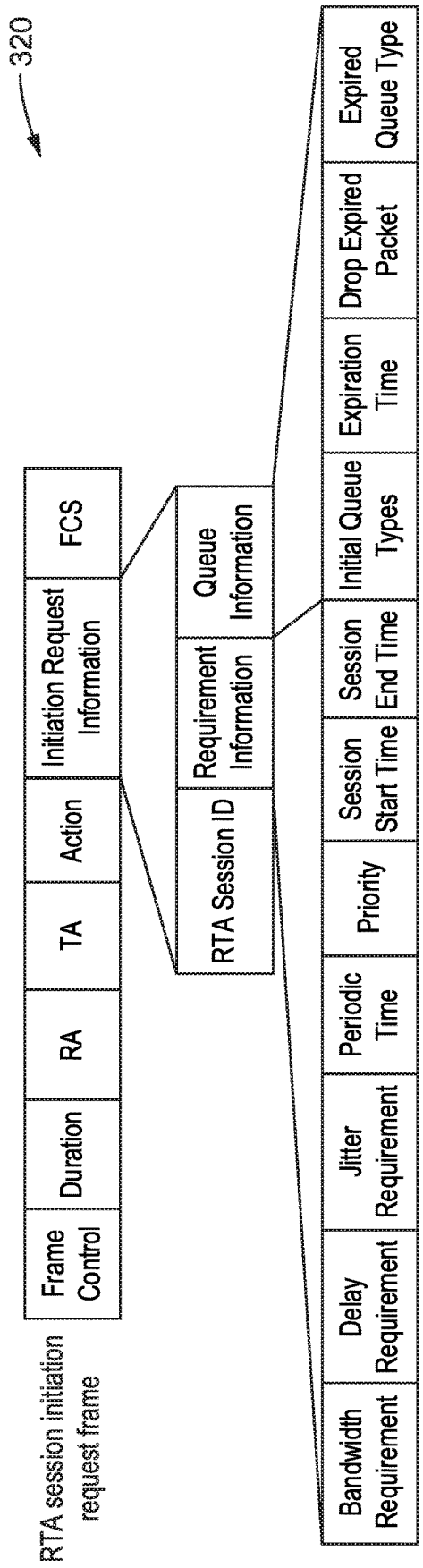
FIG. 16 is a data field diagram of an RTA session initiation request frame according to at least one embodiment of the present disclosure.

FIG. 16 illustrates an example embodiment 320 of RTA session initiation request frame. A Frame Control field indicates the type of frame. A Duration field contains NAV information used for CSMA/CA channel access. An RA field contains an address for the recipient of the frame. A TA field contains the address of the STA that transmits the frame. An Action field indicates the type of management frame. In this instance, it indicates that the management frame is RTA session initiation request frame. An Initiation Request Information field follows the Action field when the Action field indicates that the frame is RTA session initiation request frame, and contains the fields as follows. An RTA Session ID field which provides identifying information of the RTA session. The content of this field is shown in FIG. 9. A Resource Requirement field indicates requirement information of the RTA session as was described in FIG. 13. A Bandwidth Requirement field indicates the amount of the RTA traffic to transmit. A Delay Requirement field indicates the transmission delay of the RTA packets. A Jitter Requirement field indicates the maximum difference in the RTA packet delay during each periodical transmission time. A Periodic time field indicates the duration of time that the RTA session generates RTA traffic once. A Priority field indicates the priority of the RTA traffic. A Session Start Time field indicates the start time of the RTA session. A Session End Time field indicates the end time of the RTA session. A Queue Information field contains queue information of the RTA session as described in FIG. 13. An Initial Queue Types field indicates which RTA queues the traffic should be pushed to when it is generated by the RTA session. An Expiration Time field indicates the time that the RTA packet is allowed to stay in RTA queues. A Drop Expired Packet field indicates whether the expired RTA packet in the RTA queues will be dropped or be moved to non-RTA queues. In the examples, this is a one-bit field that when set to a first state (e.g., "1") indicates that the expired RTA packet will be dropped from the queue system. When this field is set to a second state (e.g., "0"), the expired RTA packet will be moved from the RTA queues to non-RTA queues. An Expired Queue Type field indicates which queue the traffic of the RTA session should be pushed to after it has expired.

Figure 17:
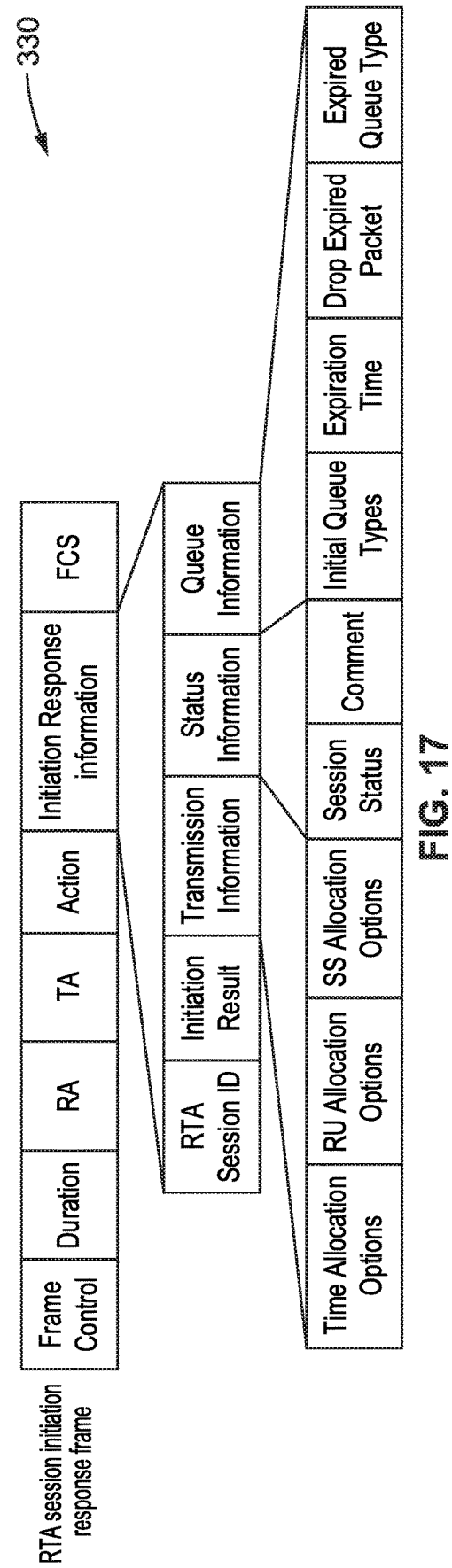
FIG. 17 is a data field diagram of an RTA session initiation response frame according to at least one embodiment of the present disclosure.

FIG. 17 illustrates an example embodiment 330 of the RTA session initiation response frame having the following fields shown in hierarchy. A Frame Control field indicates the type of frame. A Duration field contains NAV information used for CSMA/CA channel access. An RA field contains an address for the recipient of the frame. A TA field contains the address of the STA that transmitted the frame. An Action field indicates the type of management frame. For the current example, it indicates that the management frame is an RTA session initiation response frame. An Initiation Response Information field follows the Action field when the Action field indicates that the frame is an RTA session initiation response frame. It contains the fields as follows. An RTA Session ID field provides identifying information of RTA session, the content of this field is shown in FIG. 9. An Initiation Result field indicates whether the initiation is granted or not. In the example embodiment this is a one bit field (indication), that when set to a first state (e.g., "1"), indicates that the initiation is granted by the other STA; otherwise, this field is set to a second state (e.g., "0"). A Transmission Information field provides transmission information of RTA session as described in FIG. 13. A Time Allocation Options field shows the options of allocation method to distribute the channel time to the RTA session for transmission. An RU Allocation Options field shows the options of allocation method to distribute the resource unit (RU) of the channel to the RTA session for transmission. An SS Allocation Options field indicates the options of allocation method to distribute the spatial stream to the RTA session. A Status Information field contains status information of RTA session as described in FIG. 9. A Session Status field indicates the status of RTA session. A Comment field indicates more details of the RTA session status. which can be used to report the initiation result and its details. A Queue Information field contains queue information of the RTA session as described in FIG. 9. An Initial Queue Types field indicates which RTA queues the traffic should be pushed to when it is generated by the RTA session. An Expiration Time field indicates the time that the RTA packet is allowed to stay in RTA queues. A Drop Expired Packet field indicates whether the expired RTA packet in the RTA queues will be dropped or be moved to non-RTA queues. In this example embodiment this field is a one bit field that when set to a first state (e.g., "1") indicates that the expired RTA packet will be dropped from the queue system; and when this field is set to a second state (e.g., "0") indicates that the expired RTA packet will be moved from the RTA queues to non-RTA queues. An Expired Queue Type field indicates which queue the traffic of the RTA session should be pushed to after it is expired.

4.5.3. RTA Queue Classification

The queue classification mechanism is used to classify RTA packets and push them into different RTA queues. This section provides the details of how the queue classification mechanism works based on the RTA session information of the packets.

Figure 18:
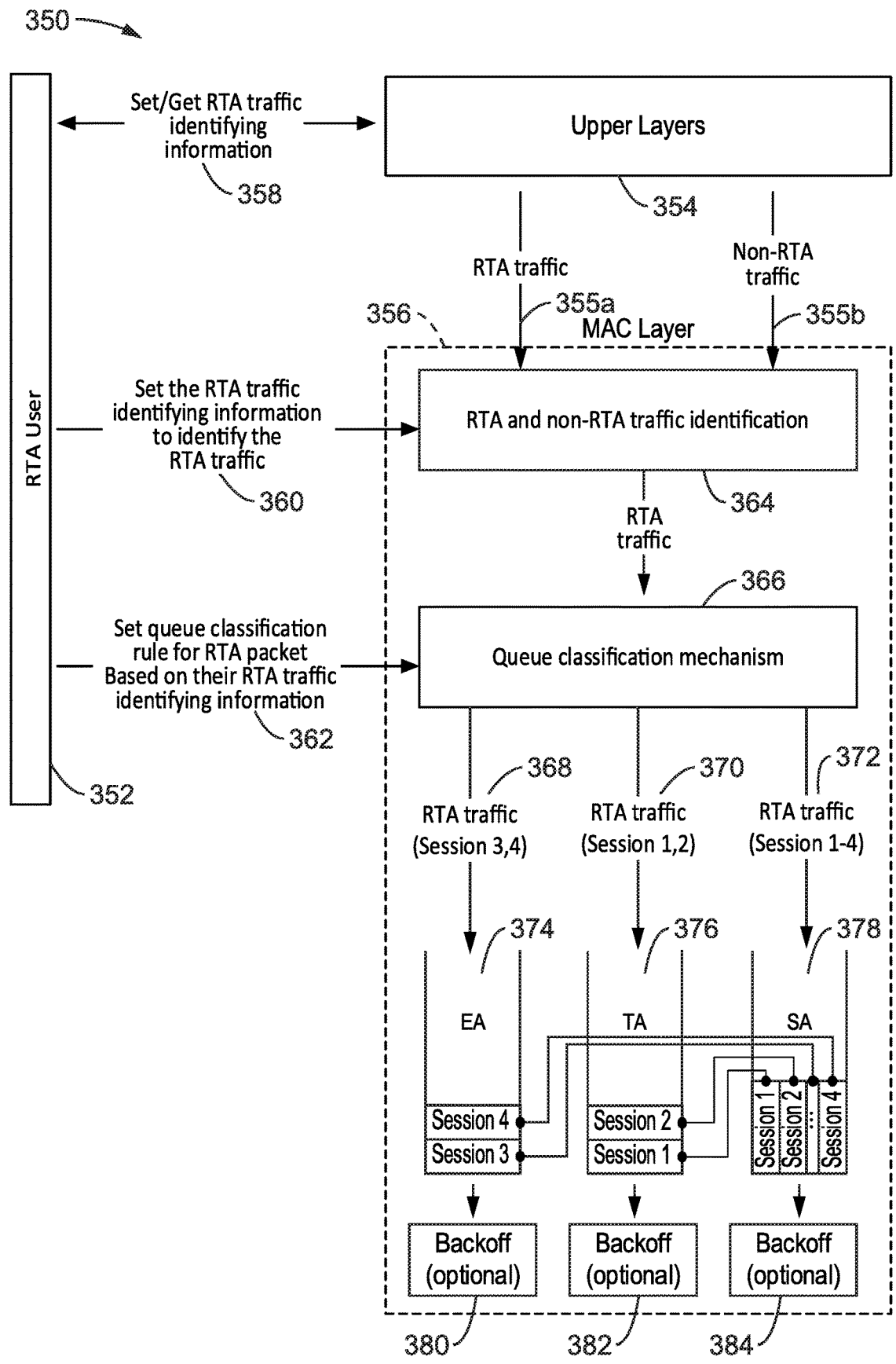
FIG. 18 is a cross-layer diagram of queue classification according to at least one embodiment of the present disclosure.

FIG. 18 illustrates an example embodiment 350 of a cross-layer model for a queue classification mechanism working with the RTA queue system. An RTA user 352 is able to set or get RTA traffic identifying information 358 in the network layers that are above the MAC layer, seen as upper layers 354. That is, When an RTA session generates RTA traffic, it embeds unique identifying information into its RTA traffic. One example of the RTA session identifying information is shown in FIG. 9. Then, the RTA user can use the identifying information 360 to identify the RTA traffic 355a and non-RTA traffic 355b at the MAC layer 356 using the method as explained in Section 4.4. The RTA traffic will be pushed to the RTA queues and the non-RTA to non-RTA queues.

The queue classification mechanism is added between the RTA and non-RTA traffic identification mechanism and the RTA queues. After the RTA traffic is identified 364, the queue classification mechanism 366 decides which RTA queues that the RTA traffic should be pushed to. The RTA user can set the queue configuration 362 based for each RTA session. The RTA traffic with the same RTA session identifying information will be pushed to the same RTA queues according to the queue configuration of that RTA session. For example, as shown in the figure, all the traffic 370 generated by RTA session 1 and 2 will be pushed to the TA 376 and the SA 378 queues. All the traffic generated 368 by RTA session 3 and 4 will be pushed to the EA 374 and the SA 378 queues, wherein the RTA traffic 372 for Sessions 1-4 are seen in SA queue 378. Each of the queues is shown, respectively, with optional backoff, 380, 382, 384.

4.5.4. Expired RTA Packet Operation

Figure 19:
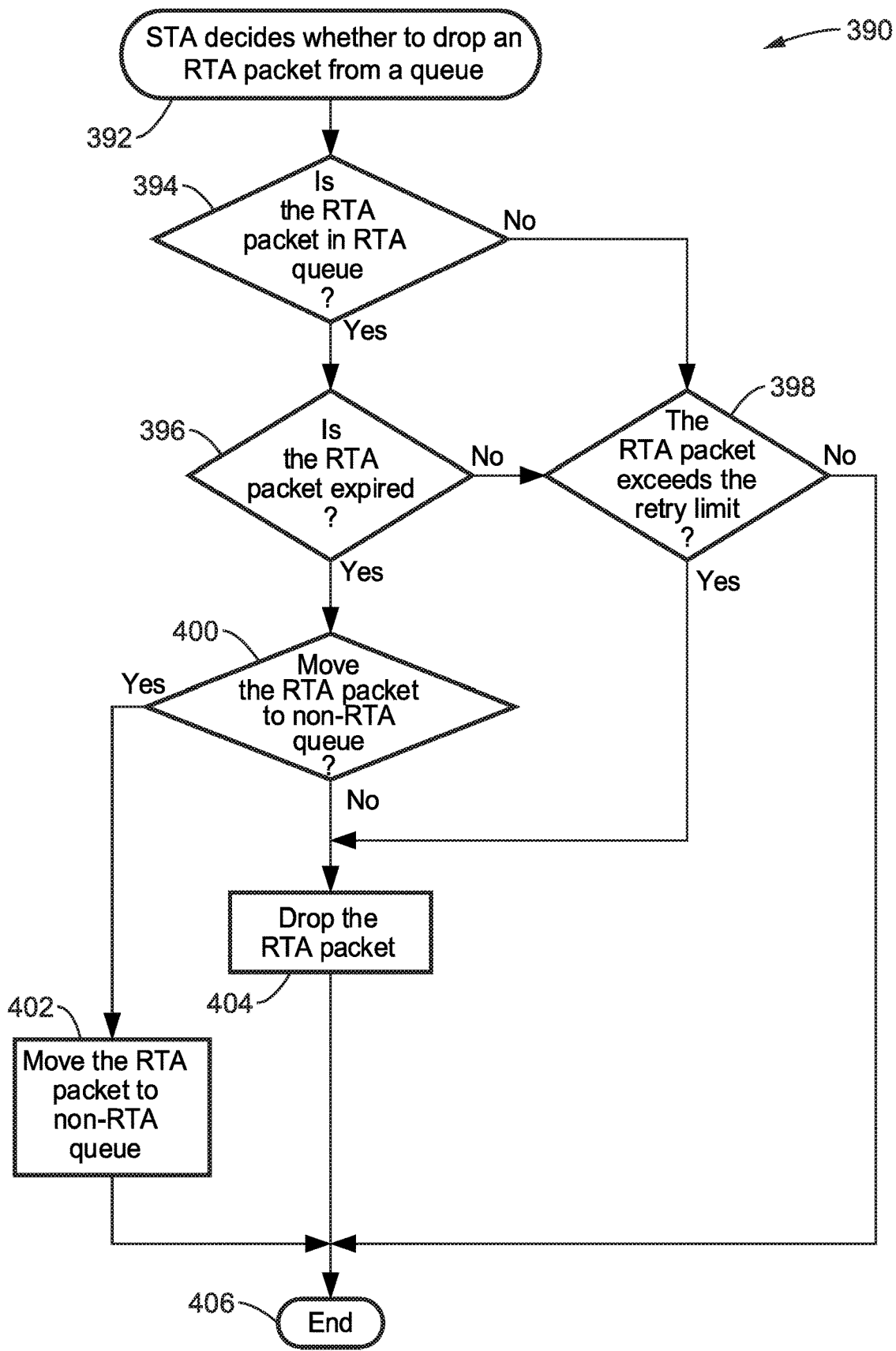
FIG. 19 is a flow diagram of dropping RTA packets from the queue according to at least one embodiment of the present disclosure.

FIG. 19 illustrates an example embodiment 390 of a STA dealing with (handling) an expired RTA packet in the RTA queue. The process of a STA determining whether to drop an RTA packet from the queue commences 392, with the STA first identifying 394 whether this RTA packet is in the RTA queues or non-RTA queues. If the RTA packet is in the non-RTA queue, then execution reaches block 398 with a check to determine if the packets number of retransmissions exceeds the retry limit. If the retry limit has not been exceeded, then execution ends at block 406; otherwise if the retry limit is exceeded, then block 404 is reached which drops the packet before ending 406.

If the check 394 indicates that the packet is an RTA packet in an RTA queue, then check 396 determines if the RTA packet is expired. If the RTA packet has not expired, then execution moves to block 398 with a check on the retry limit to determine whether to drop the packet. However, if it is determined at block 396 that the packet has expired, then execution reaches block 400 which determines whether to move the packet to a non-RTA queue or drop the packet. This decision is configured to be made based on queue information of the RTA session as shown in FIG. 13. If the Drop Expired Packet field in the queue information is set to "1", then the STA drops 404 the RTA packet from the queue system. If the Drop Expired Packet field in the queue information is set to "0", then STA moves this packet to a non-RTA queue, depicted here as execution moving to block 402 before the process ends 406. It will be appreciated that the present disclosure can be configured to make its determination on whether to move or drop a packet, based on other or additional forms of information.

Figure 20:
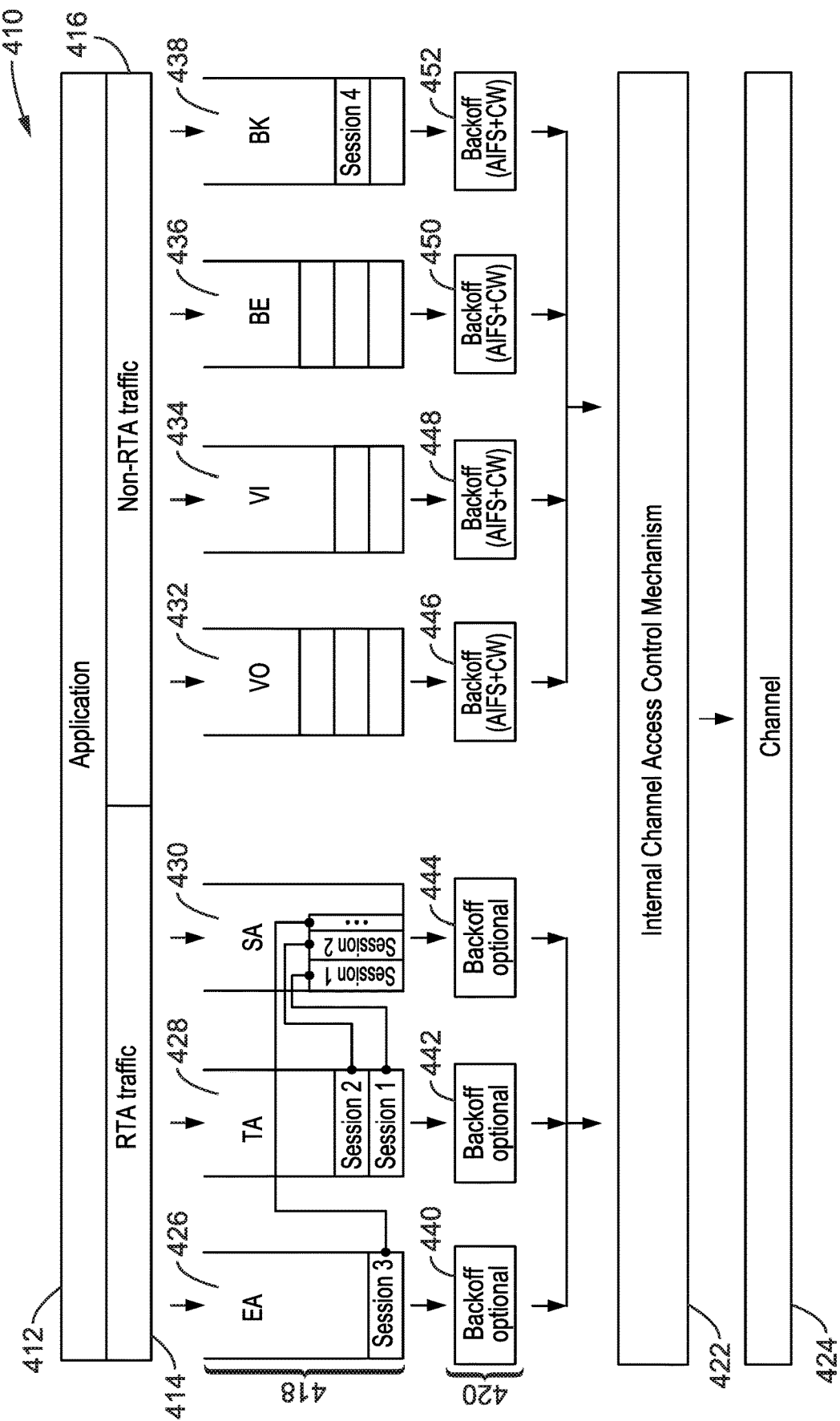
FIG. 20 is a queue diagram exemplifying moving expired RTA packet (Session 4) to a non-RTA queue according to at least one embodiment of the present disclosure.
Figure 21:
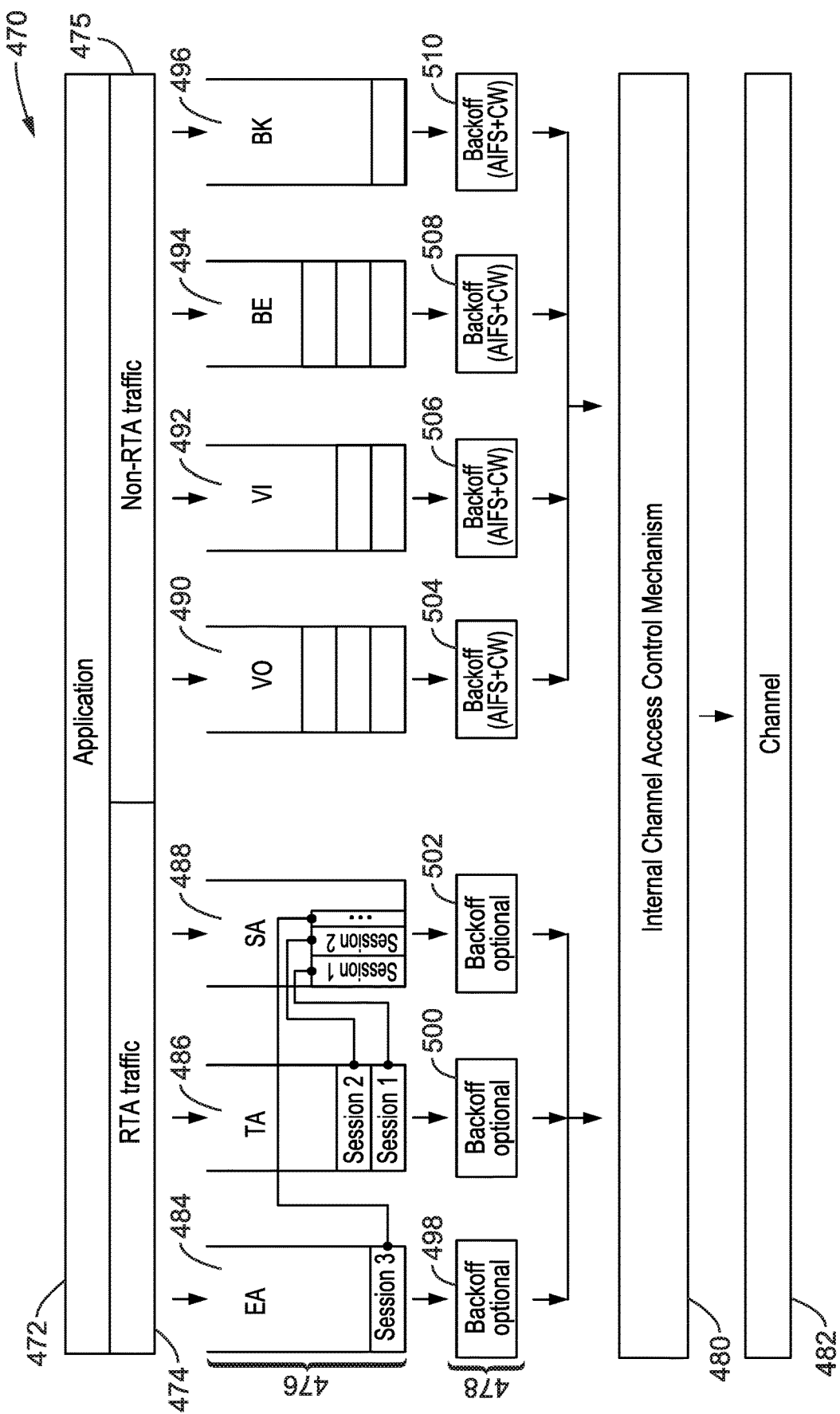
FIG. 21 is a queue diagram exemplifying dropping expired RTA packet (Session 4) according to at least one embodiment of the present disclosure.

FIG. 20 and FIG. 21 illustrate an example embodiment 410, 470 providing two examples for explaining how a STA either drops expired RTA packets from the queue system or moves the expired packet from the RTA queues to the non-RTA queues. An application layer 412, 472 is shown handling RTA traffic 414, 474, and non-RTA traffic 416, 475. These two examples show the change of the queues 418, 476, shown in FIG. 12 after the RTA packet of RTA session 4 expires. Both figures depict non-RTA queues as voice (VO) 432, 490; video (VI) 434, 492; best-effort (BE) 436, 494; and background (BK) 438, 496 queues, while RTA queues are depicted as emergency access (EA) 426, 484; time-allocated channel access (TA) 428, 486; and session-based channel access (SA) 430, 488. An optional backoff 420, 478 is shown 440, 442, 444, 446, 448, 450, 452, 498, 500, 502, 504, 506, 508 and 510, for each of these queue, coupled to an internal Channel Access Control Mechanism 422, 480, which connects to channel 424, 482.

In FIG. 20 is an example of moving an expired RTA packet from RTA queues to a non-RTA queue. This example follows the logic of blocks 394, 396, 400, 402 in FIG. 19. As shown in FIG. 12, the RTA packet of RTA Session 4 was in the EA queue and the SA queue. If the RTA packet of RTA session 4 is expired, then the STA moves this packet to a non-RTA queue, such as BK 438, as shown in the figure.

In FIG. 21 is an example of dropping an expired RTA packet from RTA queue system. This example follows the logic seen in blocks 394, 396, 400, 404 in FIG. 19. As shown in FIG. 12, the RTA packet of RTA Session 4 was in the EA queue and the SA queue. If the RTA packet of RTA session 4 is expired, then STA drops this packet from the EA and SA queues.

It is possible to apply the expired RTA packet operation in regular queue system as shown in FIG. 3.

Figure 22:
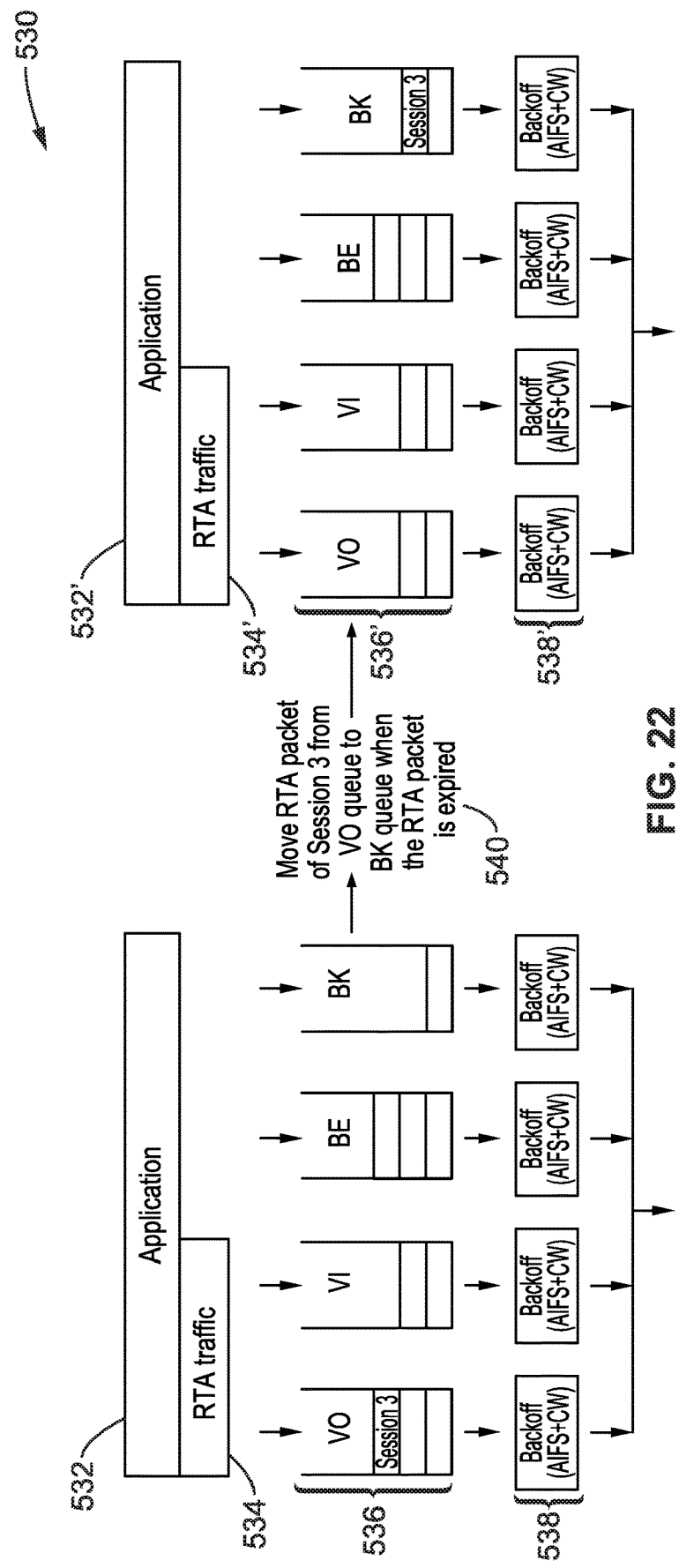
FIG. 22 is a queue diagram exemplifying moving an expired RTA packet from a higher priority non-RTA queue to a lower priority non-RTA queue according to at least one embodiment of the present disclosure.

FIG. 22 illustrates an example embodiment 530 of moving an expired RTA packet from one non-RTA queue to another non-RTA queue. An application layer 532, 532' is seen with an RTA stream 534, 534' coupled to queues. Non-RTA queues 536, 536' are shown as voice (VO), video (VI), best-effort (BE), and background (BK) queues. The queues output through an optional backoff 538, 538' mechanism. This scenario can arise if the RTA traffic is pushed to an EDCA queue when it is generated by an RTA session. As shown in the figure, the RTA packet of RTA session 3 was pushed to VO queue when it is generated, as seen in the left side of the figure. However, the packet did not get a chance to be transmitted until after it expired. Then, that packet could be moved 540 to another EDCA queue, such as BK, as seen in the right side of the figure.

It is also possible that an RTA packet in a regular queue system as shown in FIG. 3 could be dropped when it is expired.

4.5.5. RTA Queuing Discipline

This section explains the details of how a STA sets the RTA queuing discipline to sort the transmission order of the RTA packets in the RTA queues. In the RTA queue system, a STA is able to sort packets by different criteria. By way of example and not limitation, there are three criteria described. (1) Sorting RTA packets by priority is performed so that RTA packets with higher priority will be transmitted earlier than the packets with lower priority. (2) Sorting RTA packets by expiration time is performed so that RTA packets with shorter expiration times will be transmitted earlier than packets with longer expiration times. (3) Sorting RTA packets by importance index is performed so that an RTA user is able to provide a customized algorithm to calculate the importance index of the RTA packets in the queue. For example, the priority and the expiration time of the RTA packet could be considered in the calculation. The RTA packet with higher importance index will be transmitted earlier than the packet with lower importance index.

The RTA queuing discipline is able to be set by another STA. For example, an AP may need to control the RTA queuing discipline in its associated STAs.

Figure 23:
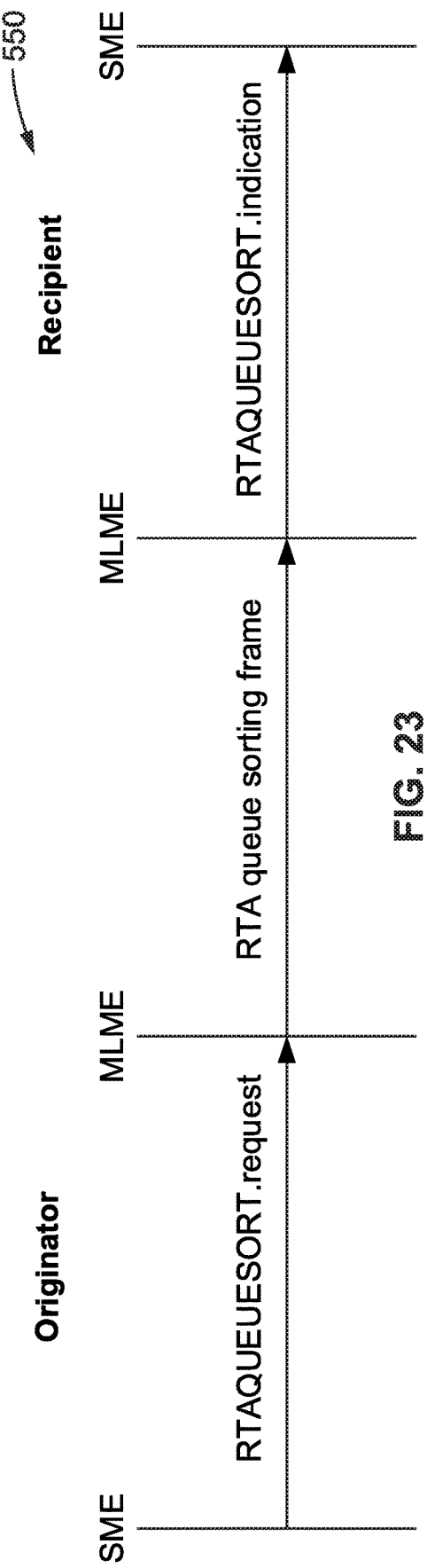
FIG. 23 is an interlayer communication diagram showing an RTA queuing discipline setting process according to at least one embodiment of the present disclosure.

FIG. 23 illustrates an example embodiment 550 of message exchange between the MAC layer of two STAs to set RTA queuing discipline. The interworking model of STA is shown in FIG. 14.

As shown in FIG. 23, when the originator STA (e.g., AP) needs to update the RTA queuing discipline at the recipient STA (e.g., non-AP), the SME of the originator STA sends an RTAQUEUESORT.request message to the MLME via MLME SAP interface. The format of the RTAQUEUESORT.request message is explained in Table 7. When the MLME of the originator STA receives the RTAQUEUESORT.request message, it collects the RTA queuing discipline information (i.e., RTAQueueType and SortAlgorithm) in the RTAQUEUESORT.request message and sends an RTA queue sorting frame to the recipient STA. Below is an example describing an RTA queue sorting frame. The MLME of the recipient STA receives the frame and generates an RTAQUEUESORT.indication message as shown in Table 8 to its SME via MLME SAP interface. Then, the recipient STA sets the RTA queuing discipline according to the information in the RTAQUEUESORT.indication message.

Figure 24:
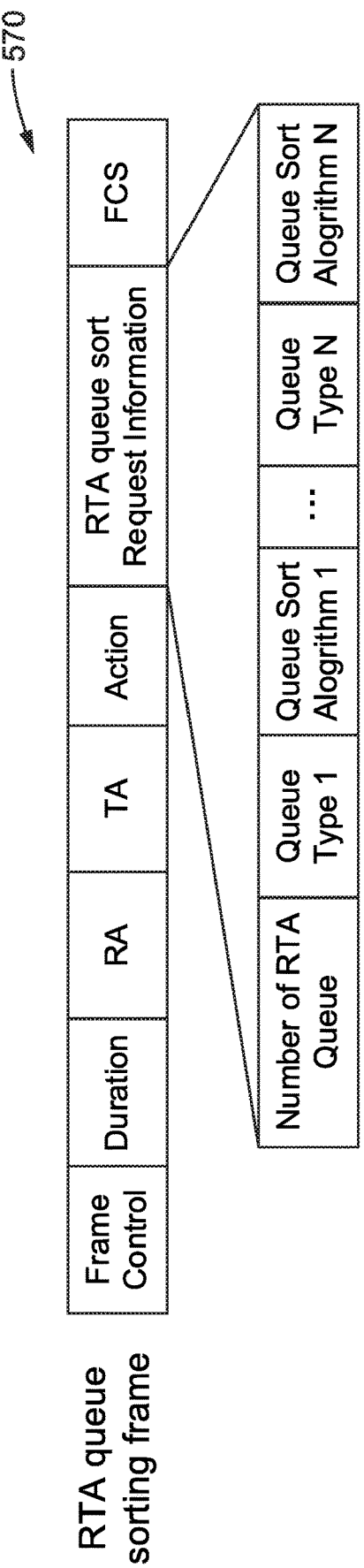
FIG. 24 is a data field diagram of an RTA queue sorting frame format according to at least one embodiment of the present disclosure.

FIG. 24 illustrates an example embodiment 570 an RTA queue sorting frame having the following fields. A Frame Control field indicates the type of the frame. A Duration field contains NAV information used for CSMA/CA channel access. An RA field contains an address for the recipient of the frame. A TA field contains the address of the STA that has transmitted the frame. An Action field indicates the type of management frame. In this case, this field indicates that the management frame is an RTA queue sorting frame. An RTA queue sort request information field contains the RTA queuing discipline request information. A Number of RTA Queues field indicates the number of RTA queues whose queuing disciplines need to be set. A Queue Type field indicates the queue, such as EA, TA, and SA, whose RTA packets will be sorted by the Queue Sort Algorithm following it. A Queue Sort Algorithm field indicates which algorithm (method) to use in sorting the RTA packets in the queue.

It is possible that the RTA queuing discipline setting procedure explained above is used to sort the packets in non-RTA queues, such as EDCA queues as shown in FIG. 3.

Figures 25, 26, 27:
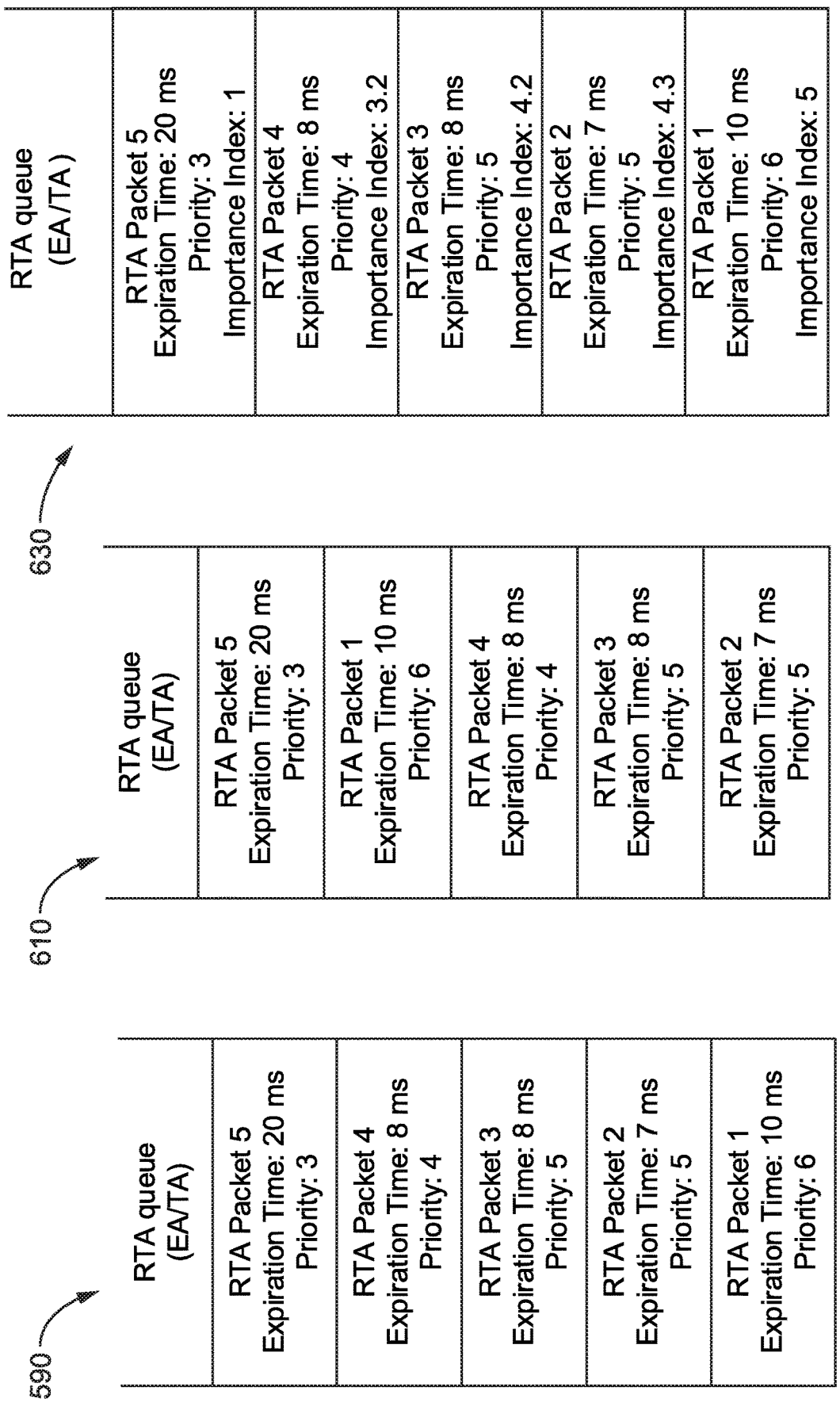
FIG. 25 is a packet queue diagram exemplifying sorting RTA packets by priority according to at least one embodiment of the present disclosure.
FIG. 26 is a packet queue diagram exemplifying sorting RTA packets by expiration time according to at least one embodiment of the present disclosure.
FIG. 27 is a packet queue diagram exemplifying sorting RTA packets by importance index according to at least one embodiment of the present disclosure.

FIG. 25, FIG. 26 and FIG. 27 are three example embodiments 590, 610, 630, of examples for sorting RTA packets in the RTA queues. In each example, the RTA queue has the same RTA packets. Each example uses different sorting method and results in different transmission order of the RTA packets in the queue.

In FIG. 25 the STA is sorting the RTA packets in the RTA queue by the priority of the packets. The type of RTA queue can be EA or TA. As shown in the figure, the RTA packets are sorted in decreasing order of packet priority. That is, the RTA packet with higher priority will be transmitted earlier than the packet with lower priority. In this example, the expiration time of the RTA packets does not affect the order of the RTA packets in the queue.

In FIG. 26 the STA is sorting the RTA packets in the RTA queue by the expiration time of the packets. As shown in the figure, the RTA queue can be EA or TA. The RTA packets are sorted in an the increasing order of packet expiration time. That is, the RTA packet with shorter expiration time will be transmitted earlier than the packet with longer expiration time. In this example, when the expiration time of the RTA packets is the same, the RTA packets with higher priority can be transmitted earlier. Also, it is possible to let the priority of the RTA packets not affect the order of the RTA packets in the queue.

In FIG. 27 the STA sorts the RTA packets in the RTA queue by calculating the importance index of the packets. For example, the importance index of the packets can be calculated by:

ImportanceIndex=$w_1$×ExpirationTime+$w_2$×Priority

Where $w_1$ and $w_2$ are two arbitrary weight numbers. As shown in the figure, the importance index of the RTA packet is calculated at $w_1$=−0.1 and $w_2$=1. According to the importance index, the RTA packet with higher importance index will be transmitted earlier than the packet with lower importance index.

4.5.6. Internal Channel Access Control

Figures 28, 29, 30:
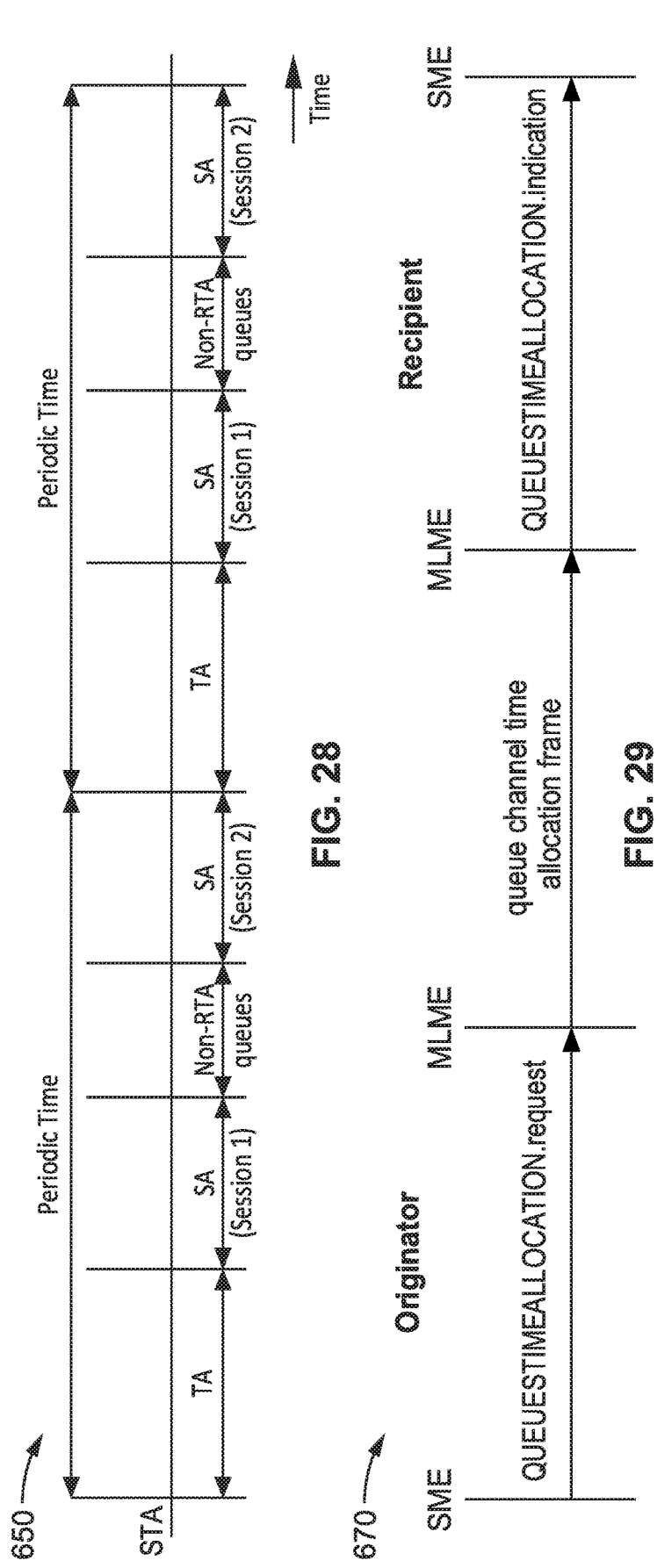
FIG. 28 is a channel allocation diagram showing allocating channel time to different queues according to at least one embodiment of the present disclosure.
FIG. 29 is an interlayer communication diagram showing Queue channel time allocation procedure according to at least one embodiment of the present disclosure.
FIG. 30 is a data field diagram of a queue channel time allocation frame format according to at least one embodiment of the present disclosure.

FIG. 28 illustrates an example embodiment 650 of allocating channel times to different queues. A STA could allocate separate channel time to RTA queues and non-RTA queues to try to access the channel. The figure shows an example of a STA allocating the channel time to different queues. Every periodic time, a STA allocates separate channel time to TA queue, SA queue corresponding different RTA sessions, and non-RTA queues. The EA queue can access the channel all the time if the packet transmitted by the EA queue has higher priority.

FIG. 29 illustrates an example embodiment 670 of queue channel time allocation. It is possible that one STA (e.g., AP) changes the channel time allocation of other STAs. The figure shows an example of one STA allocating channel time to different queues at another STA. The interworking model of the STA was shown in FIG. 15. When the originator STA (e.g., AP) needs to update the RTA queue parameters at the recipient STA (e.g., non-AP), the SME of the originator STA sends an QUEUETIMEALLOCATION.request message to the MLME through the MLME SAP interface. The format of the QUEUETIMEALLOCATION.request message is explained in Table 9. When the MLME of the originator STA receives the QUEUETIMEALLOCATION.request message, it collects the queue channel time allocation information (i.e., QueueType, PeriodicTime, StartTime, DurationofEachPerriod, and EndTime) in the QUEUETIMEALLOCATION.request message and send a queue channel time allocation frame to the recipient STA.

Below is described a queue channel time allocation frame. The MLME of the recipient STA receives the frame and generates an QUEUETIMEALLOCATION.indication message as shown in Table 10 to its SME through the MLME SAP interface. Then, the recipient STA sets the queue channel time allocation according to the information in the QUEUETIMEALLOCATION.indication message.

FIG. 30 illustrates an example embodiment 690 of a queue channel time allocation frame having the following fields. A Frame Control field indicates the type of the frame. A Duration field contains NAV information used for CSMA/CA channel access. An RA field contains an address for the recipient of the frame. A TA field contains the address of the STA that transmitted the frame. An Action field indicates the type of management frame. In this instance it indicates that the management frame is a queue channel time allocation frame. A Queue Channel Time Allocation field contains the information of allocating channel time to a queue. A Queue Type field indicates the type of queue, such as TA and non-RTA queue. A Periodic Time field specifies the duration of time that the queue would be allocated for transmitting the packet in the queue once. A Start Time field indicates the time when STA has a period of time to transmit packets in that queue for the first time. A Duration field of Each Period indicates the channel time the STA would have to transmit a packet in the queue every periodic time. An End Time field indicates the time at which there is no time remaining for the STA to transmit packets in that queue.

Figure 31A:
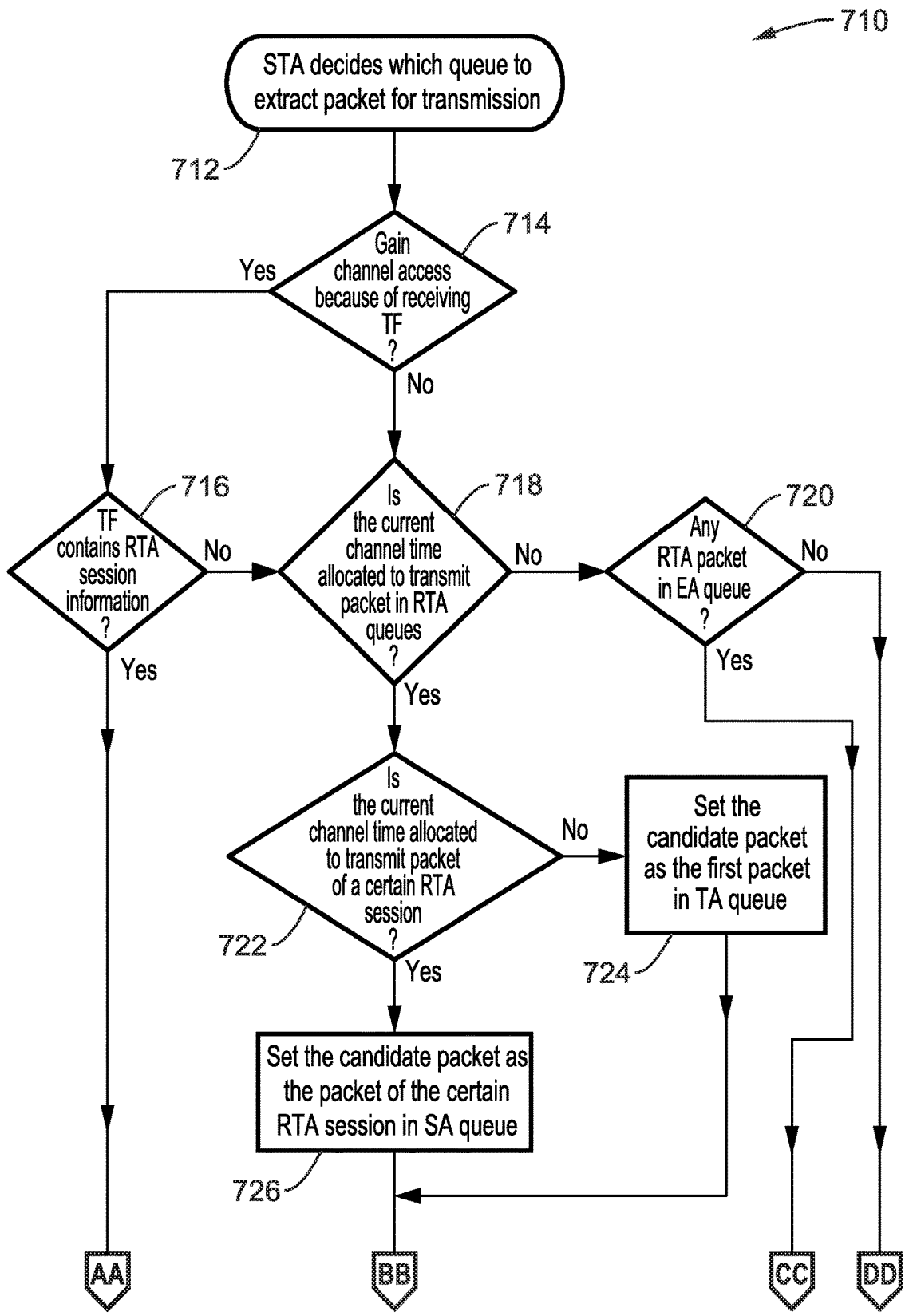
FIG. 31A and FIG. 31B is a flow diagram internal channel access control among the queues according to at least one embodiment of the present disclosure.
Figure 31B:
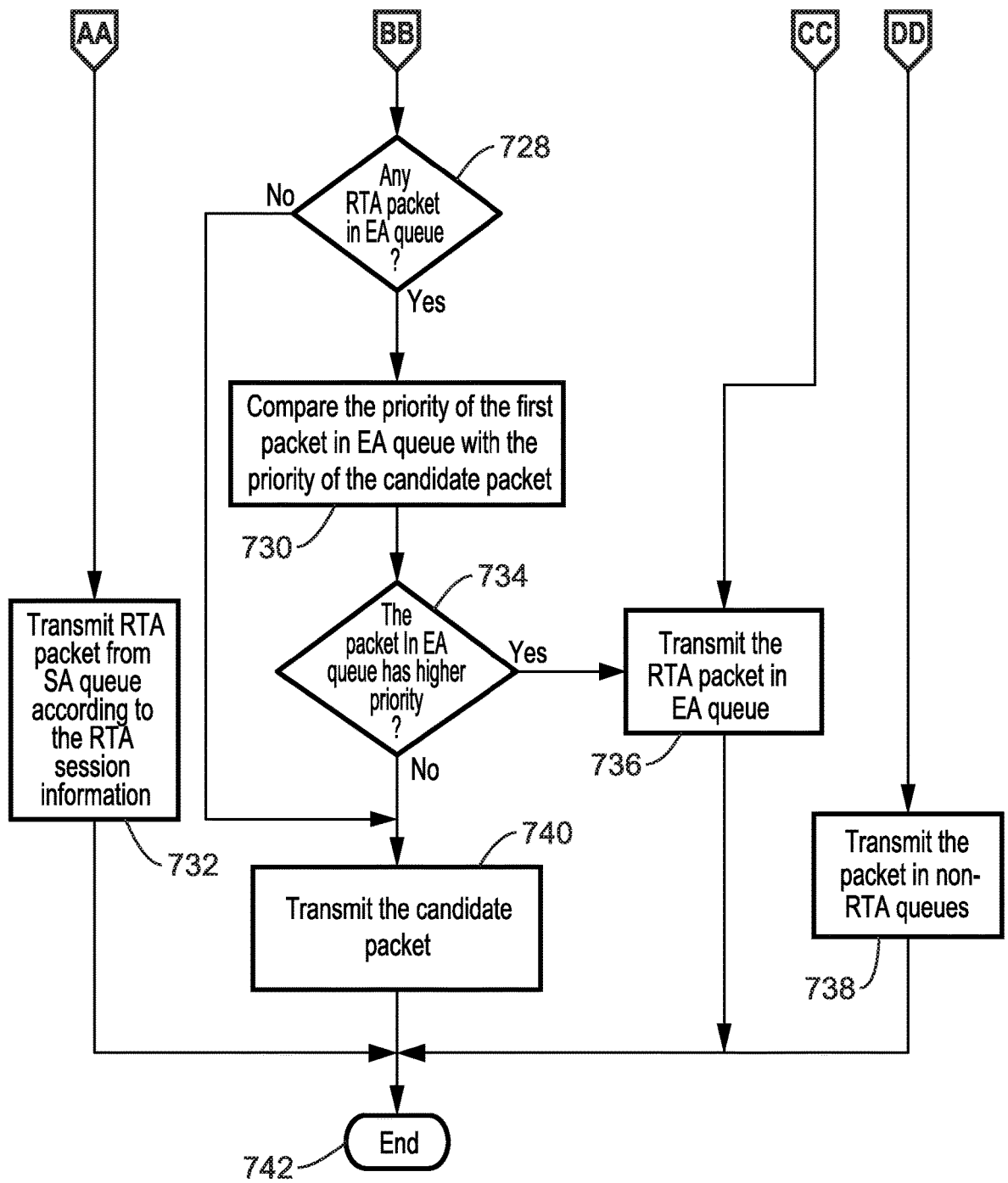

FIG. 31A and FIG. 31B illustrates an example embodiment 710 of how a STA controls channel access between different RTA and non-RTA queues. In FIG. 31A, when a STA needs to determine 712 from which queue to transmit a packet, it first checks 714 whether it gained channel access because of receiving a trigger frame. If the STA received a trigger frame (TF) then execution moves to block 716 and a check is made if the TF contains RTA session information. If the RTA contains session information, then execution reaches block 732 in FIG. 31B and it transmits RTA packet from the SA queue according to the RTA session information embedded in the TF, and the process ends 742. Also, it will be noted that if the TF contains a non-RTA packet transmission request, then the STA would transmit non-RTA packets. The format of the TF containing RTA session information is described in a later section.

Returning to block 714, if it is determined that the STA gains channel access without receiving a TF, then it checks 718 whether the current channel time is allocated to transmit packets in RTA queues. For example, the current channel time could be allocated to transmit packets from the TA queue or to transmit packets of a certain RTA session from SA queue. The method of allocating channel time to different queues can be the same as depicted in FIG. 28. If it is determined at block 718 in FIG. 31A that the current time is not allocated to transmit packets in RTA queues, then execution reaches block 720 with the STA checking the buffer of the EA queue for RTA packets. If the buffer of the EA queue is not empty, then the STA has some RTA packets to transmit in the EA queue first with execution reaching block 736 in which an RTA packet(s) in the EA queue is transmitted and execution ends 742. However, if the buffer of the EA queue is found to be empty, then block 738 is reached and the STA transmits a packet(s) from non-RTA queues, before execution ends 742.

Returning to block 718 if the current channel time is allocated to transmit packets in RTA queues, then the STA knows (recognizes) whether the current channel time is allocated to transmit packets in TA queue or to transmit packets of a certain RTA session in an SA queue, and execution reaches block 722 with a check made if the current channel time is allocated to transmit packets in the TA queue. If the check determines that the channel time is not allocated for transmission by a certain RTA session, then block 724 is reached in which the candidate packet to transmit is set as the first packet in a TA queue as the candidate packet, and execution reaches decision block 728 of FIG. 31B.

However, if at block 722 it is determined that the current channel time is allocated to transmit packets of a certain RTA session in the SA queue, then block 726 is reached and the STA sets the packet of that RTA session in the SA queue as the candidate packet to transmit, before reaching block 728 of FIG. 31B.

At block 728 in FIG. 31B, before the STA decides to transmit the candidate packet, it will check the buffer of EA queue for RTA packets. This is because the EA queue can use the channel time allocated to TA and SA queues for packet transmission. If there are RTA packets in the EA queue, then at block 730 the STA compares the priorities of the packet in EA queue and the candidate packet. If it is determined at block 734 that the packet in the EA queue has higher priority, then block 736 is reached with the STA transmitting the packet in the EA queue, before ending 742.

Otherwise, if block 734 determines the packet in the EA queue has lower priority, or that the buffer of the EA queue is empty, then execution reaches block 740 and the STA transmits the candidate packet before ending 742.

Returning to block 728, if it is determined that there are no RTA packets in the queue, then execution moves to block 740 with the candidate packet being transmitted and the process ending 742.

4.5.7. Queue Channel Resource Limitation Mechanism

In at least one embodiment, the RTA queue system also considers the fairness of channel time allocation between RTA queues and non-RTA queues. The goal of this mechanism is to prevent the RTA queues from monopolizing transmissions, and more specifically, occupying too much (an inordinate or unfair amount of time) channel time for transmitting RTA packets. The following describes multiple methods to protect non-RTA queues from RTA queues occupying the channel for an inordinate length of time.

(a) Limit the buffer size of the EA/TA queues to prevent RTA packet monopolization. The STA sets a maximum buffer size of the EA/TA queues. When an RTA user initiates an RTA session, the STA estimates the required buffer size of the RTA queues according to the RTA session requirement information as shown in FIG. 13. If the buffer size cannot satisfy the RTA session requirement, the STA can reject RTA session initiation.

(b) Limit the channel time of the TA/SA queues to prevent RTA packet monopolization. The STA sets a maximum ratio of channel time for transmitting RTA packets in TA/SA queues. Similar to the previous method, the STA is able to check the availability of the channel time when initiating an RTA session. If the channel time of that queue is not enough to transmit packets after adding the packet of that RTA session into the queue, the STA can reject RTA session initiation.

(c) Limit the number of RTA sessions in the RTA queues to prevent RTA packet monopolization. The STA sets a maximum number of RTA sessions in each RTA queue. When the STA initiates a new RTA session, it decides to push the packets of that RTA session to an RTA queue. If the number of RTA sessions whose packets are pushed to that RTA queue has reached the maximum number, the STA can reject RTA session initiation.

Figure 32:
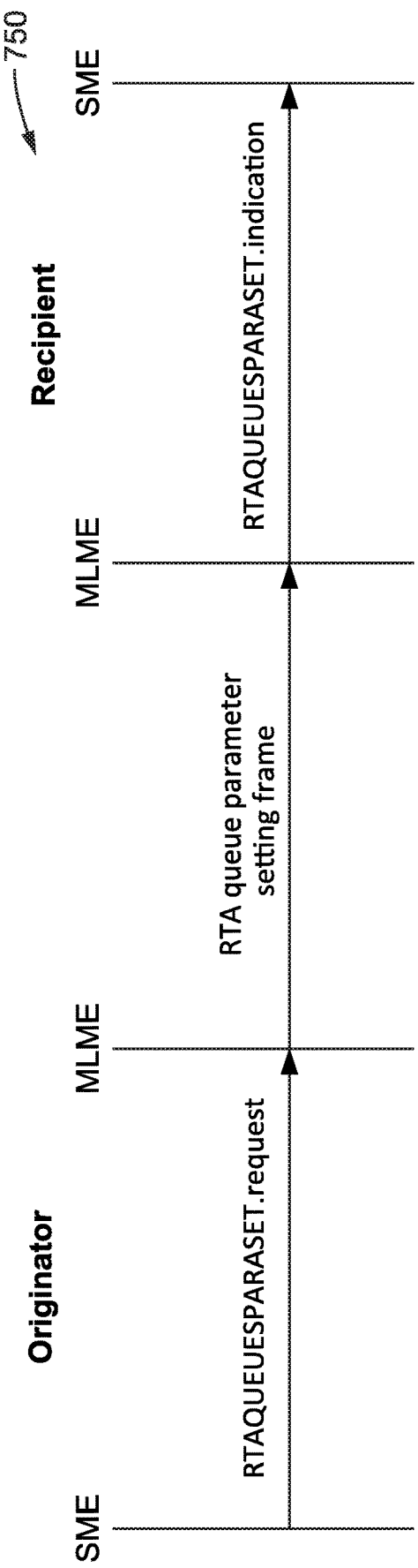
FIG. 32 is an interlayer communication diagram RTA queue parameter setting procedure according to at least one embodiment of the present disclosure.

FIG. 32 illustrates an example embodiment 750 of RTA queue parameter setting. In at least one embodiment the parameters of maximum buffer size, maximum channel time, and/or maximum number of RTA sessions of an RTA queue at a STA can be set (established) by its associated AP. The figure shows an example of one STA (e.g., AP) setting queue parameters, such as maximum buffer size, maximum channel time and maximum number of RTA sessions of an RTA queue at another STA. The interworking model of a STA was shown in FIG. 14. When the originator STA (e.g., AP) needs to update the RTA queue parameters at the recipient STA (e.g., non-AP), the SME of the originator STA sends an RTAQUEUEPARASET.request message to the MLME via MLME SAP interface. The format of the RTA-QUEUEPARASET.request message is explained in Table 11.

When the MLME of the originator STA receives the RTAQUEUEPARASET.request message, it collects the RTA queue parameter information (i.e., RTAQueueType, MaxBufferSize, MaxChannelTime, and MaxNumof-RTASessions) in the RTAQUEUEPARASET.request message and sends an RTA queue parameter setting frame to the recipient STA.

Figure 33:
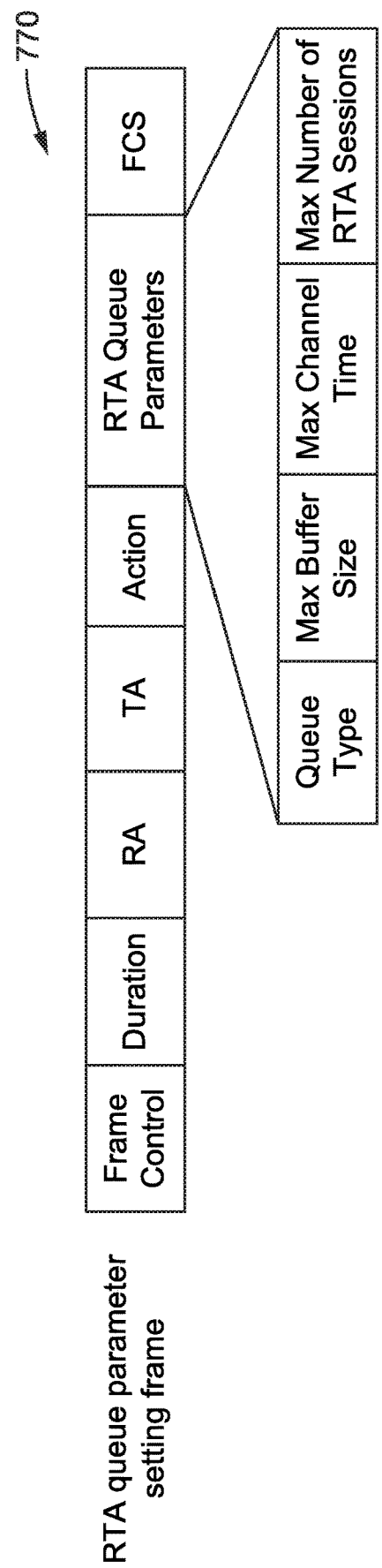
FIG. 33 is a data field diagram of RTA queue parameter setting frame format according to at least one embodiment of the present disclosure.

FIG. 33 illustrates an example embodiment 770 of an RTA queue parameter setting frame. The MLME of the recipient STA receives the frame and generates an RTA-QUEUEPARASET.indication message as shown in Table 12 to its SME via MLME SAP interface. Then, the recipient STA sets the RTA queue parameters according to the information in the RTAQUEUEPARASET.indication message.

The figure illustrates the content of the RTA queue parameter setting frame as follows. A frame Control field indicates the type of frame. A duration field contains NAV information used for CSMA/CA channel access. An RA field contains an address for the recipient of the frame. A TA field contains the address of the STA that transmitted the frame. An action field indicates the type of management frame. By way of example and not limitation, in the depicted example, the field indicates that the management frame is an RTA queue parameter setting frame. An RTA Queue Parameters field contains the RTA queue parameter setting information. A Queue Type field indicates the type of queue, such as EA, TA, and SA, whose RTA packets will be sorted by the Queue Sort Algorithm following it. A Max Buffer Size field indicates the maximum buffer size of the queue. A Max Channel Time indicates the maximum ratio of channel time that could be allocated to the queue. By way of example and not limitation, this maximum ratio can indicate a percentage of total channel time, or other metric as desired. A Max Number of RTA Sessions field indicates the maximum number of RTA sessions whose packets can wait in the RTA queue.

The queue parameters, such as maximum buffer size, maximum channel time, maximum number of RTA sessions, and so forth, can also be applied for use with non-RTA queues, such as EDCA queues as shown in FIG. 3.

4.6. Packet Transmission Using RTA Queue System

The object of this section is to provide multiple examples to explain how a STA according to the present disclosure uses the RTA queue system to transmit packets.

4.6.1. Flowchart.

Figure 34:
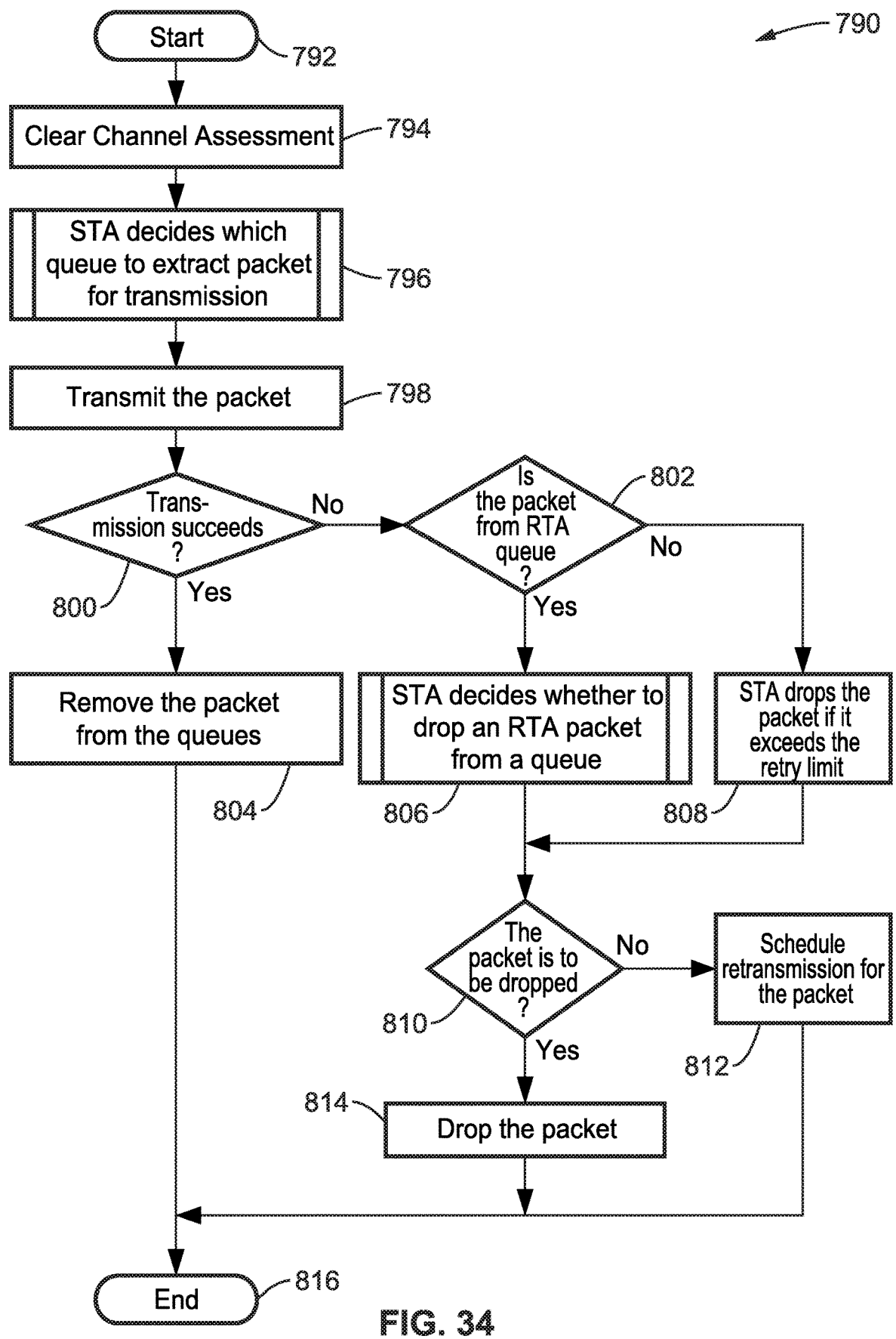
FIG. 34 is a flow diagram of transmitting a packet using the RTA queue system according to at least one embodiment of the present disclosure.

FIG. 34 illustrates an example embodiment 790 of a STA using the disclosed RTA queue system to transmit packets. The process starts 792 and the STA performs a Clear Channel Assessment 794 and gains channel access, it then decides 796 from which queue to transmit a packet(s). The procedure of making this decision was explained in FIG. 31A and FIG. 31B. Then the STA transmits 798 the packet from the selected queue. A check 800 is made to determine if the packet transmission succeeded. If it succeeded, then the STA removes 804 that packet from the queues and the process ends 816. It should be noted that the packet may be listed in multiple queues, with the STA removing the packet from all of these queues.

Otherwise, if it is determined at block 800 that packet transmission fails, then the STA checks 802 if the packet is picked (was selected) from RTA queues. If the packet is from RTA queues, then at block 806 the STA decides whether to drop this packet from the queue system or move this packet to a non-RTA queue, as was explained in the flow diagram of FIG. 19, and execution reaches decision block 810. Otherwise, if it is determined that the packet is not from the RTA queue, then block 808 is reached and the decision is made on whether to drop the packet based on whether the number of retransmissions of that packet exceeds the retry limit, before reaching block 810. A determination is made at block 810 if the packet is to be dropped. If it is to be dropped, then at block 814 the packet is dropped and the process ends. Otherwise, if the packet is not to be dropped, then at block 812 packet retransmission is scheduled prior to ending the process 816.

4.6.2. Examples of Packet Transmission Using RTA Queues

In this section, multiple examples are provided to explain how a STA uses the disclosed RTA queue system to transmit packets. The examples include the scenarios of both single user transmissions and multi-user transmissions. Each scenario shows packet transmissions during the channel time allocated for a certain RTA session, TA queue, or non-RTA queues. The example considers the network topology as was shown in FIG. 5.

4.6.2.1. Queue Information

Table 13 lists the RTA sessions that are involved in the examples. Each row in the table represents an RTA session. For example, the first row represents RTA Session 1, which generates packets at STA 0 and transmits it to STA1. The priority of the packet generated by RTA Session 1 is 5 and the packet is transmitted through either the TA queue or SA queue.

According to RTA session information in Table 13, the RTA packets are enqueued in the RTA queue system as shown in the following figures. It should be appreciated that the status of the RTA queue system at STA 0 is shown in FIG. 12. The RTA packets of RTA Session 1, 2, 3, 4 are waiting in the RTA queues for transmission. The non-RTA queues are not empty and the packets in non-RTA queues are generated by non-RTA traffic.

FIG. 35 through FIG. 38 illustrate an example embodiment 830, 890, 950, and 1010 for the RTA queue system at STAs 1, 2, 3, 4, respectively. Each of the figures depicts an application layer 832, 892, 952, 1012, with associated RTA traffic 834, 894, 954 and 1014, as well as non-RTA traffic 836, 896, 956 and 1016. There are a number of queues shown 838, 898, 958 and 1018, specifically exemplifying: Emergency Access (EA) queue 846, 906, 966, 1026; Time-Allocated Access (TA) 848, 908, 968, 1028, and Session-based Access (SA) 850, 910, 970, 1030. The non-RTA queues are shown with Voice (VO) queue 852, 912, 972, 1032; Video (VI) queue 854, 914, 974, 1034; Best Effort (BE) queue 856, 916, 976, 1036; and Background (BK) queue 858, 918, 978, 1038. The figures also depict the type of channel access 840, 900, 960, 1020, which are shown as being backoff optional 860, 862, 864, 920, 922, 924, 980, 982, 984, 1040, 1042 1044 for RTA traffic queues, and as being a AIFS+CW backoffs 866, 868, 870, 872, 926, 928, 930, 932, 986, 988, 990, 992, 1046, 1048, 1050, 1052 for the non-RTA queues. For each station the internal channel access control mechanism 842, 902, 962, 1022 is shown, as well as the channel itself 844, 904, 964, 1024.

Figure 35:
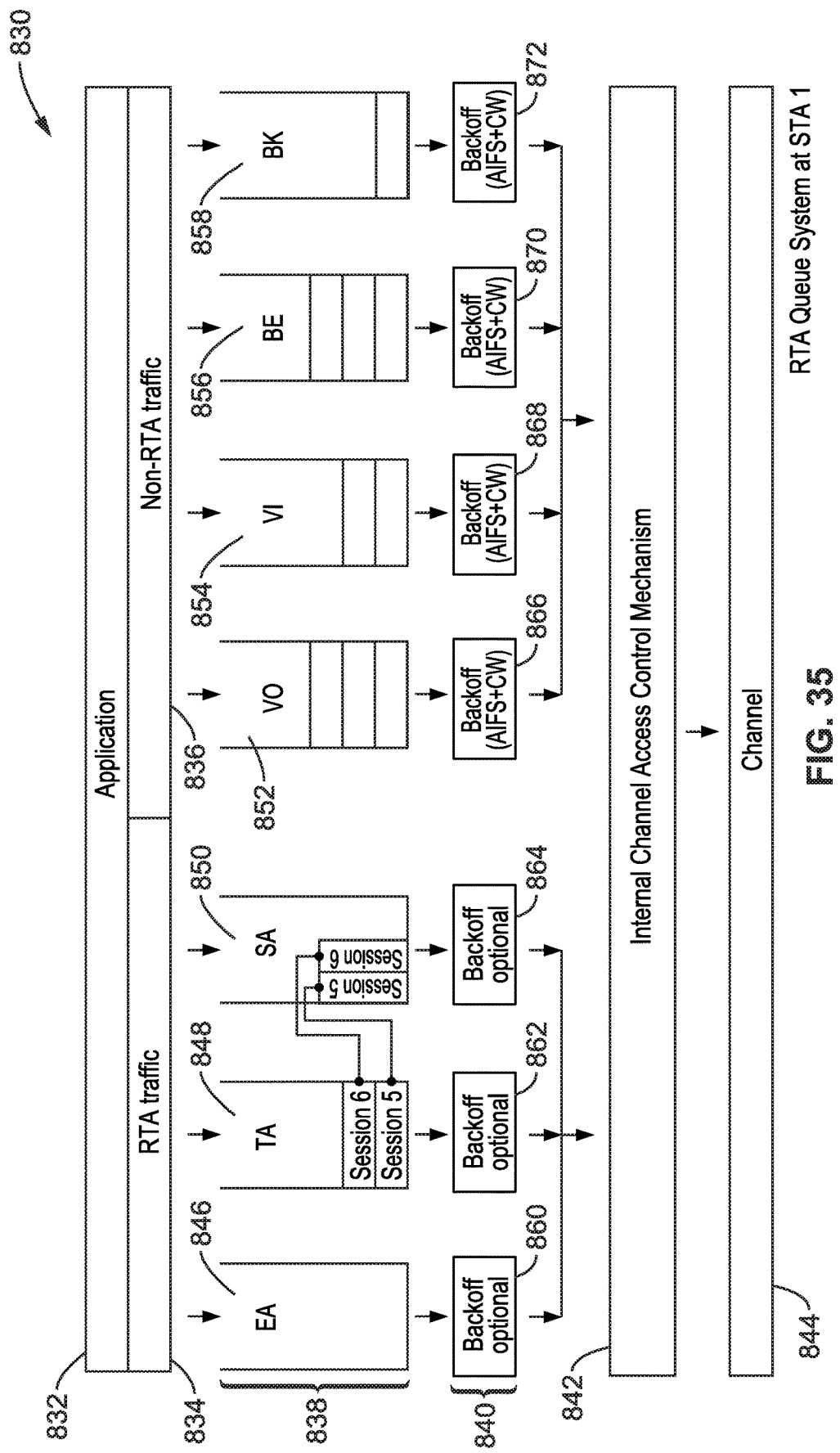
FIG. 35 is a queue diagram exemplifying RTA queue system at STA 1 according to at least one embodiment of the present disclosure.
Figure 36:
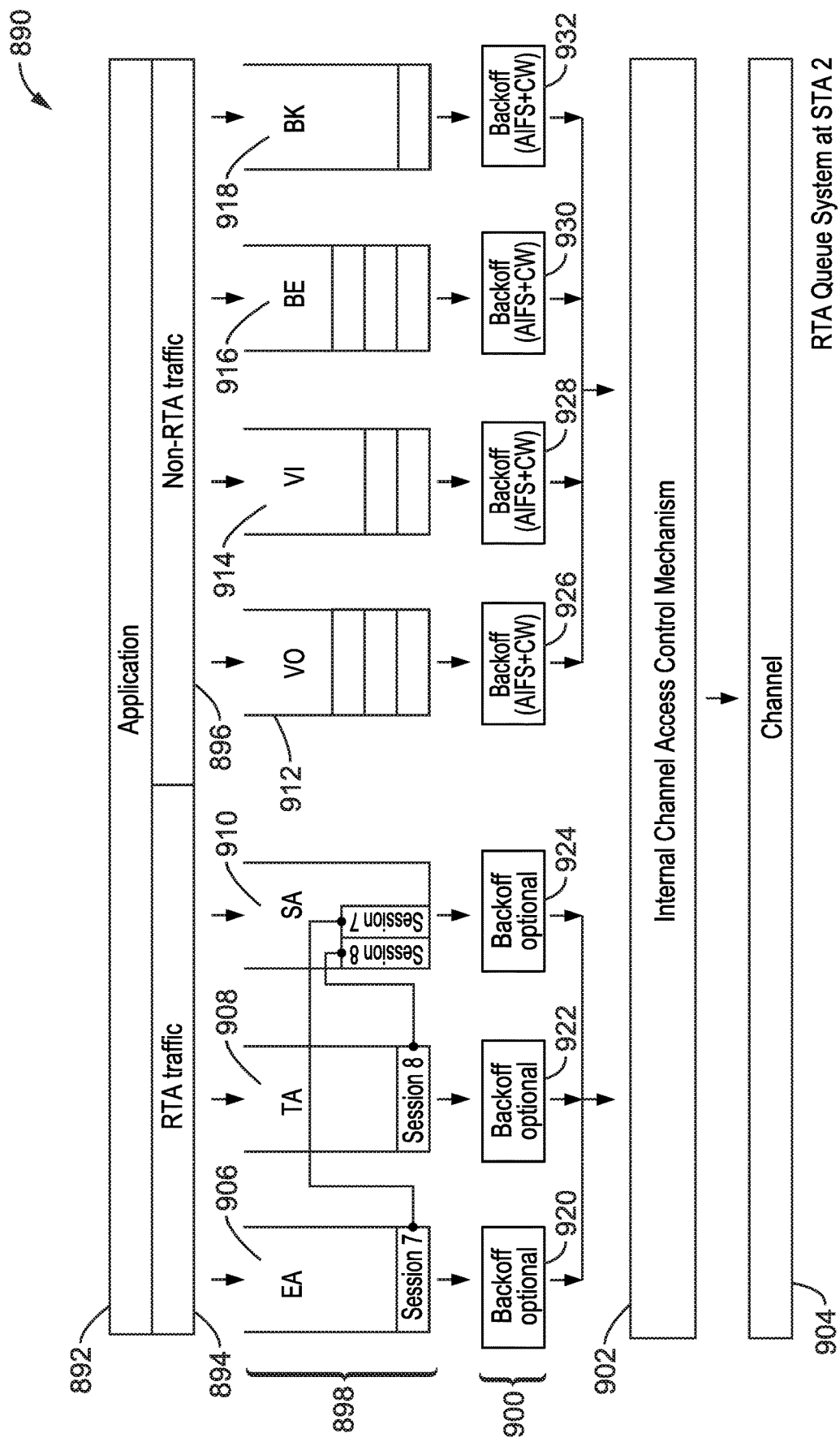
FIG. 36 is a queue diagram exemplifying RTA queue system at STA 2 according to at least one embodiment of the present disclosure.
Figure 37:
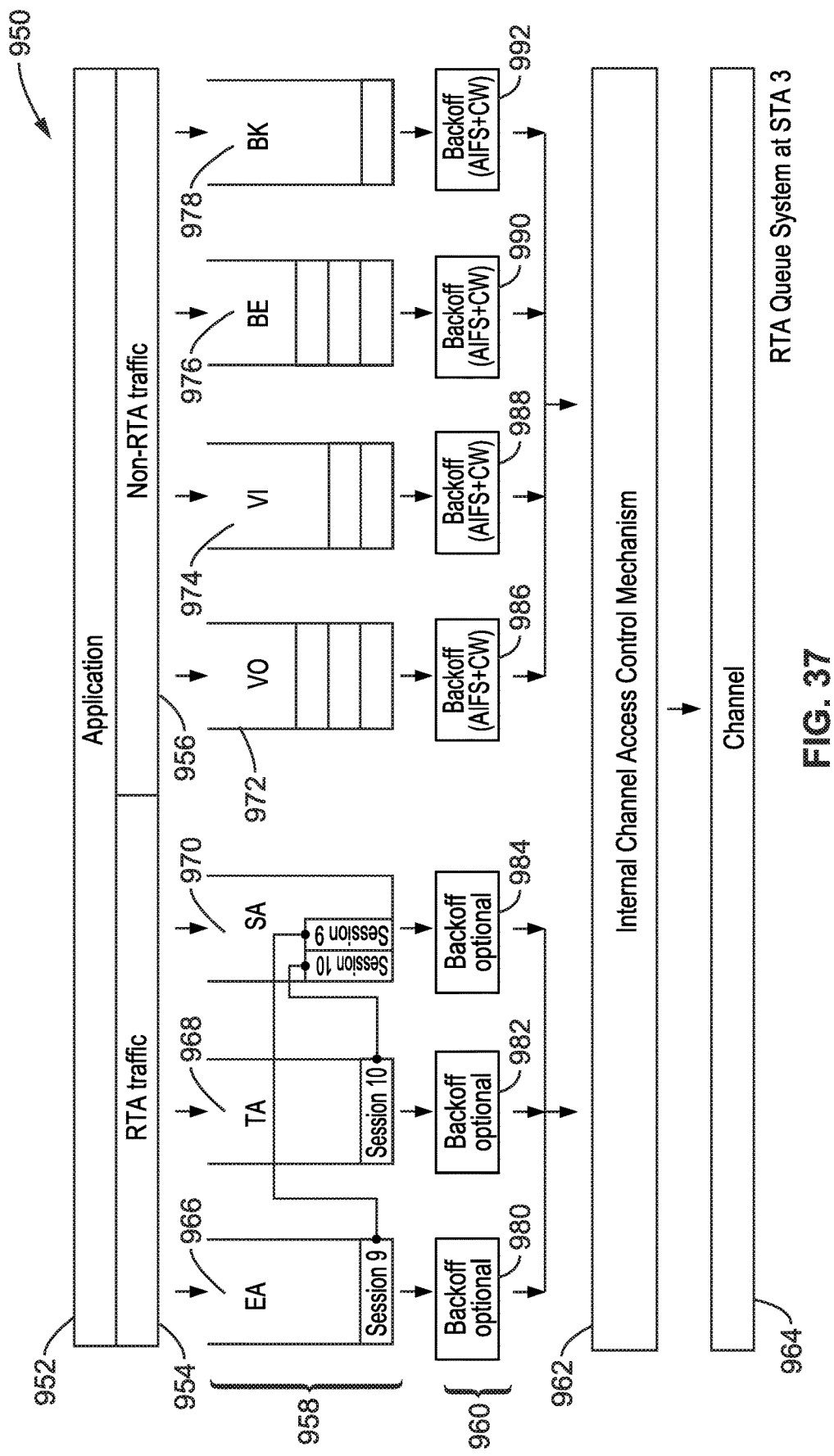
FIG. 37 is a queue diagram exemplifying RTA queue system at STA 3 according to at least one embodiment of the present disclosure.
Figure 38:
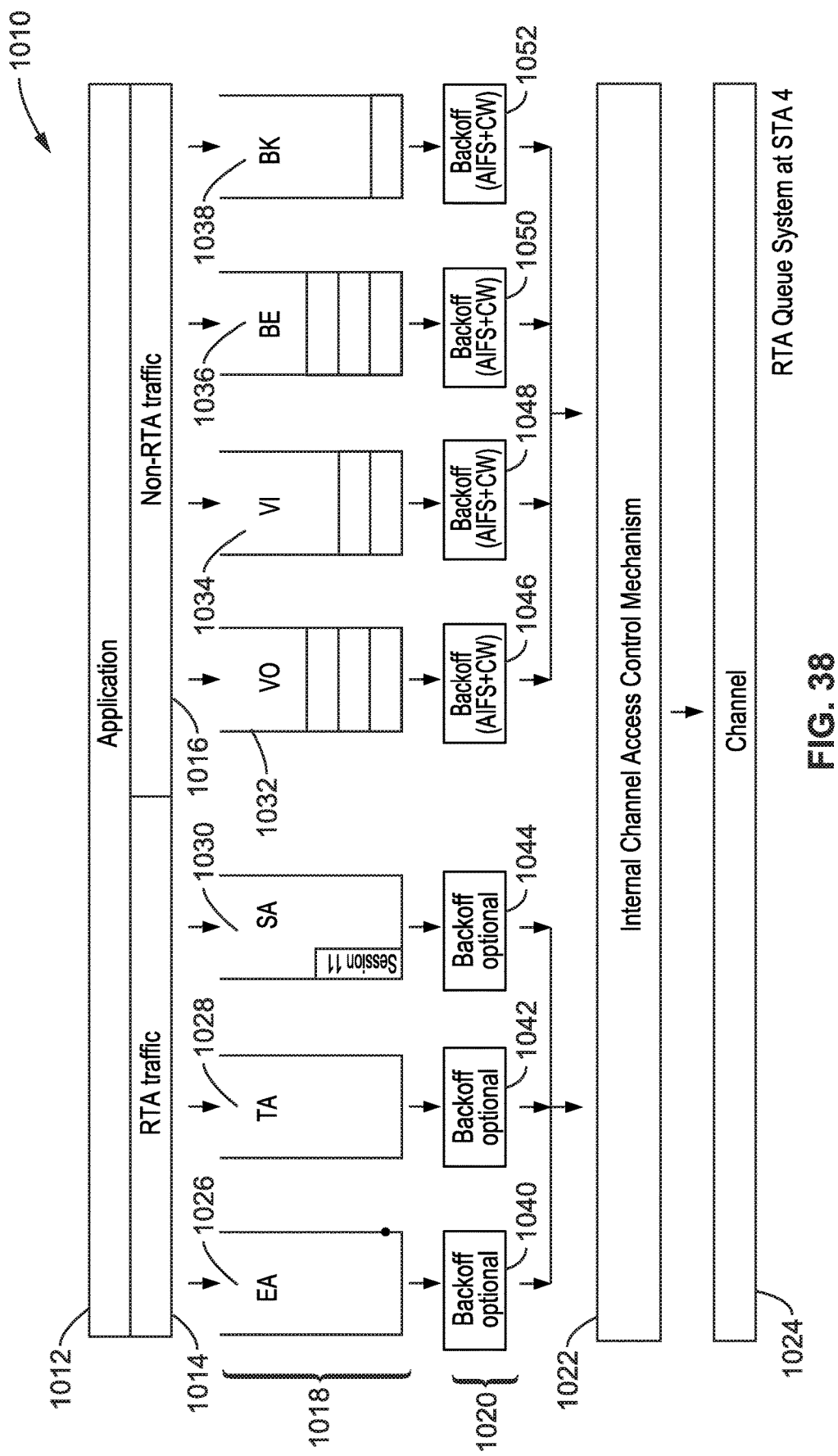
FIG. 38 is a queue diagram exemplifying RTA queue system at STA 4 according to at least one embodiment of the present disclosure.

One can see in FIG. 35 that Session 5 and Session 6 packets are in the TA queue which is also shown in the SA queue 850. It will be noted that the Session 5 packet, as well as the Session 6 packet, represent the same packet waiting in two different queues. Each queue uses its own channel access method to gain channel access independently. The packet could be transmitted when either of the queue gains channel access to transmit that packet. When the packet is transmitted successfully or dropped, the packet will be removed from both queues. FIG. 36 depicts Session 7 and Session 8 packets in the EA 906 and TA 908 queues and seen in SA queue 910. Similar as in FIG. 35, Session 7 packet in different queues is the same packet, as well as Session 8 packet. The packet is transmitted when either of the queues gain channel access to transmit that packet. FIG. 37 depicts Session 9 and Session 10 packets in EA queue 906 and TA queue 968 being seen in the SA queue 970. Similar as in FIG. 35, Session 9 packet in different queues is the same packet, as well as Session 10 packet. The packet is transmitted when either of the queues gain channel access to transmit that packet. FIG. 38 depicts a single Session 11 packet in the SA queue 1030.

4.6.2.2. Single User Transmission Scenario

In single user transmission scenario, when STA 0 gains channel access, it needs to decide (determine) from which queue it will transmit a packet. This logic was explained in FIG. 34. The following examples show how a STA makes these decisions on transmitting packets from different queues depending on the channel time scheduling for those queues.

Figure 39:
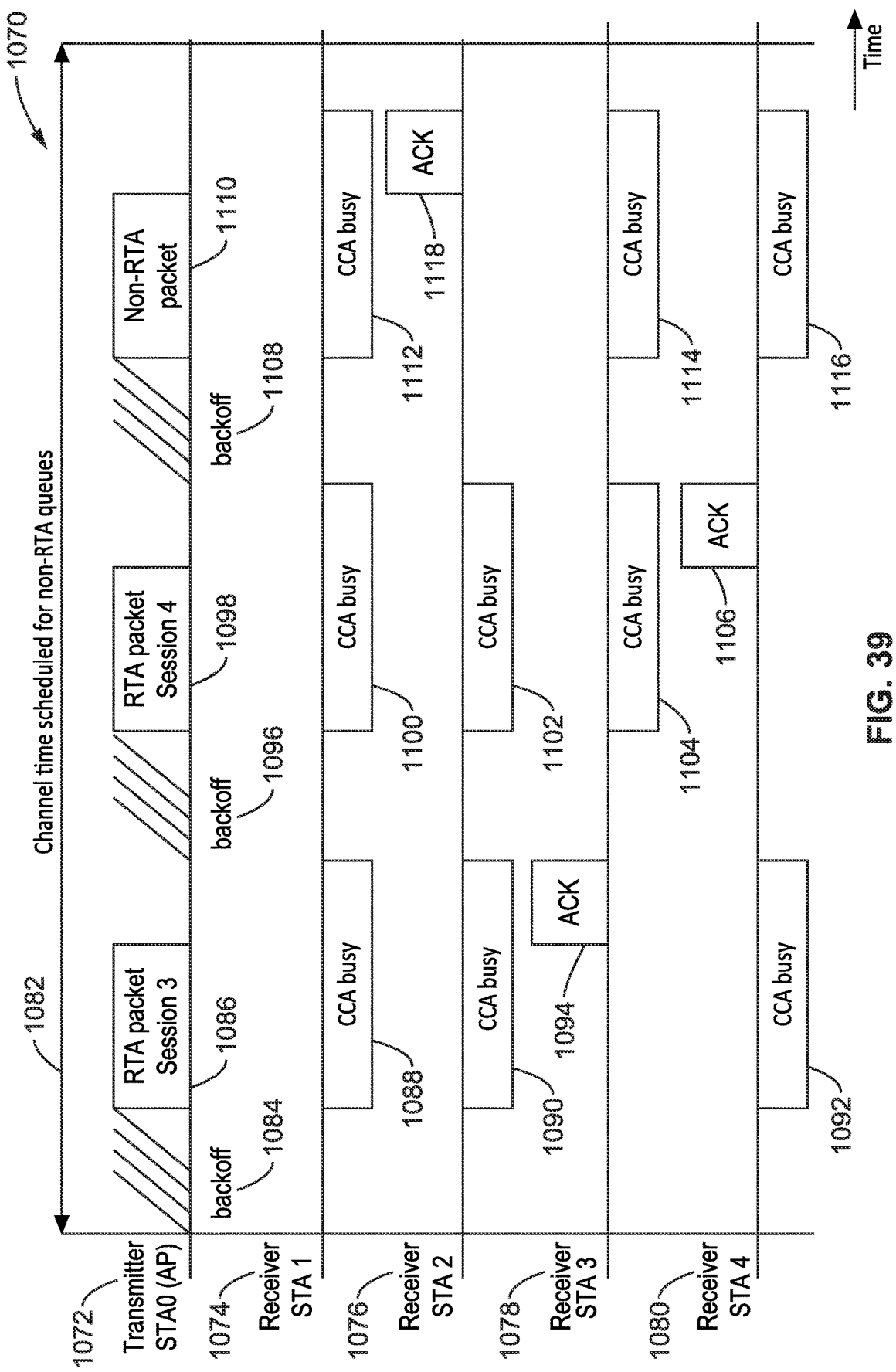
FIG. 39 is a communication sequence diagram exemplifying single user transmissions at STA 0 (AP) during CBAP according to at least one embodiment of the present disclosure.

FIG. 39 illustrates an example embodiment 1070 of packet transmissions at STA 0 when the channel time is scheduled for non-RTA queues. The figure depicts channel time scheduling 1082 in relation to transmitter STA0 (AP)

1072, receiver STA1 1074, receiver STA2 1076, receiver STA3 1078, and receiver STA4 1080. STA0 waits backoff 1084 and transmits an RTA packet 1086 to Session 3. Receiver STA1 1074, STA2 1076 and STA4 1080 set their CCA busy 1088, 1090, 1092. Receiver STA3 1078 sends an acknowledge (ACK) 1094 after receiving the RTA packet. STA0 1072 then does another backoff 1096 and transmits RTA packet 1098 for Session 4. Receiver STA1 1074, STA2 1076 and STA3 1078 set their CCA busy 1100, 1102, 1104. Receiver STA3 1078 sends an acknowledge (ACK) 1106 after receiving the RTA packet. STA0 1072 then performs another backoff 1108 and transmits RTA packet 1110 for Session 4. Receiver STA1 1074, STA3 1078, STA4 1080 all set CCA busy and receiver STA2 1076 ACKs 1118 the received non-RTA packet.

The queuing status associated with the above example was previously shown in FIG. 12. No new packets are generated during the channel time shown in the example. Since the channel time is scheduled for non-RTA queues, STA 0 must wait a backoff time to gain channel access. According to blocks 718, 720 and 734 in FIG. 31A and FIG. 31B, STA 0 first transmits the RTA packets from the EA queue. According to FIG. 12 the RTA packets of Sessions 3 and 4 are transmitted; then the EA queue becomes empty. According to blocks 720 and 738 of FIG. 31A and FIG. 31B, STA 0 starts to transmit non-RTA packets.

Figure 40:
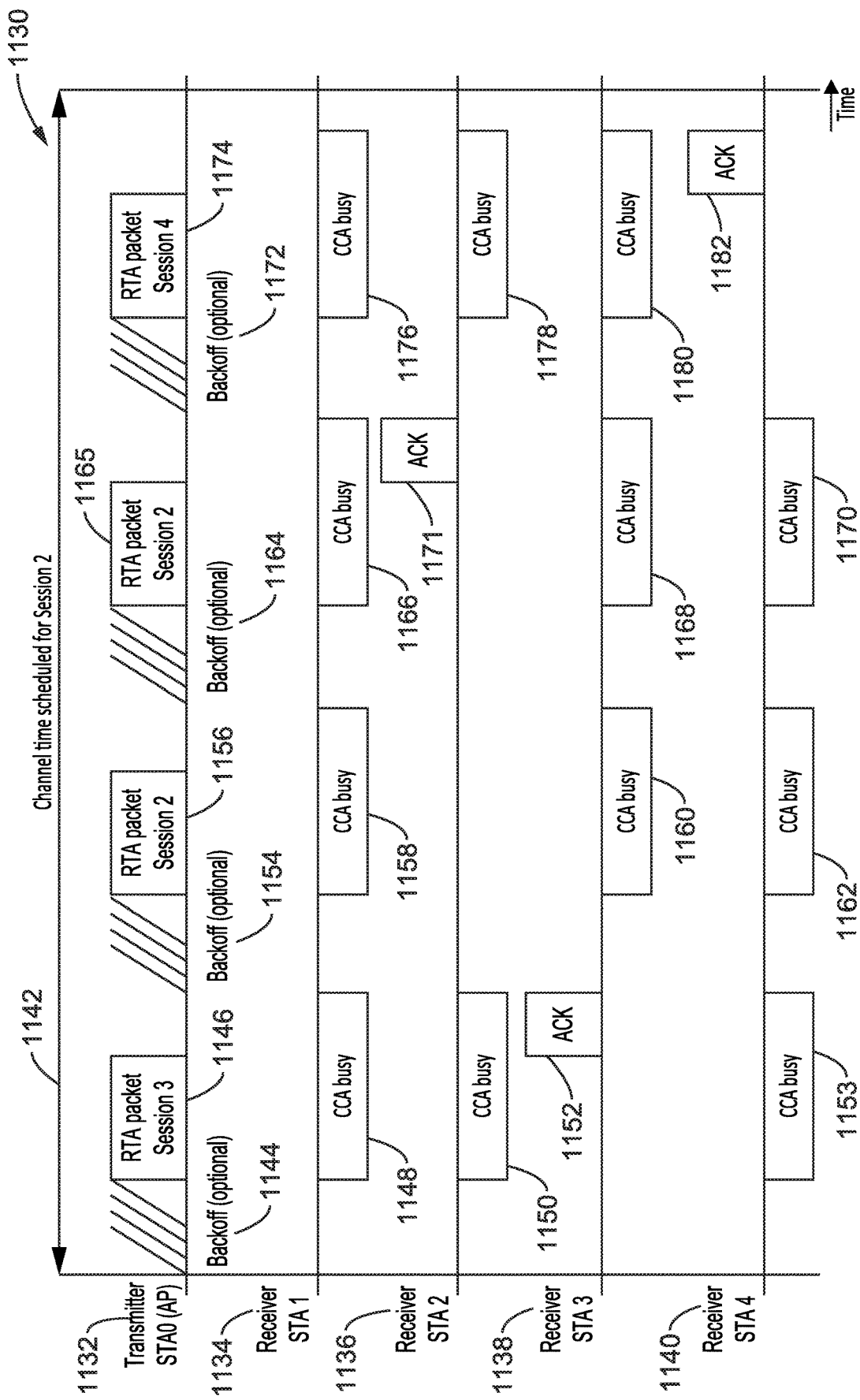
FIG. 40 is a communication sequence diagram exemplifying single user transmissions at STA 0 (AP) during the channel time scheduled for RTA session 2 according to at least one embodiment of the present disclosure.

FIG. 40 illustrates an example embodiment 1130 showing packet transmissions at STA 0 when the channel time is scheduled for RTA Session 2.

The figure depicts channel time scheduling 1142 for Session 2 in relation to transmitter STA0 (AP) 1132, receiver STA1 1134, receiver STA2 1136, receiver STA3 1138, and receiver STA4 1140. STA0 waits optional backoff 1144 and transmits an RTA packet 1146 to Session 3. Receiver STA1 1134, STA2 1136 and STA4 1140 set their CCA busy 1148, 1150, 1153. Receiver STA3 1138 sends an acknowledge (ACK) 1152 after receiving the RTA packet. STA0 1132 then is seen performing another optional backoff 1154 and transmits RTA packet 1156 for Session 2. Receiver STA1 1134, STA3 1138 and STA4 1140 set their CCA busy 1158, 1160, 1162. Receiver STA2 1136 does not receive the packet and thus does not send an acknowledge (ACK). STA0 1132 retries transmission to Session 2 with another optional backoff 1164 and transmits RTA packet 1165 for Session 2. Receiver STA1 1134, STA3 1138, STA4 1140 all set CCA busy 1166, 1168, 1170. On this retransmission, receiver STA2 1136 receives the packet and ACKs 1171. STA0 1132 waits an optional backoff 1172 and transmits an RTA packet 1174 to Session 4. Receiver STA1 1134, STA2 1136 and STA3 1138 set their CCA busy 1176, 1178, 1180. Receiver STA4 1140 sends an acknowledge (ACK) 1182 after receiving the RTA packet.

The queuing status associated with the above example was shown in FIG. 12. No new packets are generated during the channel time shown in the example. According to blocks 718. 722 and 726 of FIG. 31A and FIG. 31B, STA 0 considers the RTA packet of Session 2 as the candidate packet to transmit. However, if the packet at the top of the EA queue has higher priority than the candidate packet, as explained in blocks 728, 730, 734, and 736 of FIG. 31B, the STA transmits the RTA packets from the EA queue. As shown in FIG. 40, STA 0 transmits RTA packet of Session 3 first. Then, the RTA packet of session 4 in EA queue has lower priority than the RTA packets of session 2. According to blocks 728, 730, 734, and 740 of FIG. 31B, STA 0 transmits RTA packet of Session 2; however, the packet transmission fails. STA 0 retransmits the packet since the RTA packet is not expired or its number of retransmissions does not exceed the retry limit. This decision is made following the logic in blocks 800, 802, 806, 810, and 812 of FIG. 34. The retransmission succeeds, and STA 0 is able to use the remaining channel time to transmit RTA the packet of Session 4.

Figure 41:
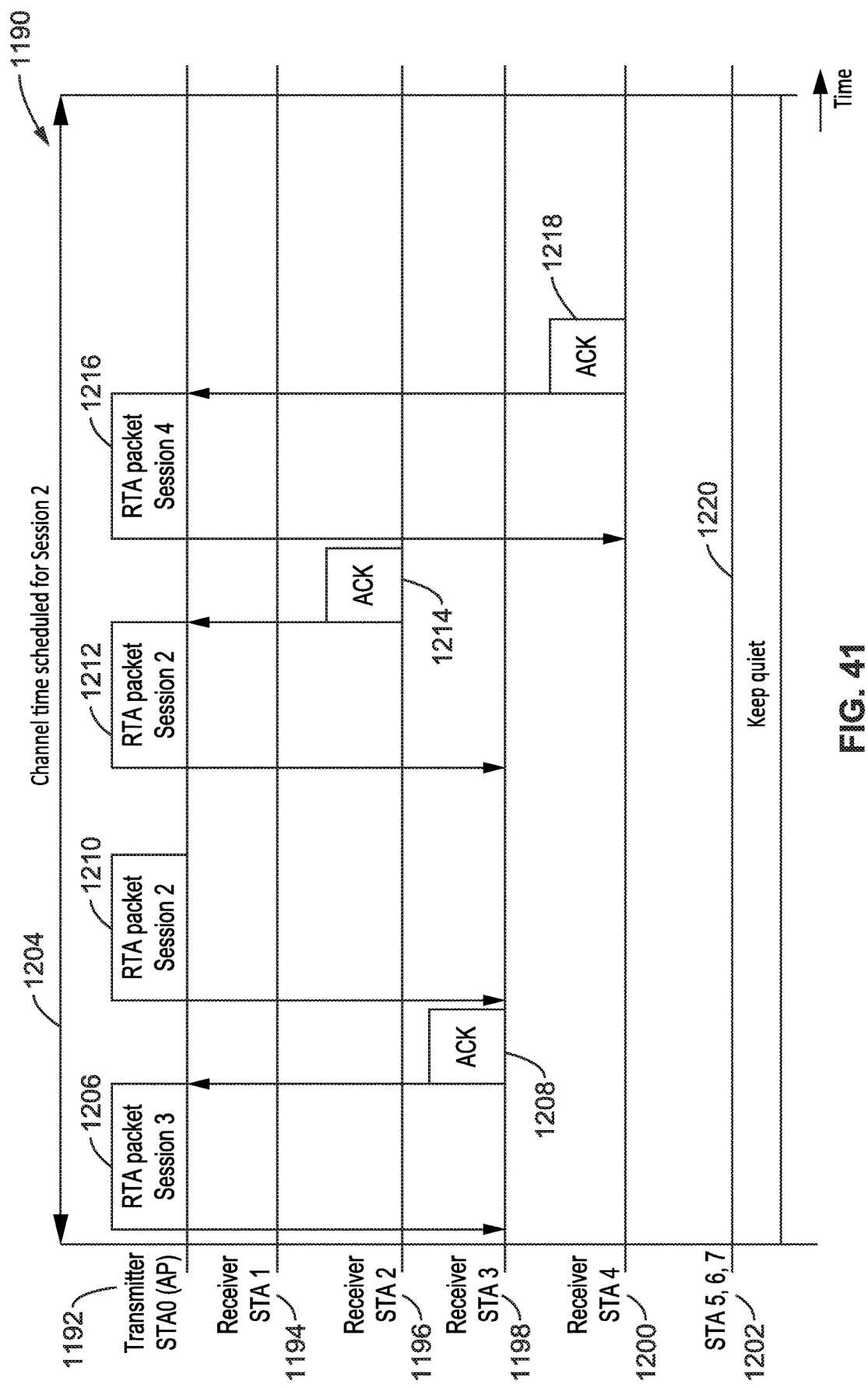
FIG. 41 is a communication sequence diagram exemplifying single user transmissions at STA 0 (AP) during the channel time scheduled for RTA session 2 when backoff time is not needed according to at least one embodiment of the present disclosure.

FIG. 41 illustrates an example embodiment 1190 of single user transmissions at STA0 1192 (AP) during the channel time scheduled for RTA Session 2 when backoff time is not needed. Since the channel time is scheduled for RTA Session 2, STA 0 may not need to wait backoff time to gain channel access. Then, the packet transmissions shown in FIG. 40 can occur as shown in FIG. 41, with the network topology as was shown in FIG. 5, having two BSSs.

The transmissions are shown in the figure involving transmitter STA0 (AP) 1192, receiver STA1 1194, receiver STA2 1196, receiver STA3 1198, receiver STA4 1200, and STAs 5, 6, 7 1202. Transmitter STA0 1192 sends an RTA packet 1206 to STA3 1198, which ACKs the packet 1208 upon receipt. Transmitter STA0 1192 sends an RTA packet 1210 to STA2 1196, for which no ACK was received as the packet was likely not received. Transmitter STA0 1192 resends an RTA packet 1212 to STA2 1196, which this time ACKs the packet 1214 upon receipt. Transmitter STA0 1192 sends an RTA packet 1216 to STA4 1200, which ACKs the packet 1218 upon receipt. It will be seen in the figure that STAs 5, 6, 7 1202 remain quiet 1220 during this time period.

Thus, it was seen that when all the nodes in the two BSS know (have been able to obtain information on) the channel time scheduling at STA 0, then they can avoid transmitting packets during the channel time scheduled for RTA Session 2. STA 0 knows (has determined) that there is no other STAs contending the channel and the backoff time is not needed in order to avoid a contention collision.

When an RTA packet of Session 2 is transmitted successfully, it is dequeued from the TA queue and SA queue. When RTA packets of Sessions 3 and 4 are transmitted successfully, they are dequeued from the RA queue and SA queue.

Figure 42:
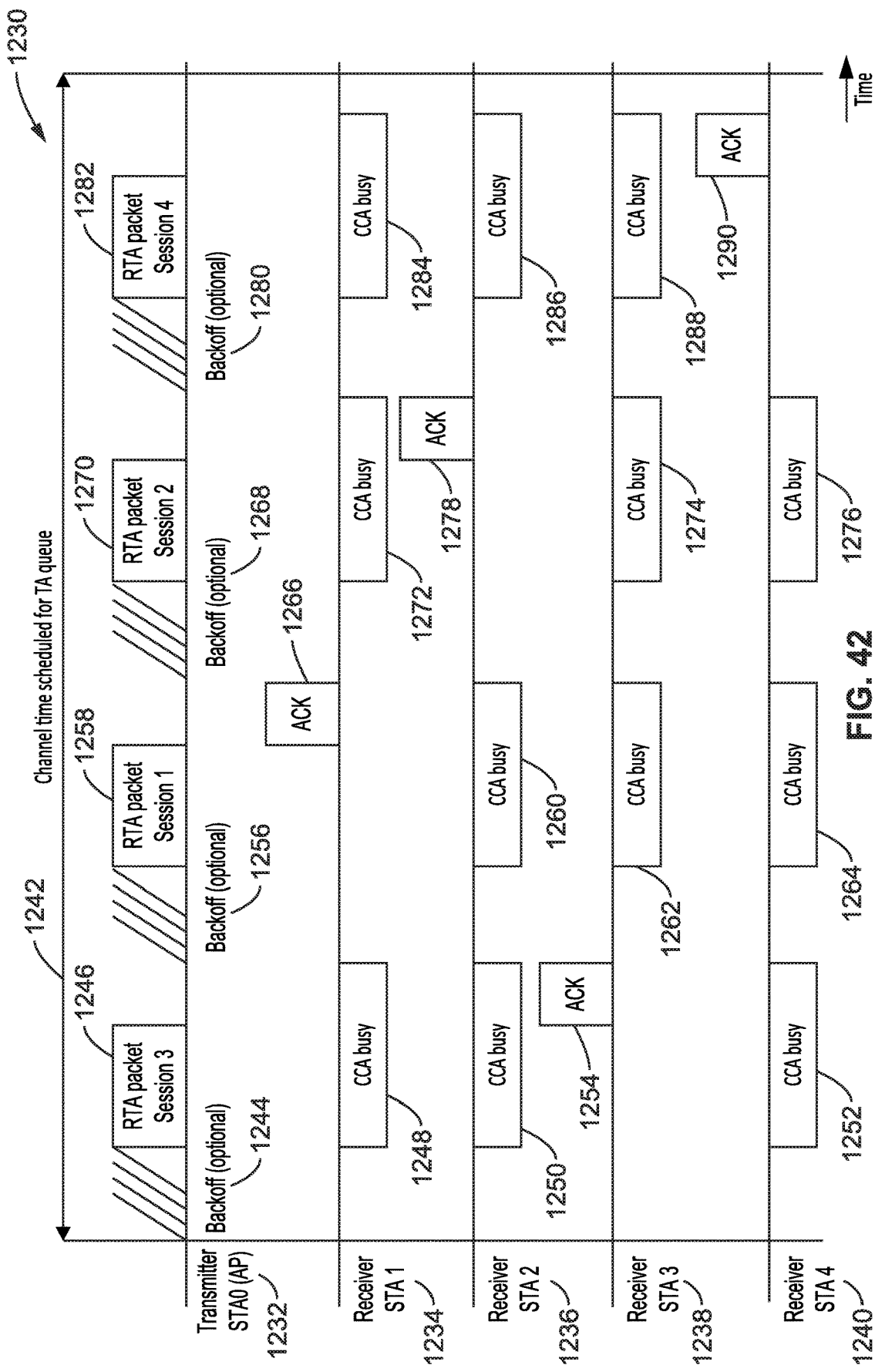
FIG. 42 is a communication sequence diagram exemplifying single user transmissions at STA 0 (AP) during the channel time scheduled for the TA queue according to at least one embodiment of the present disclosure.

FIG. 42 illustrates an example embodiment 1230 of packet transmissions at STA 0 when the channel time is scheduled for the TA queue.

The figure depicts channel time scheduling 1242 for the TA queue in relation to transmitter STA0 (AP) 1232, receiver STA1 1234, receiver STA2 1236, receiver STA3 1238, and receiver STA4 1240. STA0 waits optional backoff 1244 and transmits an RTA packet 1246 to Session 3. Receiver STA1 1234, STA2 1236 and STA4 1240 set their CCA busy 1248, 1250, 1252. Receiver STA3 1238 sends an acknowledge (ACK) 1254 after receiving the RTA packet. STA0 1232 is then seen performing another optional backoff 1256 and transmits RTA packet 1258 for Session 1. Receiver STA2 1236, STA3 1238 and STA4 1240 set their CCA busy 1260, 1262, 1264. Receiver STA1 1234 receives the packet and send an acknowledge (ACK) 1266. STA0 1232 performs another optional backoff 1268 and transmits RTA packet 1270 for Session 2. Receiver STA1 1134, STA3 1238 and STA4 1240 all set CCA busy 1272, 1274, 1276. Receiver STA2 1236 receives the packet and ACKs 1278. STA0 1232 waits an optional backoff 1280 and transmits RTA packet 1282 to Session 4. Receiver STA1 1234, STA2 1236 and STA3 1238 set their CCA busy 1284, 1286, 1288. Receiver STA4 1240 sends an acknowledge (ACK) 1290 after receiving the RTA packet.

The queuing status associated with the above example was previously shown in FIG. 12. No new packets are generated during the channel time shown in the example. As seen by blocks 718, 722, and 724 of FIG. 31A, STA 0 considers the RTA packet of Session 1 as the candidate packet to transmit. However, the first packet at the EA queue has higher priority than the candidate packet. As depicted in blocks 728, 730, 734 and 736 of FIG. 31B, the STA transmits the RTA packets in the EA queue. As was shown in FIG. 40, STA 0 transmits an RTA packet of Session 3 first. Then, the RTA packet of Session 4 in EA queue has lower priority than the RTA packets of Session 1 in TA queue. According to blocks 728, 730, 734 and 740 of FIG. 31B, STA 0 transmits RTA packet of Session 1. Next, the priority of RTA packet of Session 2 is also higher than the priority of RTA packet of Session 1. STA 0 transmits RTA packets of Session 2 before transmitting RTA packet of Session 4.

4.6.2.3. Multi-User Downlink Scenario

FIG. 43A through FIG. 43D illustrates an example embodiment 1310, of RTA queue sub-systems at STA 0 to separate the packets by receiver nodes. In a multi-user downlink scenario, the AP can classify the packets in the queues by their receiver nodes. The figures depict the RTA queues as Emergency Access (EA), Time-allocated Access (TA), and Session-based access (SA), while the non-RTA queues are depicted as Voice (VO), Video (VI), Best Effort (BE) and Background (BK). For the purpose of deciding which packet to transmit to each receiver STA, the AP can create multiple RTA queue sub-systems for each of the receiver nodes as shown in FIG. 43A through FIG. 43D. The original RTA queue system for these figures is shown in FIG. 12.

In this illustration STA 0 creates four RTA queue subsystems 1312 in FIG. 43A, 1314 in FIG. 43B, 1316 in FIG. 43C and 1318 in FIG. 43D, to separate the packets by their receiver nodes. That is, each RTA queue sub-system only lists the packets of the same receiver node. The order of the packets of the same receiver node in the queues does not change compared to their orders in the original RTA queue system in FIG. 43A through FIG. 43D. In each sub-system, the AP can decide which packet to transmit by following the logic in FIG. 34. Then, the AP transmits those packets to the receiver nodes using multi-user transmission packets. In FIG. 43A the example 1312 shows a packet which needs to be transmitted to STA 1, FIG. 43B depicts 1314 a case in which a packet needs to be transmitted to STA 3, FIG. 43C depicts 1316 a case in which a packet needs to be transmitted to STA 2, and FIG. 43D depicts 1318 a case in which a packet needs to be transmitted to STA 4.

Figure 44:
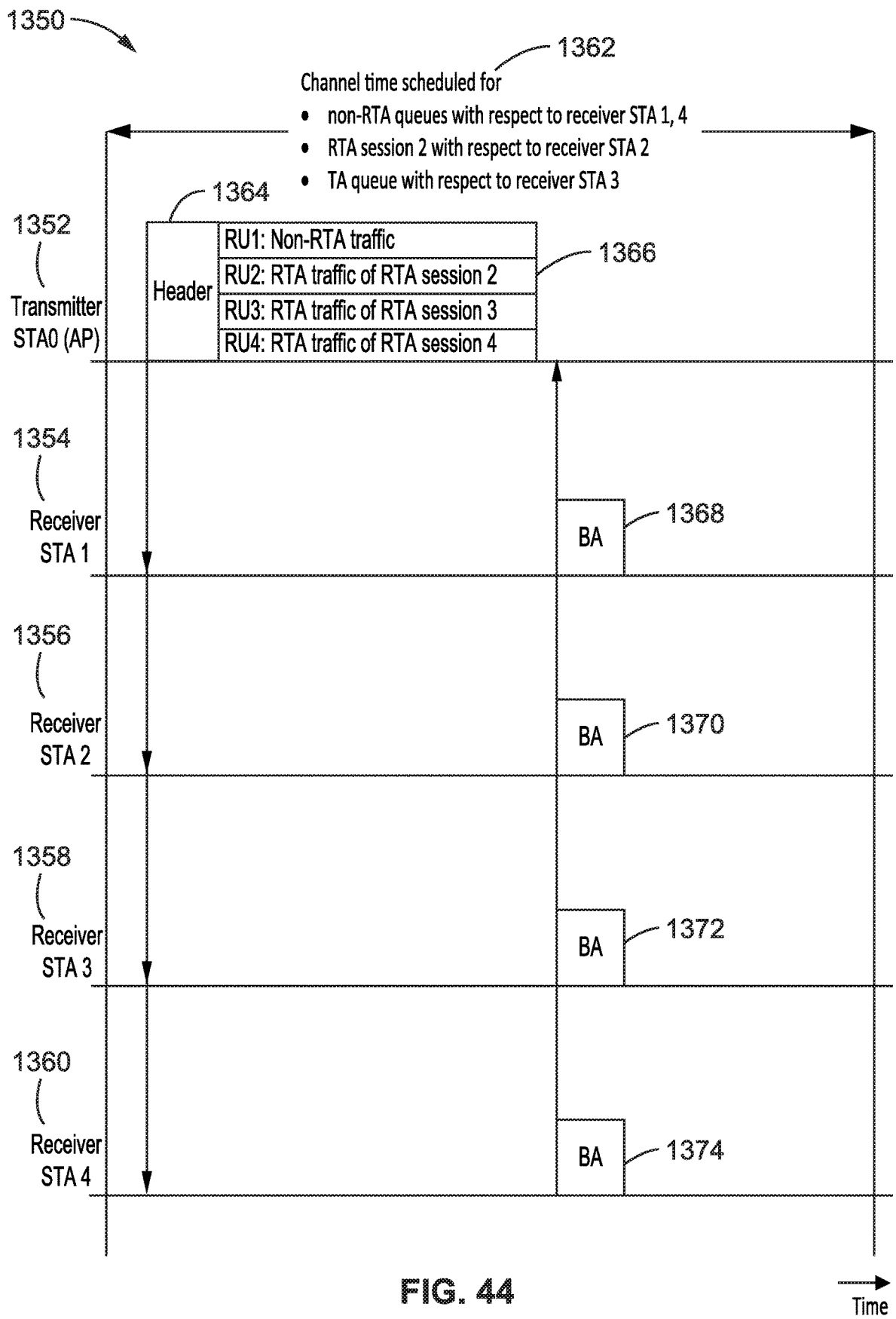
FIG. 44 is a communication sequence diagram exemplifying multi-user downlink transmissions according to at least one embodiment of the present disclosure.

FIG. 44 illustrates an example embodiment 1350 of multi-user downlink transmissions at STA 0. For each receiver node, STA 0 chooses the packet to transmit separately. The packet is chosen from the queue sub-system with respect to each receiver node as shown in FIG. 43A through FIG. 43D. The logic of choosing the packet for transmission is the same as in the single user transmission scenario. The channel time 1362 is scheduled for non-RTA queues with respect to receiver STAs 1 and 4, RTA Session 2 with respect to receiver STA2, and the TA queue with respect to receiver STA 3.

The figure depicts operations for transmitter STA0 (AP) 1352, receiver STA1 1354, receiver STA2 1356, receiver STA3 1358 and receiver STA4 1360. A transmission header 1364 and data 1366 are shown in the figure. Since the EA queue does not have packets to transmit to STA 1, STA 0 uses Resource Unit (RU) 1 to transmit non-RTA packets to STA 1. However, the EA queue has RTA traffic of Session 4 to transmit to STA 4. STA 0 uses RU 4 to transmit RTA traffic of Session 4. The channel time is scheduled for RTA Session 2 with respect to receiver STA 2. Then, STA 0 uses RU 2 to transmit RTA packet of RTA Session 2 in the SA queue since there is no RTA packets in the EA queue. The channel time is scheduled for the TA queue with respect to receiver STA 3. Though there is no RTA packet to transmit to STA 3 in the TA queue, the EA queue is not empty. STA 0 uses RU 4 to transmit an RTA packet of Session 3 from the EA queue. Block Acknowledgments (BAs) 1368, 1370, 1372, 1374 are seen being sent back to STA0.

4.6.2.4. Multi-User Uplink Scenario

In a multi-user (multiple-user) uplink scenario, the payload of the multi-user transmission packet can be different, such as was depicted in blocks 714, 716 of FIG. 31A. If the trigger frame contains the RTA traffic information, then the transmitter STA transmits the packet according to the RTA traffic information. Otherwise, the transmitter STA can choose which packet to transmit based on the scheduled channel time.

Figures 45, 46, 47:
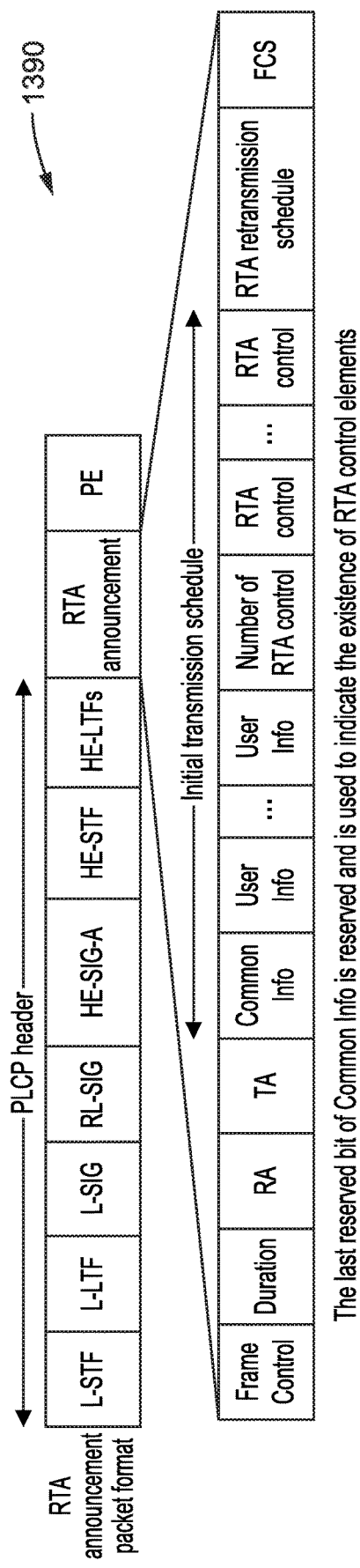
FIG. 45 is a data field diagram of an RTA announcement trigger frame (RTA-TF) for RTA data transmission in multi-user mode according to at least one embodiment of the present disclosure.
FIG. 46 is a data field diagram of an RTA control field format according to at least one embodiment of the present disclosure.
FIG. 47 is a data field diagram of an RTA retransmission schedule field format according to at least one embodiment of the present disclosure.

FIG. 45 illustrates an example embodiment 1390 of a packet format for the trigger frame containing the RTA traffic information (RTA-TF). In at least one embodiment, the fields L-STF, L-LTF, L-SIG, RL-SIG, HE-SIG-A, HE-STF, HE-LTF, PE of the frame can be identical to the regular HE-TB PPDU format in IEEE 802.11ax. The RTA announcement field represents the MAC frame of the packet. The frame control field indicates the type of frame. The duration field contains NAV information used for CSMA/CA channel access. The RA field contains an address for the recipient of the frame. The TA field contains the address of the STA that transmitted the frame. The following fields represent the initial transmission schedule for the packet. The common info field and the user info fields can be identical to the fields in the trigger frame defined in IEEE 802.11ax. These two fields contain the information of the separate resource block allocation information. The Number of RTA control indicates the number of the RTA control fields following this field.

FIG. 46 illustrates an example embodiment 1410 of an RTA control field having the following fields. A Length field indicates the length of the RTA control field. A Source address field indicates the address of the transmitter STA. A Destination address field indicates the address of the receiver STA; although in at least one embodiment it can also be the address of the receiver STA, AID, or other types of identification information. A Packet ID field indicates the identification of the packet. The packets having the same packet ID and carry the same RTA traffic in the packets. A Notification request field indicates whether notification is requested by the transmitter STA, and in this example is depicted as a one bit indication field. When this bit is set to a first state (e.g., "1"), then notification is requested after the packet transmission finishes, and the receiver STA sends the notification back to the transmitter STA to report the correctness of the packet transmission. Otherwise, the bit is set to a second state (e.g., "0"). A More retransmission field indicates whether another retransmission is scheduled after this transmission. Setting the bit to a first state (e.g., "1") indicates that there is a retransmission. Otherwise, the bit is set to a second state (e.g., "0"). A Traffic type field indicates that the types of traffic can be RTA traffic, non-RTA traffic or other types of traffic. An RTA session ID field provides the identifying information for the RTA session, which could use the information as listed in Table 1. One example was given in FIG. 7. A Priority field indicates the priority of RTA traffic. A Bandwidth requirement field indicates the bandwidth required for RTA transmission. A Packet lifetime field indicates a lifetime to the expiration time of this packet. A Periodic time field indicates the periodic time of the RTA traffic generating packet. A HARQ type field is an indication of the hybrid ARQ (HARQ) type that is used; while HARQ can also be disabled by setting this field to a given value.

FIG. 47 illustrates an example embodiment 1430 of an RTA retransmission schedule field having the following fields. A Number of retransmission field indicates the number of retransmission schedules included in this field. A Retransmission schedule field indicates the retransmission schedule for each time. The length inside indicates the length of the schedule field. In at least one embodiment the common info field and the user info fields can be identical to the fields in the trigger frame defined in IEEE 802.11ax, respectively. The number of RTA control field indicates the number of the RTA control fields following this field. The RTA control field was shown in FIG. 46.

Figure 48:
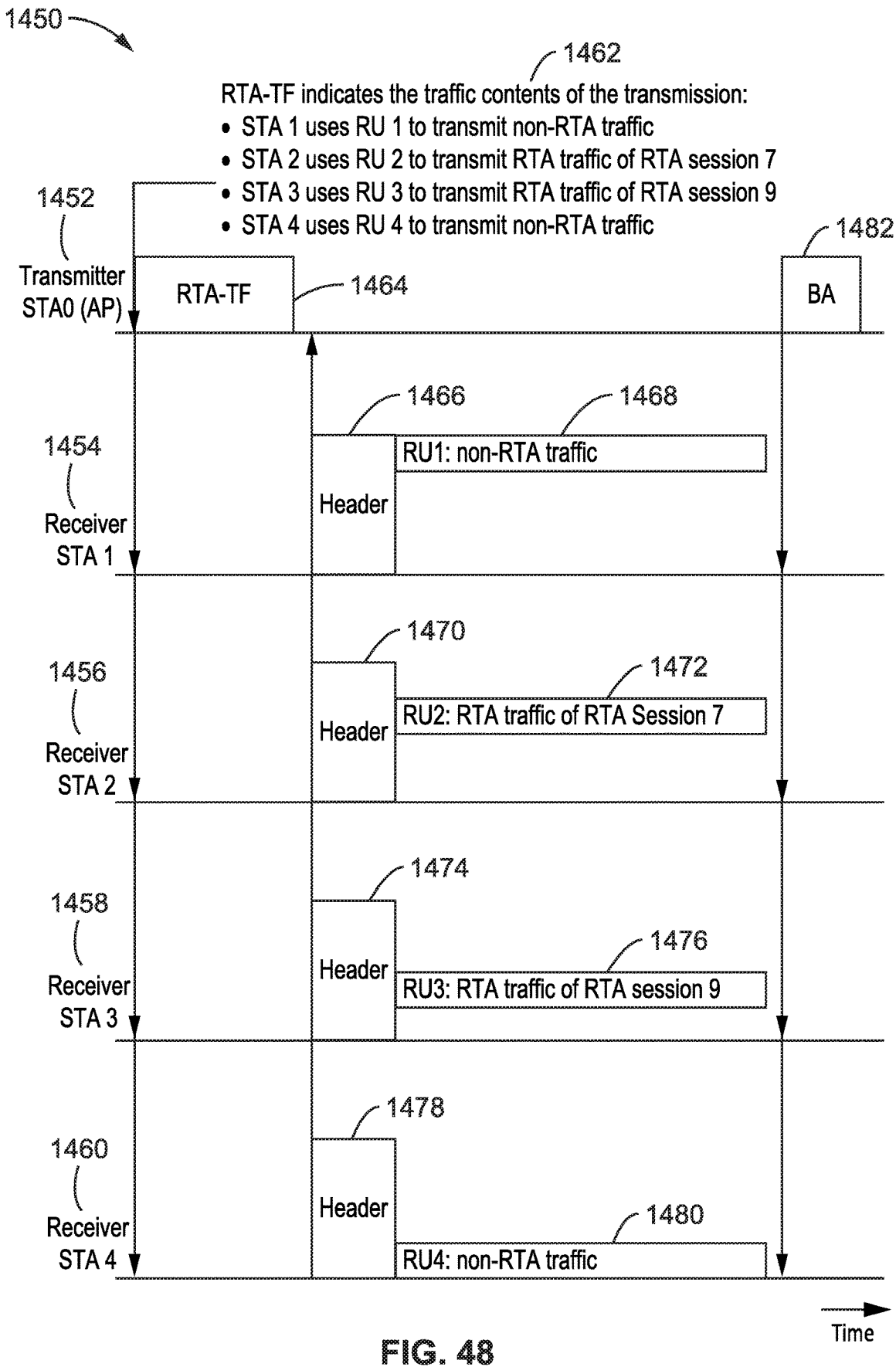
FIG. 48 is a communication sequence diagram exemplifying multi-user uplink transmission launched by RTA-Trigger Frame (TF) according to at least one embodiment of the present disclosure.

FIG. 48 illustrates an example embodiment 1450 showing multi-user uplink transmission when AP (STA 0) transmits an RTA-TF 1464 to launch the transmission. The figure depicts traffic in response to receipt of this RTA-TF in relation to transmitter STA0 (AP) 1452, receiver STA1 1454, receiver STA2 1456, receiver STA3 1458, and receiver STA4 1460. Traffic information is shown embedded in RTA-TF 1462 in which STA 1 uses RU 1 to transmit non-RTA traffic, STA 2 uses RU 2 to transmit RTA traffic of RTA Session 7, STA 3 uses RU 3 to transmit RTA traffic of RTA Session 9 and STA 4 uses RU 4 to transmit non-RTA traffic.

According to the traffic information embedded in the RTA-TF 1462, the transmitter STAs can know (determine) which packet to transmit. As shown in the example, STA 1 decodes its RTA control field and finds that the traffic type is set to non-RTA traffic, and it transmits a header 1466 and non-RTA traffic 1468 in the multi-user uplink transmission. This was previously explained in blocks 714, 716, 732 of FIG. 31A and FIG. 31B. Returning to FIG. 48, when STA 2 decodes its RTA control field and the traffic type is RTA traffic with an RTA session ID field set to Session 7, it transmits header 1470 with RTA traffic of Session 7 1472 in the multi-user uplink transmission. Similarly, STA 3 and STA 4 transmit their headers 1474, 1478 and RTA packet of Session 9 1476 and non-RTA packet 1480 according to the traffic information in RTA-TF, respectively. After which STA0 1452 sends a block acknowledge (BA) 1482.

According to blocks 714, 716 of FIG. 31A, when the AP transmits a regular TF without traffic information, the transmitter STAs are able to decide which packet to transmit according to the scheduled channel time. The logic of choosing the packet as seen in FIG. 48 is the same as seen in the single user transmission scenario shown in FIG. 31A and FIG. 31B.

Figure 49:
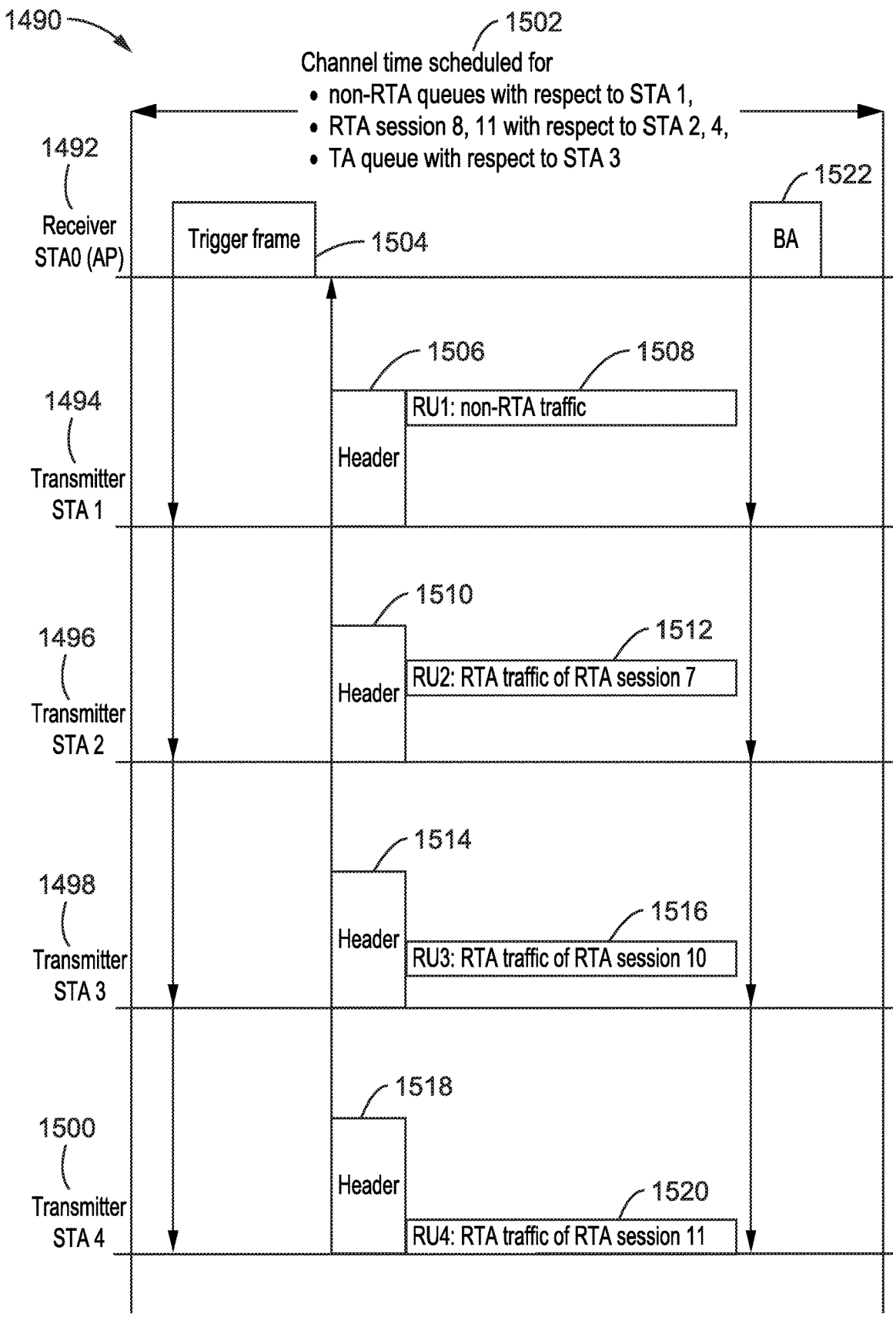
FIG. 49 is a communication sequence diagram exemplifying multi-user uplink transmission launched by regular Trigger Frame (TF) according to at least one embodiment of the present disclosure.

FIG. 49 illustrates an example embodiment 1490 multi-user uplink launched by a regular trigger frame (TF) 1504. Channel time is shown scheduled 1502 for non-RTA queues with respect to STA 1; RTA Session 8 and STA 11 with respect to STA 2 and STA 4; and the TA queue with respect to STA 3. The figure shows interaction between STA0 (AP) 1492, transmitter STA1 1494, transmitter STA2 1496, transmitter STA3 1498 and transmitter STA4 1500.

When STAs 1, 2, 3, and 4 receive the regular TF 1504 from the AP (STA 0), they decide (determine) which packet to transmit according to the scheduled channel time on their own sides. The channel time is scheduled for non-RTA queues at STA 1. Since the EA queue at STA 1 is empty, STA 1 transmits a header 1506 along with non-RTA traffic 1508 in the multi-user transmission. The channel time is scheduled for RTA Sessions 8 and 11 at STAs 2 and 4, respectively. Since the priority of the RTA packet of RTA session 7 in EA queue is higher than the RTA packet of RTA Session 8, STA 2 transmits a header 1510 and the RTA packet 1512 of RTA Session 7 in EA queue first. STA 4 transmits a header 1514 and an RTA packet 1516 of RTA Session 11 since there is no other RTA packets in its EA queue. The channel time is scheduled for the TA queue at STA 3. Since the priority of the RTA packet of RTA Session 10 in the TA queue is higher than the RTA packet of RTA session 9 in EA queue, STA 3 transmits a header 1518 with the RTA packet 1520 of RTA session 10 first. STA0 1492 responds with a block acknowledge 1522.

5. General Scope of Embodiments

The enhancements described in the presented technology can be readily implemented within various wireless networking stations. It should also be appreciated that wireless networking stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with wireless networking. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform one or more steps comprising: (d)(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist; (d)(ii) distinguishing real-time application (RTA) packets from non-real-time application (non-RTA) packets; (d)(iii) creating RTA queues to enqueue RTA packets while non-RTA packets are pushed into non-RTA queues; (d)(iv) exchanging management frames containing RTA session parameters and RTA queue setting information; (d)(v) allocating channel time to said RTA queues for transmitting packets, during which non-RTA queues are not allowed to access the channel; and (d)(vi) determining which RTA queues to enqueue an RTA packet into based on RTA queue classification information of its RTA session.

2. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform one or more steps comprising: (d)(i) operating said wireless communication circuit as a wireless local area network (WLAN) station, a station, configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist; (d)(ii) distinguishing real-time application (RTA) packets from non-real-time application (non-RTA) packets, wherein the STA distinguishes RTA traffic and non-RTA traffic by utilizing information based on prior negotiation or packet header information; (d)(iii) creating RTA queues to enqueue RTA packets while non-RTA packets are pushed into non-RTA queues; (d)(iv) exchanging management frames containing RTA session parameters and RTA queue setting information; (d)(v) allocating channel time to said RTA queues for transmitting packets, during which non-RTA queues are not allowed to access the channel; (d)(vi) determining which RTA queues to enqueue an RTA packet into based on RTA queue classification information of its RTA session; (d)(vii) wherein the station sets the expiration time of an RTA packet and dequeues the expired RTA packet from all the RTA queues within which it is enqueued.

3. A method of performing wireless communication in a network, comprising: (a) operating a wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist; (b) distinguishing real-time application (RTA) packets from non-real-time application (non-RTA) packets; (c) creating RTA queues to enqueue RTA packets while non-RTA packets are pushed into non-RTA queues; (d) exchanging management frames containing RTA session parameters and RTA queue setting information; (e) allocating channel time to said RTA queues for transmitting packets, during which non-RTA queues are not allowed to access the channel; and (f) determining which RTA queues to enqueue an RTA packet into based on RTA queue classification information of its RTA session.

4. A wireless communication system/apparatus performing transmission of packets, where CSMA/CA is applied, the real time application (RTA) traffic and non-RTA traffic coexist in the system/apparatus, comprising: (a) STA distinguishes the RTA traffic and non-RTA traffic; (b) STA creates RTA queues to enqueue RTA packets while non-RTA packets are pushed into non-RTA queues, such as EDCA queues; (c) STAs exchange management frames containing RTA session parameters and RTA queue setting information; (d) STA allocates channel time to the RTA queues for transmitting during which non-RTA queues are not allowed to access the channel; (e) STA decides which RTA queues to enqueue an RTA packet based on the RTA queue classification information of its RTA session; (f) STA sets the expiration time of an RTA packet and dequeues the expired RTA packet from all the RTA queues it is enqueued.

5. The apparatus or method of any preceding embodiment, wherein said instructions when executed by the processor further perform one or more steps in which the station sets the expiration time of an RTA packet and dequeues an expired RTA packet from all the RTA queues within which it is enqueued.

6. The apparatus or method of any preceding embodiment, wherein said instructions when executed by the processor further perform one or more steps of the station distinguishing the RTA traffic and non-RTA traffic by utilizing information based on prior negotiation or packet header information.

7. The apparatus or method of any preceding embodiment, wherein said instructions when executed by the processor further perform one or more steps in which the station creating an RTA queue is configured to allow that queue to access the channel using channel time allocated to other queues.

8. The apparatus or method of any preceding embodiment, wherein said instructions when executed by the processor further perform one or more steps comprising the station creating an RTA queue and is configured to sort the RTA packets in the queue by calculating the importance index of each packet based on their expiration times and priorities.

9. The apparatus or method of any preceding embodiment, wherein said instructions when executed by the processor further perform one or more steps in which the station creating an RTA queue is configured to transmit the RTA packets in the queue based on RTA session information without considering packet order in the queue.

10. The apparatus or method of any preceding embodiment, wherein said instructions when executed by the processor further perform one or more steps in which the station creating an RTA queue is configured to limit channel resources allocated to that queue.

11. The apparatus or method of any preceding embodiment, wherein said instructions when executed by the processor further perform one or more steps comprising exchanging management frames containing RTA session parameters and the setting of RTA queue classification, RTA packet expiration time, and how to handle expired RTA packets for the RTA session between the station and other stations on the network.

12. The apparatus or method of any preceding embodiment, wherein said instructions when executed by the processor further perform one or more steps in which the station and other stations on the network exchange management frames containing RTA queue setting information and the setting of RTA queuing discipline, RTA queue channel time allocation, and RTA queue channel resource limitation for each queue.

13. The apparatus or method of any preceding embodiment, wherein said instructions when executed by the processor further perform one or more steps in which the station deciding which RTA queues to enqueue an RTA packet into is configured to utilize queue information of the RTA session exchanged by prior negotiation in making the determination.

14. The apparatus or method of any preceding embodiment, wherein said instructions when executed by the processor further perform one or more steps in which the station enqueuing an RTA packet is configured to push this packet into multiple RTA queues based on the latency requirement.

15. The apparatus or method of any preceding embodiment, wherein said instructions when executed by the processor further perform one or more steps in which the station enqueuing an RTA packet is configured to dequeue that RTA packet from all the queues when that packet is transmitted successfully through one queue.

16. The apparatus or method of any preceding embodiment, wherein said instructions when executed by the processor further perform one or more steps in which the station setting an expiration time of an RTA packet is configured to decide either to drop the packet or move the packet to non-RTA queues upon reaching that expiration time.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Header Information for Identifying
RTA Traffic at the Transmitter Side

| Layers | Header information |
|---|---|
| APP | RTA session ID, RTA session name, signature |
| Transport | TCP/UDP port numbers |
| Network | IP address of source & destination, type of service |

TABLE 2

List of RTA Session Status

| RTA Session Status | Action in Status |
|---|---|
| Active | Session is active to generate traffic |
| Inactive | Session is disabled to not generate traffic |
| Error | Session has error(s) |

TABLE 3

RTA Session Initiation Request Message Format

| Function | RTASESSIONINIT.request (STAAddress, RTAId, RequirementInfo, QueueInfo) |
|---|---|
| When generated | SME of STA generates this message and passes it to its MLME when STA launches RTA session initiation procedure |
| Effect of receipt | When MLME of STA receives message, it transmits RTA session initiation request frame to recipient |

| | Name | Type | Description |
|---|---|---|---|
| Parameters | STAAddress | MAC address | Specifies the recipient STA MAC address |
| | RTAId | as defined in FIG. 9 | Specifies info to identify RTA traffic |
| | RequirementInfo | as defined in FIG. 13 | Requirements of RTA session for initiation |

TABLE 3-continued

RTA Session Initiation Request Message Format

| | QueueInfo | as defined in FIG. 13 | Queue information RTA session initiation |
|---|---|---|---|

TABLE 4

RTA Session Initiation Indication Message Format

| Function | RTASESSIONINIT.indication (STAAddress, RTAId, RequirementInfo, QueueInfo) |
|---|---|
| When generated | MLME of STA generates this message and passes it to its SME when the MLME of STA receives an RTA session initiation request frame |
| Effect of receipt | When SME of STA receives message, it communicates with RTA user to decide whether to accept the RTA session initiation request or reject it |

| | Name | Type | Description |
|---|---|---|---|
| Parameters | STAAddress | MAC address | Specifies the originator STA MAC address |
| | RTAId | as defined in FIG. 9 | Specifies info to identify RTA traffic |
| | RequirementInfo | as defined in FIG. 13 | Requirements of RTA session for initiation |
| | QueueInfo | as defined in FIG. 13 | Queue information RTA session initiation |

TABLE 5

RTA Session Initiation Response Message Format

| Function | RTASESSIONINIT.response (STAAddress, RTAId, InitiationSuccess, TransmissionInfo, StatusInfo, QueueInfo) |
|---|---|
| When generated | SME of STA generates & transmits message it to its MLME when STA decides to accept an RTA session initiation request |
| Effect of receipt | When MLME of STA receives this message, it transmits an RTA session initiation response frame to the recipient STA |

| | Name | Type | Description |
|---|---|---|---|
| Parameters | STAAddress | MAC address | Specifies the originator STA MAC address |
| | RTAId | as defined in FIG. 9 | Specifies info to identify RTA traffic |
| | InitiationSuccess | Boolean | If True, initiation succeeded, else it failed |
| | Transmission Info | as defined in FIG. 13 | Tx info of the RTA session for initiation |
| | StatusInfo | as defined in FIG. 13 | Status of RTA session for initiation |
| | QueueInfo | as defined in FIG. 13 | Queue information RTA session initiation |

TABLE 6

RTA Session Initiation Confirm Message Format

| Function | RTASESSIONINIT.confirm (STAAddress, RTAId, InitiationSuccess, TransmissionInfo, StatusInfo, QueueInfo) |
|---|---|
| When generated | MLME of STA generates this message and passes it to its SME when the MLME of STA receives an RTA session initiation response frame |
| Effect of receipt | When SME of STA receives this message, it knows the RTA session initiation is finished and informs RTA users |

| | Name | Type | Description |
|---|---|---|---|
| Parameters | STAAddress | MAC address | Specifies the recipient STA MAC address |
| | RTAId | as defined in FIG. 9 | Specifies info to identify RTA traffic |

TABLE 6-continued

RTA Session Initiation Confirm Message Format

| | | |
|---|---|---|
| InitiationSuccess | Boolean | If True, initiation succeeded, else it failed |
| Transmission Info | as defined in FIG. 13 | Tx info of the RTA session for initiation |
| StatusInfo | as defined in FIG. 13 | Status of RTA session for initiation |
| QueueInfo | as defined in FIG. 13 | Queue information RTA session initiation |

TABLE 7

Set RTA Queue Sort Request Message Format

| | |
|---|---|
| Function | SETRTAQUEUESORT.request (STAAddress, RTAQueueType, SortAlgorithm) |
| When generated | SME of a STA (e.g., AP) generates this message and transmits it to its MLME when a STA decides to update the queuing discipline of another STA |
| Effect of receipt | When the MLME of STA receives this message, it transmits an RTA queue sorting frame to the recipient STA |

| | Name | Type | Description |
|---|---|---|---|
| Parameters | STAAddress | MAC address | Specifies the recipient STA MAC address |
| | RTAQueueType | enumerated value | value 0 represents RA queue, 1 represents TA queue, and 2 represents SA queue |
| | SortAlgorithm | Algorithm Descriptor | Sort Algorithm parameter indicates which algorithm to use in sorting RTA queue |

TABLE 8

Set RTA Queue Sort Indication Message Format

| | |
|---|---|
| Function | SETRTAQUEUESORT.indication (STAAddress, RTAQueueType, SortAlgorithm) |
| When generated | MLME of STA generates message and passes it to SME when the MLME of a STA receives an RTA queue sorting frame |
| Effect of receipt | When the SME of STA receives this message, it needs to sort the RTA packets in the RTA queues according to the information in the message |

| | Name | Type | Description |
|---|---|---|---|
| Parameters | STAAddress | MAC address | Specifies originator STA MAC address |
| | RTAQueueType | enumerated value | value 0 represents RA queue, 1 represents TA queue, and 2 represents SA queue |
| | SortAlgorithm | Algorithm Descriptor | Sort Algorithm parameter indicates which algorithm to use in sorting RTA queue |

TABLE 9

RTA Queue Time Allocation Request Message Format

| | |
|---|---|
| Function | QUEUETIMEALLOCATION.request (STAAddress, QueueType, PeriodicTime, StartTime, DurationofEachPeriod, EndTime) |
| When generated | SME of STA generates this message and transmits it to its MLME when STA decides to allocate the channel time to a queue at the other STA |
| Effect of receipt | When the MLME of STA receives this message, it transmits a queue channel time allocation frame to the recipient STA |

| | Name | Type | Description |
|---|---|---|---|
| Parameters | STAAddress | MAC address | Specifies the recipient STA MAC address |
| | QueueType | as enumerated value | Value 0 represents TA queue, 1 is non-RTA queues. (More values can be used to represent each AC queue in non-RTA queues) |
| | Periodic Time | Time | Specifies how often STA gets a period of time to tx packets in that queue |
| | StartTime | Time | Specifies time when STA gets period of time to tx packets in that queue for the first time |
| | DurationEachPeriod | Time | Specifies channel time STA gets to transmit packets in queue every periodic time |
| | EndTime | Time | Specifies time since when STA no longer has a period of time to transmit packets in that queue |

TABLE 10

RTA Queue Time Allocation Indication Message Format

| | |
|---|---|
| Function | QUEUETIMEALLOCATION.indication (STAAddress, QueueType, PeriodicTime, StartTime, DurationofEachPeriod, EndTime)) |
| When generated | MLME of STA generates this message and passes it to its SME when the MLME of STA receives a queue channel time allocation frame |
| Effect of receipt | When the SME of STA receives this message, it needs to allocate channel time to the queue according to the information in the queue channel time allocation frame |

| | Name | Type | Description |
|---|---|---|---|
| Parameters | STAAddress | MAC address | Specifies the recipient STA MAC address |
| | QueueType | as enumerated value | Value 0 represents TA queue, 1 is non-RTA queues. (More values can be used to represent each AC queue in non-RTA queues) |
| | Periodic Time | Time | Specifies how often STA gets a period of time to tx packets in that queue |
| | StartTime | Time | Specifies time when STA gets period of time to tx packets in that queue for the first time |
| | DurationEachPeriod | Time | Specifies channel time STA gets to transmit packets in queue every periodic time |
| | EndTime | Time | Specifies time since when STA no longer has a period of time to transmit packets in that queue |

TABLE 11

RTAQUEUEPARASET.request message format

| | | | |
|---|---|---|---|
| Function | RTAQUEUEPARASET.request (STAAddress, RTAQueueType, MaxBufferSize, MaxChannelTime, MaxNumofRTASessions) | | |
| When generated | The SME of STA generates this message and transmits it to its MLME when STA decides to set the parameter of an RTA queue of the other STA | | |
| Effect of receipt | When the MLME of STA receives this message, it transmits an RTA queue parameter setting frame to the recipient STA | | |
| | Name | Type | Description |
| Parameters | STAAddress | MAC address | Specifies the recipient STA MAC address |
| | RTAQueueType | as enumerated value | Value 0 represents RAqueue, 1 is TA queue, and 2 represents SA queue |
| | MaxBufferSize | Integer | Specifies the maximum buffer size of RTA queue |
| | MaxChannelTime | Float | Specifies maximum channel time ratio for transmitting packets from RTA queue |
| | MaxNumofRTASessions | Integer | Specifies maximum number of RTA sessions whose packets can wait in RTA queue |

TABLE 12

RTAQUEUEPARASET.indication message format

| | | | |
|---|---|---|---|
| Function | RTAQUEUEPARASET.indication (STAAddress, RTAQueueType, MaxBufferSize, MaxChannelTime, MaxNumofRTASessions) | | |
| When generated | The MLME of STA generates this message and passes it to its SME when the MLME of STA receives an RTA queue parameter setting frame | | |
| Effect of receipt | When the SME of STA receives this message, it needs to set the RTA queue parameters according to the information in the RTA queue parameter setting frame | | |
| | Name | Type | Description |
| Parameters | STAAddress | MAC address | Specifies the originator STA MAC address |
| | RTAQueueType | as enumerated value | Value 0 represents RA queue, 1 is TA queue, and 2 represents SA queue |
| | MaxBufferSize | Integer | Specifies the maximum buffer size of RTA queue |
| | MaxChannelTime | Float | Specifies maximum channel time ratio for transmitting packets from RTA queue |
| | MaxNumofRTASessions | Integer | Specifies maximum number of RTA sessions whose packets can wait in RTA queue |

TABLE 13

RTA Session Information

| Session ID | Tx Node | Rx Node | Priority | Queue Type |
|---|---|---|---|---|
| 1 | STA0 | STA1 | 5 | TA/SA |
| 2 | STA0 | STA2 | 5 | TA/SA |
| 3 | STA0 | STA3 | 6 | EA/SA |
| 4 | STA0 | STA4 | 4 | EA/SA |
| 5 | STA1 | STA0 | 3 | TA/SA |
| 6 | STA1 | STA0 | 5 | TA/SA |
| 7 | STA2 | STA0 | 5 | EA/SA |
| 8 | STA2 | STA0 | 4 | TA/SA |
| 9 | STA3 | STA0 | 4 | EA/SA |
| 10 | STA3 | STA0 | 5 | TA/SA |
| 11 | STA4 | STA0 | 3 | SA |

What is claimed is:

1. An apparatus for wireless communication in a network, the apparatus comprising:
   (a) a wireless communication circuit configured for wirelessly communicating over at least one channel with at least one other wireless station on a local area network (WLAN) in its reception area;
   (b) a processor coupled to said wireless communication circuit within a station configured for operating on the WLAN;
   (c) a non-transitory memory storing instructions executable by the processor; and
   (d) wherein said instructions, when executed by the processor, perform one or more steps comprising:
      (i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist;
      (ii) distinguishing real-time application (RTA) packets from non-real-time application (non-RTA) packets;
      (iii) creating RTA queues to enqueue RTA packets while non-RTA packets are pushed into non-RTA queues;
      (iv) exchanging management frames containing RTA session parameters and RTA queue setting information;
      (v) allocating channel time to said RTA queues for transmitting packets, during which non-RTA queues are not allowed to access the channel;
      (vi) determining which RTA queues to enqueue an RTA packet into based on RTA queue classification information of its RTA session; and (vii) wherein said instructions when executed by the processor further perform one or more steps in which the station creating an RTA queue is configured to allow that queue to access the channel using channel time allocated to other queues.

2. The apparatus as recited in claim 1, wherein said instructions when executed by the processor further perform one or more steps in which the station sets the expiration time of an RTA packet and dequeues an expired RTA packet from all the RTA queues within which it is enqueued.

3. The apparatus as recited in claim 1, wherein said instructions when executed by the processor further perform one or more steps of the station distinguishing the RTA traffic and non-RTA traffic by utilizing information based on prior negotiation or packet header information.

4. The apparatus as recited in claim 1, wherein said instructions when executed by the processor further perform one or more steps comprising the station creating an RTA queue and is configured to sort the RTA packets in the queue by calculating the importance index of each packet based on their expiration times and priorities.

5. The apparatus as recited in claim 1, wherein said instructions when executed by the processor further perform one or more steps in which the station creating an RTA queue is configured to transmit the RTA packets in the queue based on RTA session information without considering packet order in the queue.

6. The apparatus as recited in claim 1, wherein said instructions when executed by the processor further perform one or more steps in which the station creating an RTA queue is configured to limit channel resources allocated to that queue.

7. The apparatus as recited in claim 1, wherein said instructions when executed by the processor further perform one or more steps comprising exchanging management frames containing RTA session parameters and the setting of RTA queue classification, RTA packet expiration time, and how to handle expired RTA packets for the RTA session between the station and other stations on the network.

8. The apparatus as recited in claim 1, wherein said instructions when executed by the processor further perform one or more steps in which the station and other stations on the network exchange management frames containing RTA queue setting information and the setting of RTA queuing discipline, RTA queue channel time allocation, and RTA queue channel resource limitation for each queue.

9. The apparatus as recited in claim 1, wherein said instructions when executed by the processor further perform one or more steps in which the station deciding which RTA queues to enqueue an RTA packet into is configured to utilize queue information of the RTA session exchanged by prior negotiation in making the determination.

10. The apparatus as recited in claim 1, wherein said instructions when executed by the processor further perform one or more steps in which the station enqueuing an RTA packet is configured to push this packet into multiple RTA queues based on the latency requirement.

11. The apparatus as recited in claim 1, wherein said instructions when executed by the processor further perform one or more steps in which the station enqueuing an RTA packet is configured to dequeue that RTA packet from all the queues when that packet is transmitted successfully through one queue.

12. The apparatus as recited in claim 1, wherein said instructions when executed by the processor further perform one or more steps in which the station setting an expiration time of an RTA packet is configured to decide either to drop the packet or move the packet to non-RTA queues upon reaching that expiration time.

13. An apparatus for wireless communication in a network, the apparatus comprising:
 (a) a wireless communication circuit configured for wirelessly communicating over at least one channel with at least one other wireless station on a local area network (WLAN) in its reception area;
 (b) a processor coupled to said wireless communication circuit within a station configured for operating on the WLAN;
 (c) a non-transitory memory storing instructions executable by the processor; and
 (d) wherein said instructions, when executed by the processor, perform one or more steps comprising:
  (i) operating said wireless communication circuit as a wireless local area network (WLAN) station, a station, configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist;
  (ii) distinguishing real-time application (RTA) packets from non-real-time application (non-RTA) packets, wherein the STA distinguishes RTA traffic and non-RTA traffic by utilizing information based on prior negotiation or packet header information;
  (iii) creating RTA queues to enqueue RTA packets while non-RTA packets are pushed into non-RTA queues;
  (iv) exchanging management frames containing RTA session parameters and RTA queue setting information;
  (v) allocating channel time to said RTA queues for transmitting packets, during which non-RTA queues are not allowed to access the channel;
  (vi) determining which RTA queues to enqueue an RTA packet into based on RTA queue classification information of its RTA session;
  (vii) wherein the station sets the expiration time of an RTA packet and dequeues the expired RTA packet from all the RTA queues within which it is enqueued; and
  (viii) wherein one or more of the following steps is performed:
  the station creating an RTA queue is configured to allow that queue to access the channel using channel time allocated to other queues; or
  the station creating an RTA queue is configured to sort the RTA packets in the queue by calculating the importance index of each packet based on expiration times and priorities; or
  the station enqueuing an RTA packet is configured to dequeue that RTA packet from all the queues when that packet is transmitted successfully through one queue.

14. The apparatus as recited in claim 13, wherein said instructions when executed by the processor further perform one or more steps in which the station creating an RTA queue is configured to transmit the RTA packets in the queue based on their RTA session information without considering their order in the queue.

15. The apparatus as recited in claim 13, wherein said instructions when executed by the processor further perform one or more steps in which the station creating an RTA queue is configured to limit channel resources allocated to that queue.

16. The apparatus as recited in claim 13, wherein said instructions when executed by the processor further perform one or more steps comprising exchanging management frames containing RTA session parameters and the setting of RTA queue classification, RTA packet expiration time, and how to handle expired RTA packets for the RTA session between the station and other stations on the network.

17. The apparatus as recited in claim 13, wherein said instructions when executed by the processor further perform one or more steps in which the station and other stations on the network exchange management frames containing RTA queue setting information and the setting of RTA queuing discipline, RTA queue channel time allocation, and RTA queue channel resource limitation for each queue.

18. The apparatus as recited in claim 13, wherein said instructions when executed by the processor further perform one or more steps in which the station deciding which RTA queues to enqueue an RTA packet into is configured to utilize queue information of the RTA session exchanged by prior negotiation in making this determination.

19. The apparatus as recited in claim 13, wherein said instructions when executed by the processor further perform one or more steps in which the station enqueuing an RTA packet is configured to push this packet into multiple RTA queues based on latency requirements.

20. The apparatus as recited in claim 13, wherein said instructions when executed by the processor further perform one or more steps in which the station setting an expiration time of an RTA packet is configured to decide either to drop the packet or move the packet to non-RTA queues upon reaching that expiration time.

21. A method of performing wireless communication in a network, comprising:
(a) operating a wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist;
(b) distinguishing real-time application (RTA) packets from non-real-time application (non-RTA) packets;
(c) creating RTA queues to enqueue RTA packets while non-RTA packets are pushed into non-RTA queues;
(d) exchanging management frames containing RTA session parameters and RTA queue setting information;
(e) allocating channel time to said RTA queues for transmitting packets, during which non-RTA queues are not allowed to access the channel;
(f) determining which RTA queues to enqueue an RTA packet into based on RTA queue classification information of its RTA session; and
(g) wherein one or more of the following steps is performed:
the station creating an RTA queue is configured to allow that queue to access the channel using channel time allocated to other queues; or
the station creating an RTA queue is configured to sort the RTA packets in the queue by calculating the importance index of each packet based on their expiration times and priorities; or
the station enqueuing an RTA packet is configured to dequeue that RTA packet from all the queues when that packet is transmitted successfully through one queue.

22. An apparatus for wireless communication in a network, the apparatus comprising:
(a) a wireless communication circuit configured for wirelessly communicating over at least one channel with at least one other wireless station on a local area network (WLAN) in its reception area;
(b) a processor coupled to said wireless communication circuit within a station configured for operating on the WLAN;
(c) a non-transitory memory storing instructions executable by the processor; and
(d) wherein said instructions, when executed by the processor, perform one or more steps comprising:
(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist;
(ii) distinguishing real-time application (RTA) packets from non-real-time application (non-RTA) packets;
(iii) creating RTA queues to enqueue RTA packets while non-RTA packets are pushed into non-RTA queues;
(iv) exchanging management frames containing RTA session parameters and RTA queue setting information;
(v) allocating channel time to said RTA queues for transmitting packets, during which non-RTA queues are not allowed to access the channel;
(vi) determining which RTA queues to enqueue an RTA packet into based on RTA queue classification information of its RTA session; and
(vii) wherein the station creating an RTA queue and is configured to sort the RTA packets in the queue by calculating the importance index of each packet based on their expiration times and priorities.

23. The apparatus as recited in claim 22, wherein said instructions when executed by the processor further perform one or more steps in which the station sets the expiration time of an RTA packet and dequeues an expired RTA packet from all the RTA queues within which it is enqueued.

24. The apparatus as recited in claim 22, wherein said instructions when executed by the processor further perform one or more steps of the station distinguishing the RTA traffic and non-RTA traffic by utilizing information based on prior negotiation or packet header information.

25. The apparatus as recited in claim 22, wherein said instructions when executed by the processor further perform one or more steps in which the station creating an RTA queue is configured to allow that queue to access the channel using channel time allocated to other queues.

26. The apparatus as recited in claim 22, wherein said instructions when executed by the processor further perform one or more steps in which the station creating an RTA queue is configured to transmit the RTA packets in the queue based on RTA session information without considering packet order in the queue.

27. The apparatus as recited in claim 22, wherein said instructions when executed by the processor further perform one or more steps in which the station creating an RTA queue is configured to limit channel resources allocated to that queue.

28. The apparatus as recited in claim 22, wherein said instructions when executed by the processor further perform one or more steps comprising exchanging management frames containing RTA session parameters and the setting of RTA queue classification, RTA packet expiration time, and how to handle expired RTA packets for the RTA session between the station and other stations on the network.

29. The apparatus as recited in claim 22, wherein said instructions when executed by the processor further perform one or more steps in which the station and other stations on the network exchange management frames containing RTA queue setting information and the setting of RTA queuing discipline, RTA queue channel time allocation, and RTA queue channel resource limitation for each queue.

30. The apparatus as recited in claim 22, wherein said instructions when executed by the processor further perform one or more steps in which the station deciding which RTA queues to enqueue an RTA packet into is configured to utilize queue information of the RTA session exchanged by prior negotiation in making the determination.

31. The apparatus as recited in claim 22, wherein said instructions when executed by the processor further perform one or more steps in which the station enqueuing an RTA packet is configured to push this packet into multiple RTA queues based on the latency requirement.

32. The apparatus as recited in claim 22, wherein said instructions when executed by the processor further perform one or more steps in which the station enqueuing an RTA packet is configured to dequeue that RTA packet from all the queues when that packet is transmitted successfully through one queue.

33. The apparatus as recited in claim 22, wherein said instructions when executed by the processor further perform one or more steps in which the station setting an expiration time of an RTA packet is configured to decide either to drop the packet or move the packet to non-RTA queues upon reaching that expiration time.

34. An apparatus for wireless communication in a network, the apparatus comprising:
 (a) a wireless communication circuit configured for wirelessly communicating over at least one channel with at least one other wireless station on a local area network (WLAN) in its reception area;
 (b) a processor coupled to said wireless communication circuit within a station configured for operating on the WLAN;
 (c) a non-transitory memory storing instructions executable by the processor; and
 (d) wherein said instructions, when executed by the processor, perform one or more steps comprising:
  (i) operating said wireless communication circuit as a wireless local area network (WLAN) station configured to support communicating real-time application (RTA) packets that are sensitive to communication delays as well as non-real time packets over a network supporting carrier sense multiple access/ collision avoidance (CSMA/CA) in which real time application (RTA) traffic and non-RTA traffic coexist;
  (ii) distinguishing real-time application (RTA) packets from non-real-time application (non-RTA) packets;
  (iii) creating RTA queues to enqueue RTA packets while non-RTA packets are pushed into non-RTA queues;
  (iv) exchanging management frames containing RTA session parameters and RTA queue setting information;
  (v) allocating channel time to said RTA queues for transmitting packets, during which non-RTA queues are not allowed to access the channel;
  (vi) determining which RTA queues to enqueue an RTA packet into based on RTA queue classification information of its RTA session; and
  (vii) wherein the station enqueuing an RTA packet is configured to dequeue that RTA packet from all the queues when that packet is transmitted successfully through one queue.

35. The apparatus as recited in claim 34, wherein said instructions when executed by the processor further perform one or more steps in which the station sets the expiration time of an RTA packet and dequeues an expired RTA packet from all the RTA queues within which it is enqueued.

36. The apparatus as recited in claim 34, wherein said instructions when executed by the processor further perform one or more steps of the station distinguishing the RTA traffic and non-RTA traffic by utilizing information based on prior negotiation or packet header information.

37. The apparatus as recited in claim 34, wherein said instructions when executed by the processor further perform one or more steps in which the station creating an RTA queue is configured to allow that queue to access the channel using channel time allocated to other queues.

38. The apparatus as recited in claim 34, wherein said instructions when executed by the processor further perform one or more steps comprising the station creating an RTA queue and is configured to sort the RTA packets in the queue by calculating the importance index of each packet based on their expiration times and priorities.

39. The apparatus as recited in claim 34, wherein said instructions when executed by the processor further perform one or more steps in which the station creating an RTA queue is configured to transmit the RTA packets in the queue based on RTA session information without considering packet order in the queue.

40. The apparatus as recited in claim 34, wherein said instructions when executed by the processor further perform one or more steps in which the station creating an RTA queue is configured to limit channel resources allocated to that queue.

41. The apparatus as recited in claim 34, wherein said instructions when executed by the processor further perform one or more steps comprising exchanging management frames containing RTA session parameters and the setting of RTA queue classification, RTA packet expiration time, and how to handle expired RTA packets for the RTA session between the station and other stations on the network.

42. The apparatus as recited in claim 34, wherein said instructions when executed by the processor further perform one or more steps in which the station and other stations on the network exchange management frames containing RTA queue setting information and the setting of RTA queuing discipline, RTA queue channel time allocation, and RTA queue channel resource limitation for each queue.

43. The apparatus as recited in claim 34, wherein said instructions when executed by the processor further perform one or more steps in which the station deciding which RTA queues to enqueue an RTA packet into is configured to utilize queue information of the RTA session exchanged by prior negotiation in making the determination.

44. The apparatus as recited in claim 34, wherein said instructions when executed by the processor further perform one or more steps in which the station enqueuing an RTA packet is configured to push this packet into multiple RTA queues based on the latency requirement.

45. The apparatus as recited in claim 34, wherein said instructions when executed by the processor further perform one or more steps in which the station setting an expiration time of an RTA packet is configured to decide either to drop the packet or move the packet to non-RTA queues upon reaching that expiration time.

\* \* \* \* \*